United States Patent
Ishigaki et al.

(10) Patent No.: US 10,199,155 B2
(45) Date of Patent: Feb. 5, 2019

(54) VARIABLE MAGNETIC COUPLING REACTOR HAVING TWO INTEGRATED REACTOR ELEMENTS, POWER SUPPLY SYSTEM INCLUDING THE SAME, AND METHOD OF USE OF COMPOSITE MAGNETIC COMPONENT HAVING TWO INTEGRATED REACTOR ELEMENTS

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Masanori Ishigaki, Nagakute (JP); Shuji Tomura, Nagakute (JP); Naoki Yanagizawa, Nagakute (JP); Masaki Okamura, Toyota (JP); Naoyoshi Takamatsu, Sunto-gun (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 15/120,646

(22) PCT Filed: Jan. 28, 2015

(86) PCT No.: PCT/JP2015/000363
§ 371 (c)(1),
(2) Date: Aug. 22, 2016

(87) PCT Pub. No.: WO2015/125416
PCT Pub. Date: Aug. 27, 2015

(65) Prior Publication Data
US 2017/0011842 A1    Jan. 12, 2017

(30) Foreign Application Priority Data

Feb. 24, 2014    (JP) ................................. 2014-032985

(51) Int. Cl.
*H01F 3/14*      (2006.01)
*H01F 38/02*      (2006.01)
(Continued)

(52) U.S. Cl.
CPC ........... *H01F 27/2823* (2013.01); *H01F 3/14* (2013.01); *H01F 27/24* (2013.01); *H01F 27/38* (2013.01);
(Continued)

(58) Field of Classification Search
CPC ........ H01F 27/2823; H01F 3/14; H01F 27/24; H01F 27/38; H01F 37/00; H01F 38/023;
(Continued)

(56) References Cited

U.S. PATENT DOCUMENTS

| 2,406,704 | A | 8/1946 | Hubert et al. |
| 9,438,115 | B2 * | 9/2016 | Ishigaki ................ H02M 3/158 |

(Continued)

FOREIGN PATENT DOCUMENTS

| DE | 102011056667 A1 | 6/2012 |
| EP | 1768137 A1 | 3/2007 |

(Continued)

OTHER PUBLICATIONS

Kang, Byoung-Kuk, et al; "Integrated Magnetics for Boost PFC and Flyback Converters with Phase-Shifted PWM;" Applied Power Electronics Conference and Exposition (APEC); 2013; Twenty-Eighth Annual IEEE; p. 1018-1024.
(Continued)

*Primary Examiner* — Hal Kaplan
(74) *Attorney, Agent, or Firm* — Oliff PLC

(57) ABSTRACT

A core has first to third magnetic leg portions. First and second windings wound on the first and second magnetic leg portions, respectively, are connected in series to constitute a first reactor. A third winding wound on the third magnetic leg portion constitutes a second reactor. A magnetic field produced from the first reactor and a magnetic field produced from the second reactor reinforce each other in the second magnetic leg portion, but weaken each other in the first magnetic leg portion. In accordance with increase in currents, the operation of the first and second reactors changes from a magnetically uncoupled mode in which the first and second reactors operate in a magnetically non-interfering state to a magnetically coupled mode in which the first and second reactors operate in a magnetically interfering state.

15 Claims, 27 Drawing Sheets

(51) Int. Cl.
| | |
|---|---|
| H01F 38/14 | (2006.01) |
| H01F 37/00 | (2006.01) |
| H01F 27/24 | (2006.01) |
| H01F 27/28 | (2006.01) |
| H01F 27/38 | (2006.01) |
| H02M 1/00 | (2006.01) |
| H02M 3/158 | (2006.01) |
| H02M 3/335 | (2006.01) |

(52) U.S. Cl.
CPC ........... *H01F 37/00* (2013.01); *H01F 38/023* (2013.01); *H01F 38/14* (2013.01); *H02M 3/33576* (2013.01); *H02M 3/158* (2013.01); *H02M 2001/0074* (2013.01); *H02M 2001/0077* (2013.01)

(58) Field of Classification Search
CPC ... H01F 38/14; H02M 3/33576; H02M 3/158; H02M 2001/0074; H02M 2001/0077
USPC .......................................................... 307/52
See application file for complete search history.

(56) References Cited

U.S. PATENT DOCUMENTS

| | | | |
|---|---|---|---|
| 9,647,544 B2* | 5/2017 | Ishigaki | ................ H02M 3/158 |
| 2009/0147541 A1 | 6/2009 | Shimada et al. | |
| 2009/0289751 A1 | 11/2009 | Nagano et al. | |
| 2010/0103585 A1 | 4/2010 | Mao et al. | |
| 2012/0075051 A1* | 3/2012 | Petter | .................... H01F 27/385 |
| | | | 336/220 |
| 2014/0145694 A1 | 5/2014 | Ishigaki et al. | |
| 2015/0084422 A1 | 3/2015 | Ishigaki et al. | |

FOREIGN PATENT DOCUMENTS

| | | |
|---|---|---|
| EP | 2071596 A2 | 6/2009 |
| JP | H03-502279 A | 5/1991 |
| JP | 2009-059995 A | 3/2009 |
| JP | 2009-146955 A | 7/2009 |
| JP | 2009-284647 A | 12/2009 |
| JP | 2013-013234 A | 1/2013 |
| JP | 2013-198246 A | 9/2013 |
| WO | 90/005406 A1 | 5/1990 |
| WO | 2013/140780 A1 | 9/2013 |

OTHER PUBLICATIONS

Jun. 8, 2015 International Search Report issued in International Patent Application No. PCT/JP2015/000363.
Jun. 8, 2015 Written Opinion issued in International Patent Application No. PCT/JP2015/000363.
Dec. 1, 2015 Office Action issued in Japanese Patent Application No. 2014-032985.
Sep. 14, 2018 Office Action issued in Chinese Patent Application No. 201580009972.X.

* cited by examiner

| PATTERN | ix | iy | Vx | Vy | 151 | 152 | Mry | $\left|\dfrac{dix}{dt}\right|$ | $\left|\dfrac{diy}{dt}\right|$ |
|---|---|---|---|---|---|---|---|---|---|
| 1 | + | + | + | + | − | + | <=0 | ↗ | ↗ |
| 2 | + | + | + | − | − | + | <=0 | ↘ | ↘ |
| 3 | + | + | − | + | − | + | <=0 | ↘ | ↘ |
| 4 | + | + | − | − | − | + | <=0 | ↗ | ↗ |
| 5 | + | − | + | + | + | − | >=0 | ↘ | ↘ |
| 6 | + | − | + | − | + | − | >=0 | ↗ | ↗ |
| 7 | + | − | − | + | + | − | >=0 | ↗ | ↗ |
| 8 | + | − | − | − | + | − | >=0 | ↘ | ↘ |
| 9 | − | + | + | + | + | − | >=0 | ↘ | ↘ |
| 10 | − | + | + | − | + | − | >=0 | ↗ | ↗ |
| 11 | − | + | − | + | + | − | >=0 | ↗ | ↗ |
| 12 | − | + | − | − | + | − | >=0 | ↘ | ↘ |
| 13 | − | − | + | + | − | + | <=0 | ↗ | ↗ |
| 14 | − | − | + | − | − | + | <=0 | ↘ | ↘ |
| 15 | − | − | − | + | − | + | <=0 | ↘ | ↘ |
| 16 | − | − | − | − | − | + | <=0 | ↗ | ↗ |

(a)

(b)

(a)

(b)

| | LOGICAL OPERATION EXPRESSION |
|---|---|
| SG1 | /SD1 or /SD2 |
| SG2 | /SD1 or SD2 |
| SG3 | SD1 or SD2 |
| SG4 | SD1 or /SD2 |

(a)

(b)

(a)

(b)

(a)

(b)

|  | LOGICAL OPERATION EXPRESSION |
|---|---|
| SG1 | /SD3 |
| SG2 | SD3 |
| SG3 | FIXED AT H |
| SG4 | SD3 |

| | PB MODE | SB MODE |
|---|---|---|
| SG1 | /SD1 or /SD2 | /SD3→/SD1 or /SD2 |
| SG2 | /SD1 or SD2 | SD3→SD1 and SD2 |
| SG3 | SD1 or SD2 | FIXED AT H→SD1 or SD2 |
| SG4 | SD1 or /SD2 | SD3→SD1 and SD2 |

FIG.48

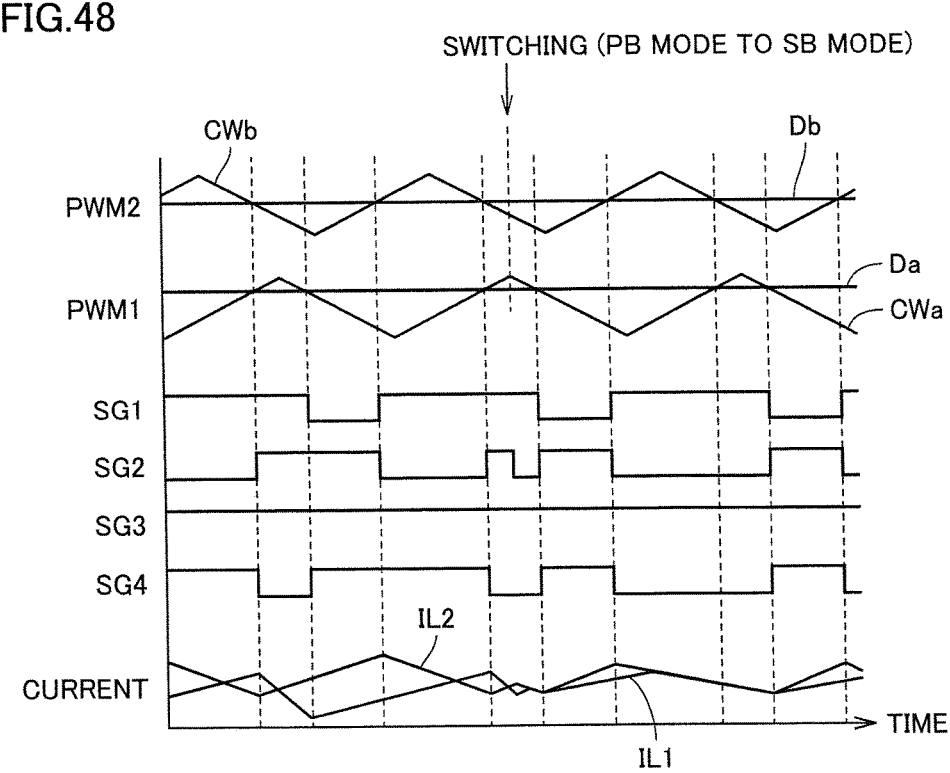

FIG.49

| OPERATION MODE | POWER SUPPLY USED | OUTPUT VOLTAGE | S1 | S2 | S3 | S4 |
|---|---|---|---|---|---|---|
| PARALLEL BOOST | B1 AND B2 (IN PARALLEL) | VH→VH* | PWM CONTROL | | | |
| SERIES BOOST | B1 AND B2 (IN SERIES) | VH→VH* | PWM CONTROL | | | |
| B1 BOOST | ONLY B1 | VH→VH* | PWM CONTROL | | | |
| B2 BOOST | ONLY B2 | VH→VH* | PWM CONTROL | | | |
| PARALLEL DIRECT CONNECTION | B1 AND B2 | VH=V[1]=V[2] | ON | ON | OFF | ON |
| SERIES DIRECT CONNECTION | B1 AND B2 | VH=V[1]+V[2] | ON | OFF | ON | OFF |
| B1 DIRECT CONNECTION | ONLY B1 | VH=V[1] (V[1]>V[2]) | ON | ON | OFF | OFF |
| B2 DIRECT CONNECTION | ONLY B2 | VH=V[2] (V[2]>V[1]) | ON | OFF | OFF | ON | ized by sharing a magnetic body (core).
VARIABLE MAGNETIC COUPLING REACTOR HAVING TWO INTEGRATED REACTOR ELEMENTS, POWER SUPPLY SYSTEM INCLUDING THE SAME, AND METHOD OF USE OF COMPOSITE MAGNETIC COMPONENT HAVING TWO INTEGRATED REACTOR ELEMENTS

TECHNICAL FIELD

The present invention relates to a variable magnetic coupling reactor, a power supply system, and a method of use of a composite magnetic component, and more particularly to a variable magnetic coupling reactor having two integrated reactor elements, a power supply system including the same, and a method of use of a composite magnetic component having two integrated reactor elements.

BACKGROUND ART

An inductive element, such as a reactor, used for a power converter is generally formed by winding coils on a core made of a magnetic material, which is likely to increase in size. It has therefore been proposed to configure a composite magnetic component having a plurality of inductive elements integrated by sharing a magnetic body (core).

For example, Japanese Patent Laying-Open No. 2009-59995 describes a configuration of a composite magnetic component in which a transformer and a reactor are integrated. In the configuration described in Japanese Patent Laying-Open No. 2009-59995, a primary winding and a secondary winding are wound on one of two cores constituting the transformer, and an extension of the primary winding is wound on the other core. Accordingly, the reactor connected in series with the primary winding of the transformer can be formed integrally with the transformer by means of the above-described extension.

Japanese Patent Laying-Open No. 2009-284647 describes a configuration of a composite transformer in which first and second inductors and a transformer are formed integrally.

CITATION LIST

Patent Literature

[PTL 1] Japanese Patent Laying-Open No. 2009-59995
[PTL 2] Japanese Patent Laying-Open No. 2009-284647

SUMMARY OF INVENTION

Technical Problem

For example, in a power supply system including two DC power sources, there exists a circuit configuration of a power converter having two reactors respectively included in current paths that can be independently controlled in current. In such a circuit configuration, a phenomenon may occur in which a magnetic field produced by a current flowing through one of the reactors affects the other reactor. Particularly, magnetic coupling can produce such magnetic interference between two integrated reactor elements that a voltage applied to one of the reactors affects the current flowing through the other reactor.

In this respect, since the composite magnetic component of Japanese Patent Laying-Open No. 2009-59995 relates to a technique for integrating a transformer and a single reactor, measures against magnetic interference when integrating two reactor elements are not disclosed at all.

The composite transformer described in Japanese Patent Laying-Open No. 2009-284647 has a characteristic configuration in which first and second windings constituting first and second reactors are wound on a divided core in a manner separated from each other such that magnetic fluxes produced by the first and second windings do not interfere with each other in the core. That is, the composite transformer described in Japanese Patent Laying-Open No. 2009-284647 is configured such that magnetic interference does not occur between the first and second inductors formed integrally.

The present invention was made to solve the above problems, and has an object to configure a variable magnetic coupling reactor taking advantage of magnetic interference between two reactor elements formed integrally by a shared core, thereby achieving reduction in size and weight of the reactor.

Solution to Problem

In an aspect of the present invention, a variable magnetic coupling reactor includes a first winding and a second winding through which a first current passes, a third winding through which a second current passes, and a core made of a nonlinear magnetic material. The first and second windings are electrically connected in series. The core is configured to include a first magnetic leg portion on which the first winding is wound, a second magnetic leg portion on which the second winding is wound, a third magnetic leg portion on which the third winding is wound, and a fourth magnetic leg portion configured to create a magnetic path among the first to third magnetic leg portions. In accordance with increase in the first and second currents, an operating state of a first reactor formed by the first and second windings and a second reactor formed by the third winding changes from a magnetically uncoupled mode in which the first and second reactors operate in a magnetically non-interfering state to a magnetically coupled mode in which the first and second reactors operate in a magnetically interfering state.

Another aspect of the present invention is directed to a method of use of a composite magnetic component. The composite magnetic component includes a first winding and a second winding through which a first current passes, a third winding through which a second current passes, and a core made of a nonlinear magnetic material. The first and second windings are electrically connected in series. The core is configured to include a first magnetic leg portion on which the first winding is wound, a second magnetic leg portion on which the second winding is wound, a third magnetic leg portion on which the third winding is wound, and a fourth magnetic leg portion configured to create a magnetic path among the first to third magnetic leg portions. An operating state of a first reactor formed by the first and second windings and a second reactor formed by the third winding changes from a magnetically uncoupled mode in which the first and second reactors operate in a magnetically non-interfering state to a magnetically coupled mode in which the first and second reactors operate in a magnetically interfering state.

In still another aspect of the present invention, a power supply system includes a first DC power source, a second DC power source, a power converter configured to execute DC power conversion between the first and second DC power sources and first and second power lines, and a control device configured to control operation of the power converter. The power converter includes a first reactor and a second reactor, and a plurality of switching elements. The first and second reactors are arranged to be included in a power conversion path formed across the first and second DC power sources and the first and second power lines. The plurality of switching elements are arranged to be capable of controlling a first current passing through the first reactor and a second current passing through the second reactor. The first and second reactors are integrally formed by a single composite magnetic component. The composite magnetic component is configured to include a first winding and a second winding through which the first current passes, a third winding through which the second current passes, and a core made of a nonlinear magnetic material. The first and second windings are electrically connected in series. The core is configured to include a first magnetic leg portion on which the first winding is wound, a second magnetic leg portion on which the second winding is wound, a third magnetic leg portion on which the third winding is wound, and a fourth magnetic leg portion configured to create a magnetic path among the first to third magnetic leg portions. An operating state of a first reactor formed by the first and second windings and a second reactor formed by the third winding changes from a magnetically uncoupled mode in which the first and second reactors operate in a magnetically non-interfering state to a magnetically coupled mode in which the first and second reactors operate in a magnetically interfering state.

Advantageous Effects of Invention

A principal advantage of the present invention resides in that, by forming a variable magnetic coupling reactor taking advantage of magnetic interference between two reactor elements formed integrally by a shared core, the reactor can be reduced in size and weight.

BRIEF DESCRIPTION OF DRAWINGS

FIG. 48 is a diagram of waveforms showing an exemplary operation in the parallel boost mode and the series boost mode in the power supply system according to the third embodiment.

FIG. 49 is a list showing a plurality of operation modes applied to the power supply system according to the third embodiment.

DESCRIPTION OF EMBODIMENTS

Figure 1:
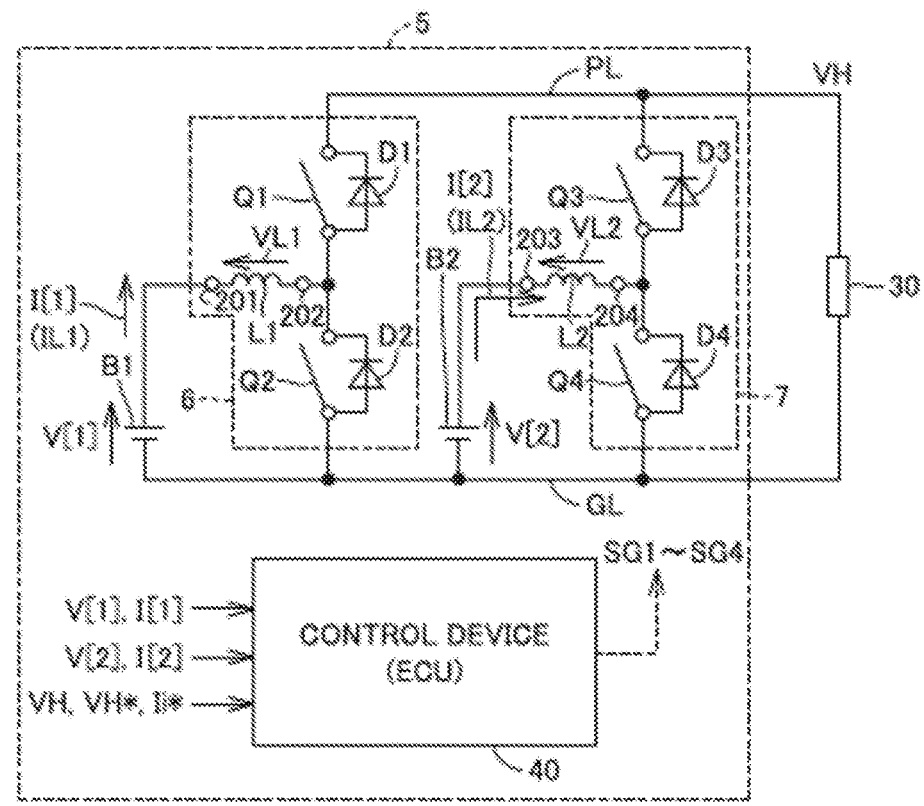
FIG. 1 is a circuit diagram showing an exemplary configuration of a power supply system to which a variable magnetic coupling reactor according to an embodiment of the present invention is applied.

In the following, embodiments of the present invention will be described in detail with reference to the figures. In the figures, the same or corresponding portions are denoted by the same reference characters and, basically, description thereof will not be repeated.

First Embodiment

FIG. 1 is a circuit diagram showing an exemplary configuration of a power supply system to which a composite magnetic component (a variable magnetic coupling reactor) according to an embodiment of the present invention is applied.

Referring to FIG. 1, a power supply system 5 includes a DC power source B1, a power converter 6, a DC power source B2, and a power converter 7. Power supply system 5 controls electric power supply from DC power sources B1, B2 to a load 30. Power supply system 5 charges DC power sources B1, B2 with electric power generated by load 30.

In the present embodiment, DC power sources B1 and B2 are implemented by a power storage device such as a secondary battery or an electric double layer capacitor. DC power source B1 is implemented by, for example, a secondary battery such as a lithium ion secondary battery or a nickel-metal hydride battery. DC power source B2 is implemented by, for example, a DC voltage source element having superior output characteristics such as an electric double-layer capacitor or a lithium ion capacitor. DC power sources B1 and B2 correspond to a "first DC power source" and a "second DC power source", respectively. However, it is also possible to implement DC power sources B1 and B2 by power storage devices of the same type.

Power converter 6 is connected across DC power source B1 and load 30. Power converter 7 is connected across DC power source B2 and load 30. It is understood that, in power supply system 5, DC power sources B1 and B2 are connected in parallel to load 30 via power converters 6 and 7.

Load 30 operates receiving output voltage VH from power converters 6 and 7. A voltage command value VH* of output voltage VH is set at a voltage appropriate for the operation of load 30. The voltage command value may be variably set in accordance with the state of load 30. Load 30 may be configured to be able to generate charging power for charging DC power sources B1 and B2 by regenerative power generation or the like. For example, load 30 is configured so as to include a traction motor for an electric powered vehicle, such as a hybrid vehicle and an electric vehicle, and an inverter for controlling driving of that motor.

Power converter 6 executes bidirectional DC/DC conversion between DC power source B1 and a power line PL connected to load 30. Power converter 7 executes bidirectional DC/DC conversion between DC power source B2 and power line PL.

Each of power converters 6 and 7 has a configuration of a so-called step-up chopper circuit. Specifically, power converter 6 has power semiconductor switching elements (hereinafter briefly called "switching elements" as well) Q1, Q2 and a reactor L1. Switching elements Q1 and Q2 are connected in series across power line PL and a power line GL.

Reactor L1 has terminals 201 and 202. Terminal 201 is electrically connected to a positive electrode terminal of DC power source B1. Terminal 202 is electrically connected to a connection node between switching elements Q1 and Q2. Accordingly, reactor L1 is electrically connected across the positive electrode terminal of DC power source B1 and the connection node between switching elements Q1 and Q2.

Power converter 7 has switching elements Q3, Q4 and a reactor L2. Switching elements Q3 and Q4 are connected in series across power lines PL and GL. Reactor L2 has terminals 203 and 204. Terminal 203 is electrically connected to a positive electrode terminal of DC power source B2. Terminal 204 is electrically connected to a connection node between switching elements Q3 and Q4. Accordingly, reactor L2 is electrically connected across the positive electrode terminal of DC power source B2 and the connection node between switching elements Q3 and Q4.

In the present embodiment, the switching elements can be implemented by an IGBT (Insulated Gate Bipolar Transistor), a power MOS (Metal Oxide Semiconductor) transistor, a power bipolar transistor, or the like. For switching elements Q1 to Q4, anti-parallel diodes D1 to D4 are arranged. Switching elements Q1 to Q4 can be on/off controlled in response to control signals SG1 to SG4 from a control device 40.

In power converters 6 and 7, each implemented by a step-up chopper circuit, DC output is controlled in accordance with the duty ratio indicating the on-period ratio of an upper arm element (Q1, Q3) and a lower arm element (Q2, Q4) in a predetermined cycle (switching cycle). In general, switching elements Q1 to Q4 are controlled such that the upper arm element and the lower arm element are turned on/off in complementary manner in accordance with a comparison between a DC signal indicating the duty ratio and a carrier signal of predetermined frequency.

The voltage conversion ratio (step-up ratio) in the step-up chopper circuit is known to be expressed by Equation (1) below, using a voltage Vi at the lower voltage side (DC power source side), output voltage VH at the higher voltage side (load side) and a duty ratio DT of the lower arm element. Here, duty ratio DT is defined by the on-period ratio of the lower arm element to the switching period which is the sum of the on- and off-periods of the lower arm element. The upper arm element is turned on in the off-period of the lower arm element.

[Math.1]

$$VH = 1/(1-DT) \times Vi \quad (1)$$

Control device 40 is implemented by, for example, a CPU (Central Processing Unit) not shown and an electronic control unit (ECU) having a memory. Control device 40 is configured to perform arithmetic processing using a detection value obtained by each sensor based on a map and a program stored in the memory. Alternatively, at least part of control device 40 may be configured to execute predetermined numeric and logic arithmetic processing by hardware, such as an electronic circuit.

Control device 40 generates control signals SG1 to SG4 that control on/off of switching elements Q1 to Q4 in order to control output voltage VH to load 30. Although not shown in FIG. 1, detectors (voltage sensor, current sensor) are provided for detecting voltage (denoted by V[1]) and current (denoted by I[1]) of DC power source B1, voltage (denoted by V[2]) and current (denoted by I[2]) of DC power source B2, and output voltage VH. In power converter 6, current I[1] corresponds to a current IL1 flowing through reactor L1. Similarly, in power converter 7, current I[2] corresponds to a current IL2 flowing through reactor L2.

Hereinafter, electric currents flowing when discharging DC power sources B1 and B2 (in a power running operation of power supply system 5) shall be expressed by positive values (IL1>0, IL2>0), while electric currents flowing when charging DC power sources B1 and B2 (in a regeneration operation of power supply system 5) shall be expressed by negative values (IL1<0, IL2<0).

Figure 2:
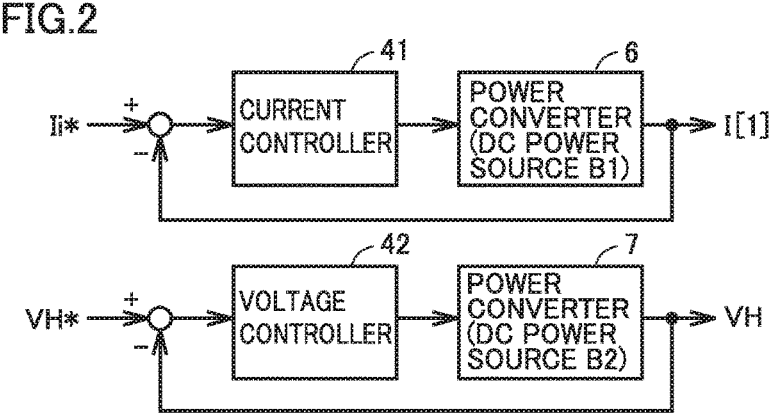
FIG. 2 is a typical control block diagram of the power supply system shown in FIG. 1.

FIG. 2 is a typical control block diagram of power supply system 5 shown in FIG. 1. It is noted that the function of a functional block in each of the block diagrams including that of FIG. 2 shall be achieved by hardware processing and/or software processing by control device 40.

Referring to FIG. 2, if control common to power converters 6 and 7 (voltage control of output voltage VH) is executed simultaneously, there is a possibility of circuit failure. Therefore, power converters 6 and 7 execute DC/DC conversion between DC power sources B1, B2 and load 30 such that one of the batteries operates as a voltage source and the other battery operates as a current source.

Here, power converter 6 shall control battery current I[1] in accordance with a current command value Ii* such that DC power source B1 operates as a current source. On the other hand, power converter 7 controls output voltage VH in accordance with voltage command value VH* such that DC power source B2 operates as a voltage source.

Here, a relation represented by Equation (2) below holds between electric power P[1] of DC power source B1, electric power P[2] of DC power source B2, output power Po to load 30, and current command value Ii* of the current source.

[Math.2]

$$P[2] = Po - P[1] = Po - V[1] \times Ii^* \quad (2)$$

By setting current command value Ii* such that P[1]*=V[1]×Ii* is kept constant in accordance with the detected value of voltage V[1] of DC power source B1, electric power P[1] of DC power source B1 constituting the current source can be regulated to a power command value P[1]*.

It is also possible to exert control with DC power source B2 operating as a current source and DC power source B1 operating as a voltage source. In this case, by setting current command value Ii* such that V[2]×Ii* is kept constant for electric power P[2] of DC power source B2 constituting a current source, electric power P[2] of DC power source B2 can be regulated in accordance with the power command value. A current controller 41 controls the duty ratio of power converter 6 such that current I[1] of DC power source B1 corresponds to current command value Ii*. Specifically, when a current deviation (Ii*−I[1]) is higher than zero, the duty ratio is changed such that the on-period of the lower arm element (Q2) becomes longer in order to increase current I[1]. In contrast, when the current deviation (Ii*−I[1]) is lower than zero, the duty ratio is changed such that the on-period of the upper arm element (Q1) of power converter 6 becomes longer in order to reduce current I[1].

A voltage controller 42 controls the duty ratio of power converter 7 such that output voltage VH corresponds to voltage command value VH*. When a voltage deviation (VH*−VH) is higher than zero, voltage controller 42 changes the duty ratio such that the on-period ratio of the lower arm element (Q4) of power converter 7 becomes larger in order to increase output voltage VH. In contrast, when the voltage deviation (VH*−VH) is lower than zero, voltage controller 42 changes the duty ratio such that the on-period ratio of the upper arm element (Q3) of power converter 7 becomes larger in order to reduce output voltage VH.

In this way, the output of DC power source B1 is subjected to current control by power converter 6 in accordance with current command value Ii*. On the other hand, the output of DC power source B2 is subjected to voltage control by power converter 7 in accordance with voltage command value VH*. Contrary to the example shown in FIG. 2, it is also possible to subject the output of DC power source B1 to voltage control by power converter 6 in accordance with voltage command value VH*, and to subject the output of DC power source B2 to current control by power converter 7 in accordance with current command value Ii*.

Figure 3:
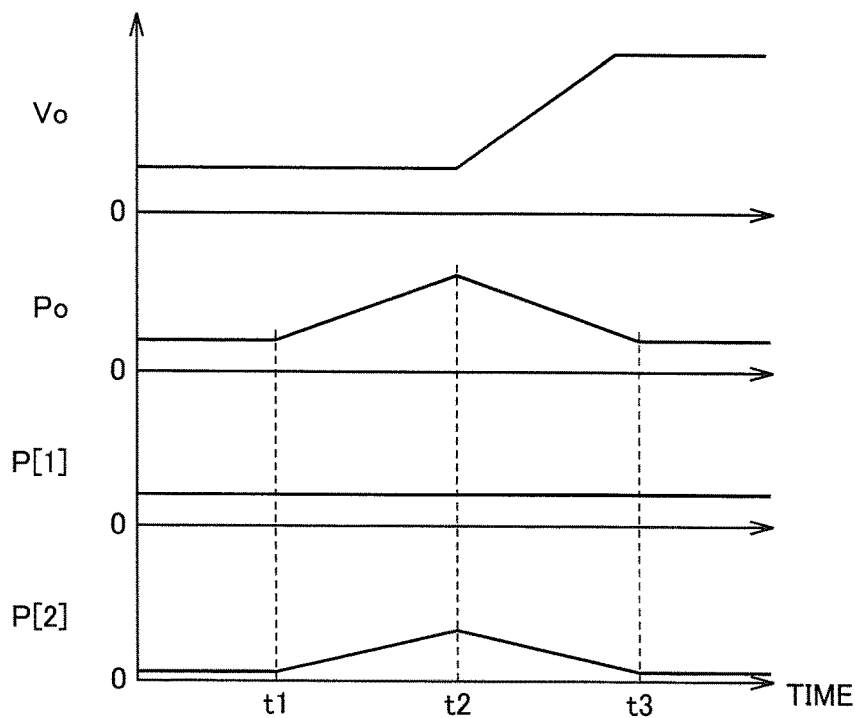
FIG. 3 is a diagram of operation waveforms of the power supply system shown in FIG. 1.

FIG. 3 shows exemplary operation waveforms of power supply system 5 controlled by the control block shown in FIG. 2.

Referring to FIG. 3, operation waveforms in the case where P[1]>0 and P[2]>0 hold, DC power sources B1 and B2 are discharged to supply electric power to load 30 are shown. That is, output power Po expressed by Po=P[1]+P[2] is higher than zero.

Since current I[1] of DC power source B1 is controlled to be constant by power converter 6 in accordance with current command value Ii*, electric power P[1] of DC power source B1 is also constant. Therefore, in the period from time t1 to time t2 during which electric power of load 30 increases with voltage command value VH* being constant, P[1] is maintained constant, while electric power P[2] of DC power source B2 increases.

In the period from time t2 to time t3, output power Po decreases, while voltage command value VH* increases. Output voltage VH is increased by power converter 7 in accordance with voltage command value VH*. Furthermore, electric power P[1] is constant because current I[1] is controlled to be constant by power converter 6, while electric power P[2] gradually decreases.

In this way, electric power P[1] of DC power source B1 subjected to current control is controlled in accordance with current command value Ii*. On the other hand, DC power source B2 will operate as a buffer for supplying the difference between output power Po to load 30 and electric power P[1] of DC power source B1 while ensuring output voltage VH.

As described above, in power supply system 5, current IL1 flowing through reactor L1 of power converter 6 and current IL2 flowing through reactor L2 of power converter 7 are controlled independently. Therefore, reactors L1 and L2 are designed such that an induced voltage is avoided from occurring in reactor L2 by current IL1 or to the contrary, an induced voltage is avoided from occurring in reactor L1 by current IL2, that is, such that reactors L1 and L2 become magnetically uncoupled.

Figure 4:
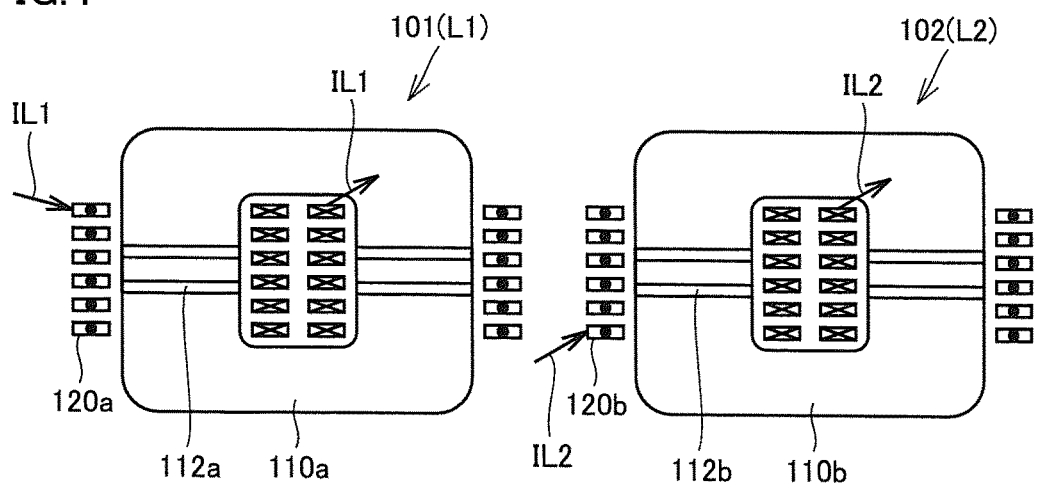
FIG. 4 is a conceptual diagram illustrating the configuration of two reactors configured as separate magnetic components as a comparative example.

First, as a comparative example, to reliably avoid magnetic coupling between reactors L1 and L2, a configuration in the case where reactors L1 and L2 are formed as independent separate magnetic components will be described with reference to FIG. 4. Referring to FIG. 4, a magnetic component 101 constituting reactor L1 is formed by a core 110a and a winding 120a wound on core 110a. A gap 112a is provided in core 110a. Similarly, a magnetic component 102 constituting reactor L2 is formed by a core 110b and a winding 120b wound on core 110b. A gap 112b is provided in core 110b.

An inductance L of the reactor is expressed by the number of turns NT of the coil, a magnetic resistance R of the magnetic material, and a magnetic resistance r of the gap, in accordance with Equation (3) below.

[Math.3]

$$L = NT \times NT/(R+r) \quad (3)$$

It is known that magnetic resistance R can be adjusted by the magnetic property (relative permeability), size and shape (magnetic path length and cross-sectional area) of cores 110a and 110b. Magnetic resistance r can be adjusted by the gap length and the number of gaps 112a and 112b.

Since the magnetic material used for cores 110a and 110b has nonlinear characteristics, the characteristics will be degraded due to a saturation phenomenon if an excess magnetic flux is produced. Therefore, it is necessary to design an effective sectional area SC of the core such that a maximum magnetic flux density B(max) when a design maximum current I(max) flows does not exceed the saturation magnetic flux density of the core. B(max) is obtained by Equation (4) below.

[Math.4]

$$B(max) = I(max) \times N/(R+r)/SC \quad (4)$$

In this way, when reactors L1 and L2 are formed by separate magnetic components 101 and 102, interference of induced voltage can be avoided, and a desired inductance can be obtained while avoiding magnetic saturation because of the design of each magnetic component. That is, the inductance can relatively easily be designed. On the other hand, power converters 6, 7 and power supply system 5 may be increased in size due to size increase of reactors L1 and L2 because two cores are required.

The present embodiment will describe a mechanism for achieving reduction in size and weight by forming reactors L1 and L2 integrally by a composite magnetic component using a shared core, and taking advantage of magnetic coupling between the reactors.

Figure 5:
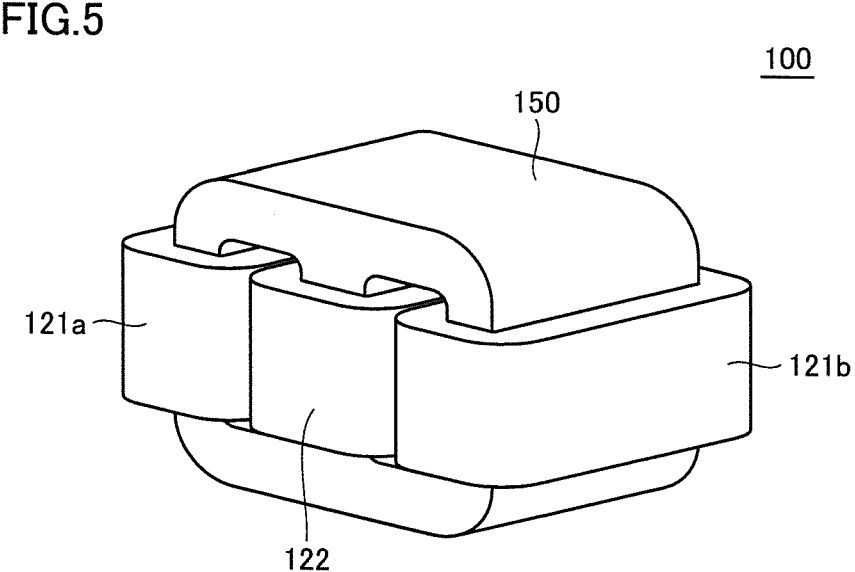
FIG. 5 shows an example of a schematic outline view of a variable magnetic coupling reactor according to a first embodiment of the invention.

FIG. 5 shows an example of a schematic outline view of a variable magnetic coupling reactor according to a first embodiment of the present invention.

As will become apparent from the following description, in the embodiment of the present invention, the composite magnetic component having two reactors formed integrally operate in a specific use mode to thereby constitute the variable magnetic coupling reactor. Hereinafter, the composite magnetic component will also be referred to as a variable magnetic coupling reactor. A perspective view of variable magnetic coupling reactor 100 is shown in FIG. 5.

Referring to FIG. 5, variable magnetic coupling reactor 100 according to the first embodiment includes a core 150 and windings 121a, 121b and 122. Windings 121a and 121b are electrically connected in series to constitute the coil of reactor L1. Winding 122 constitutes the coil of reactor L2. As is understood from FIG. 5, windings 121a and 121b constituting reactor L1 and winding 122 constituting reactor L2 are wound on different regions of shared core 150, respectively.

Figure 6:
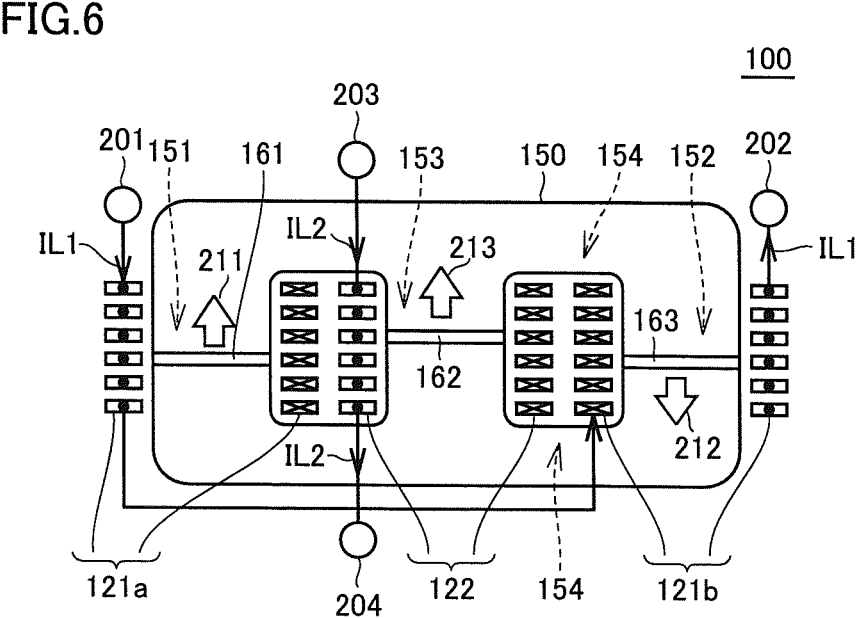
FIG. 6 is a conceptual cross-sectional view for further illustrating the configuration of the variable magnetic coupling reactor shown in FIG. 5.

FIG. 6 is a conceptual cross-sectional view for further illustrating the configuration of variable magnetic coupling reactor 100 shown in FIG. 5.

Referring to FIG. 6, core 150 has magnetic leg portions 151, 152, 153, and 154. Gaps 161 to 163 are provided in magnetic leg portions 151 to 153, respectively. As described above, gaps 161 to 163 are useful in terms of adjustment of inductance.

Winding 121a is wound on magnetic leg portion 151. Winding 121b is wound on magnetic leg portion 152. Windings 121a and 121b are electrically connected in series across terminals 201 and 202. Therefore, reactor current IL1 flowing through reactor L1 flows from terminal 201 to terminal 202 passing through windings 121a and 121b. With the flow of reactor current Ill, a magnetic field 211 is produced from winding 121a, and a magnetic field 212 is produced from winding 121b.

Winding 122 is wound on magnetic leg portion 153. Winding 122 is electrically connected across terminals 203 and 204. Therefore, reactor current IL2 flowing through reactor L2 flows from terminal 203 to terminal 204 passing through winding 122. With the flow of reactor current IL2, a magnetic field 213 is produced by winding 122. In this way, magnetic leg portions 151 to 153 respectively correspond to the wound regions of windings 121a, 121b and 122 on core 150. On the other hand, magnetic leg portion 154 corresponds to a winding non-wound region on core 150, and functions to create a magnetic path among magnetic leg portions 151 to 153 on which the windings are wound.

Windings 121a and 121b are configured such that, when common reactor current IL1 flows through windings 121a and 121b, the current flowing direction in winding 121a and the current flowing direction in winding 121b are opposite to each other.

In winding 122, when reactor current IL2 flows in the same direction as reactor current IL1 (e.g., IL1>0 and IL2>0), the current direction is the same as that in one of windings 121a and 121b, but is opposite to that in the other one. Hereinafter, an example in which the current flowing direction is the same in windings 121a and 122 will be presented. That is, winding 121a corresponds to a "first winding", and winding 121b corresponds to a "second winding." Winding 122 corresponds to a "third winding."

Figure 7:
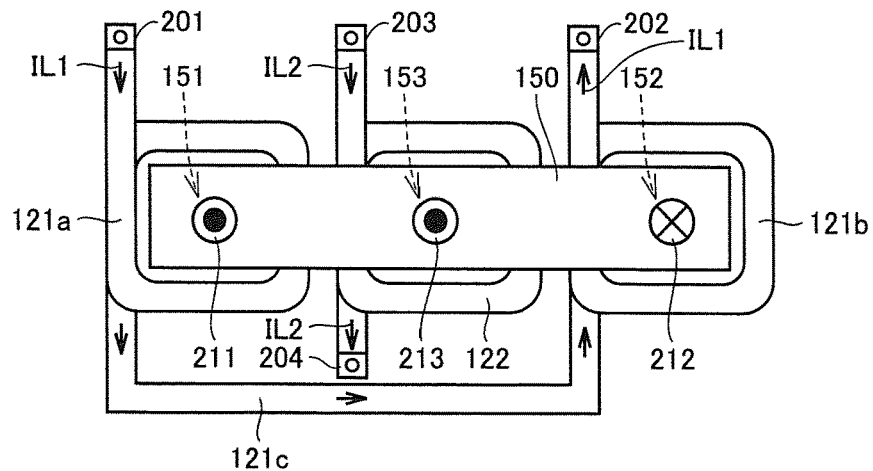
FIG. 7 is a conceptual diagram for illustrating an example of a winding mode of each winding shown in FIG. 6.

FIG. 7 is a conceptual diagram for illustrating an example of a winding mode of each winding shown in FIG. 6. FIG. 7 corresponds to a top view of variable magnetic coupling reactor 100 shown in FIGS. 5 and 6.

Referring to FIG. 7, reactor current IL1 is flown between terminals 201 and 202. Windings 121a and 121b are electrically connected in series with a lead wire 121c. On this occasion, lead wire 121c is connected across windings 121a and 121b such that the current directions in the coils formed by windings 121a and 121b, respectively, become opposite each other.

As a result, as shown in FIG. 7, magnetic field 211 produced by winding 121a has a direction with the upper surface side of the core (the upper side in FIG. 6) serving as an N pole and the lower surface side of the core (the lower side in FIG. 6) serving as an S pole. On the other hand, magnetic field 212 produced by winding 121b has a direction with the upper surface side of the core (the upper side in FIG. 6) serving as the S pole and the lower surface side of the core (the lower side in FIG. 6) serving as the N pole. That is, with the flow of reactor current Ill, magnetic fields 211 and 212 generated from windings 121a and 121b, respectively, have opposite directions to each other.

Furthermore, reactor current IL2 is flown between terminals 203 and 204 in the same direction as reactor current IL1 (e.g., IL1>0, IL2>0). Magnetic field 213 is thereby produced from winding 122. Magnetic field 213 has a direction with the upper surface side of the core (the upper side in FIG. 6) serving as the N pole and the lower surface side of the core (the lower side in FIG. 6) serving as the S pole. That is, because of reactor currents IL1 and IL2 flowing in the same direction, magnetic field 213 produced by winding 122 is in the same direction as magnetic field 211 produced by winding 121a, but is in the opposite direction to magnetic field 212 produced by winding 121b.

Figure 8:
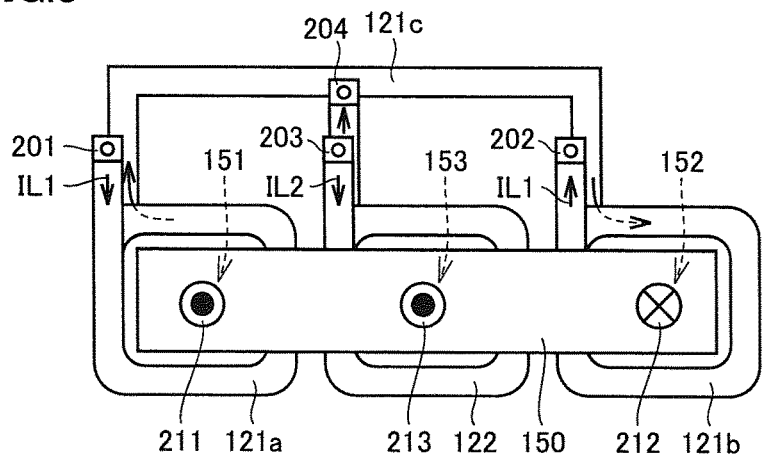
FIG. 8 is a conceptual diagram for illustrating another example of the winding mode of each winding shown in FIG. 6.

FIG. 8 is a conceptual diagram for illustrating another example of the winding mode of each winding shown in FIG. 6.

In the example shown in FIG. 8, terminal 204 and lead wire 121c are provided at different positions from FIG. 7. In FIG. 8, upon setting the current directions in respective windings 121a, 121b and 122, that is, the directions of magnetic fields 211 to 213 to be similar to those in FIG. 7, the number of turns of each of windings 121a, 121b and 122 is made strictly identical. Conversely saying, in the configuration of FIG. 7, the number of turns of windings 121a and 121b is larger than that of winding 122 by a quarter turn.

Figure 9:
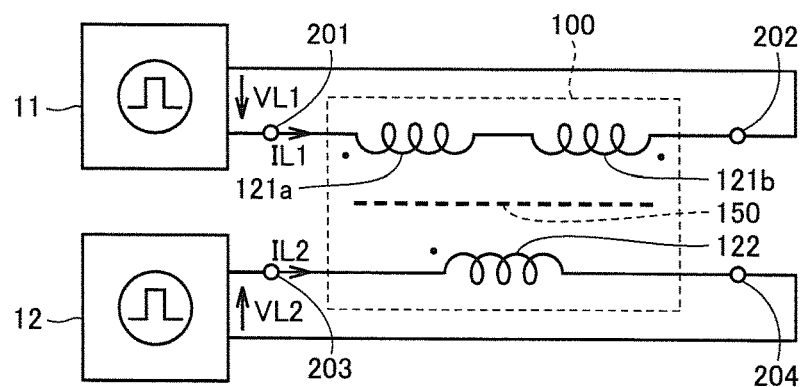
FIG. 9 is an electric equivalent circuit diagram of a variable magnetic coupling reactor 100 according to the first embodiment.

FIG. 9 is an electric equivalent circuit diagram of variable magnetic coupling reactor 100 according to the first embodiment.

Referring to FIG. 9, windings 121a and 121b connected in series across terminals 201 and 202 constitute reactor L1. A voltage source 11 applies a reactor voltage VL1 across terminals 201 and 202. For example, voltage source 11 is configured to generate pulsed reactor voltage VL1 by on/off control of switching elements Q1 and Q2 of power converter 6. Specifically, in power converter 6 of FIG. 1, VL1=V[1] holds (VL1>0) in the on-period of switching element Q2. On the other hand, in the off-period of switching element Q2 (in the on-period of switching element Q1), V[1]−VL1=VH holds, and then, VL1=V[1]−VH holds (VL1<0).

Similarly, winding 122 connected across terminal 203 and 204 constitutes reactor L2. A voltage source 12 applies reactor voltage VL2 across terminals 203 and 204. For example, voltage source 12 is configured to generate pulsed reactor voltage VL2 by on/off control of switching elements Q3 and Q4 of power converter 7. Specifically, in power converter 7 of FIG. 1, VL2=V[2] holds (VL2>0) in the on-period of switching element Q4. On the other hand, in the off-period of switching element Q4 (in the on-period of switching element Q3), V[2]−VL2=VH holds, and then VL2=V[2]−VH holds (VL2<0).

Here, windings 121a, 121b and 122 are wound on shared core 150 in which magnetic leg portions 151 to 153 are formed integrally as shown in FIG. 6. Therefore, the magnetic fluxes produced by windings 121a, 121b and 122 will interfere with each other.

Next, the relationship between magnetic fluxes produced from the respective windings within the core will be described with reference to FIGS. 10 and 11.

Figure 10:
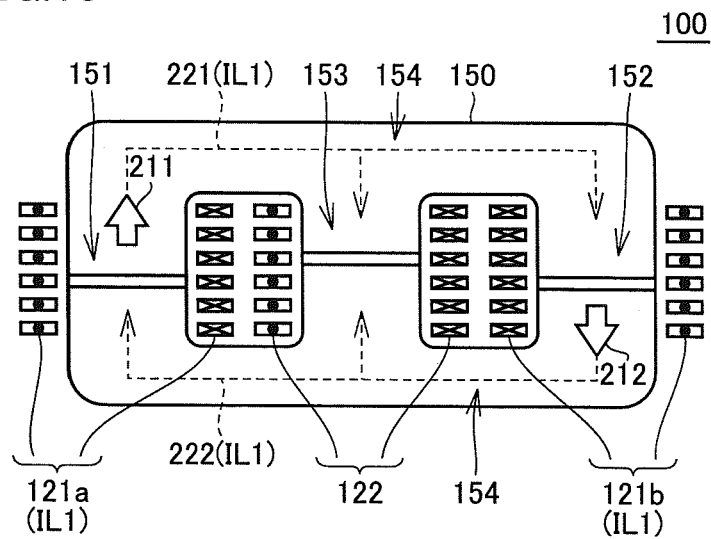
FIG. 10 is a conceptual first cross-sectional view for illustrating the relationship between magnetic fluxes produced from the respective windings within a core.
Figure 11:
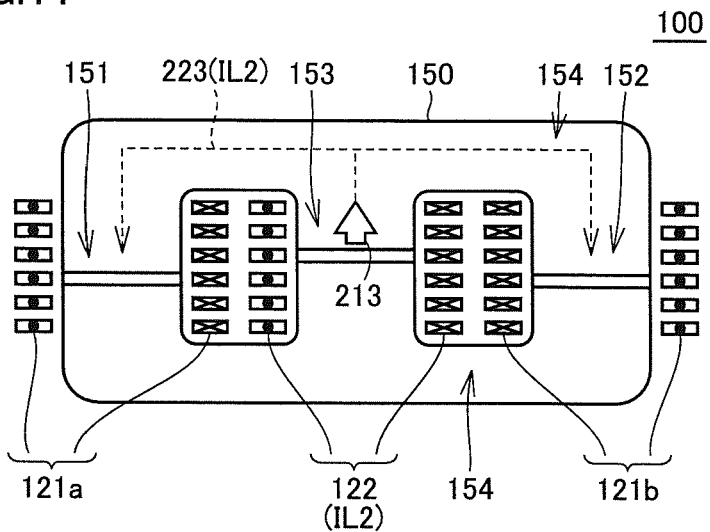
FIG. 11 is a conceptual second cross-sectional view for illustrating the relationship between magnetic fluxes produced from the respective windings within the core.

Conceptual cross-sectional views similar to FIG. 6 are shown in FIGS. 10 and 11. FIG. 10 shows a magnetic flux produced by reactor L1 in the core, and FIG. 11 shows a magnetic flux produced by reactor L2 in the core.

Referring to FIG. 10, a magnetic flux 221 caused by magnetic field 211 produced from winding 121a wound on magnetic leg portion 151 also acts upon magnetic leg portions 152 and 153 passing through magnetic leg portion 154. Similarly, a magnetic flux 222 caused by magnetic field 212 produced from winding 121b wound on magnetic leg portion 152 also acts upon magnetic leg portions 151 and 153 passing through magnetic leg portion 154. Magnetic fields 211 and 212 form a round route including magnetic leg portions 151 and 152 within core 150.

In each of magnetic leg portions 151 and 152, magnetic fluxes 221 and 222 caused by magnetic fields 211 and 212 act in the same direction. That is, magnetic fields 211 and 212 reinforce each other in each of magnetic leg portions 151 and 152.

On the other hand, in magnetic leg portion 153, magnetic fluxes 221 and 222 caused by magnetic fields 211 and 212 act in the opposite directions to each other. That is, magnetic fields 211 and 212 weaken each other in magnetic leg portion 153.

Referring to FIG. 11, a magnetic flux 223 caused by magnetic field 213 produced from winding 122 wound on magnetic leg portion 153 also acts upon magnetic leg portions 151 and 152 passing through magnetic leg portion 154.

Summarizing FIGS. 10 and 11, in magnetic leg portion 153 corresponding to reactor L2, magnetic flux 221 from winding 121a and magnetic flux 222 from winding 121b counteract each other, while magnetic flux 223 caused by winding 122 passes therethrough. That is, the magnitude of magnetic field in magnetic leg portion 153 corresponds to magnetic field 213 produced by reactor current IL2.

On the other hand, magnetic leg portions 151 and 152 corresponding to reactor L1 become unbalanced in magnitude of magnetic fields because of interference with the magnetic flux from reactor L2. In magnetic leg portion 152, magnetic fields 211, 212 and magnetic field 213 reinforce each other since magnetic fluxes 221 and 222 caused by magnetic fields 211 and 212 are in the same direction as magnetic flux 223 caused by magnetic field 213 (FIG. 11). On the other hand, in magnetic leg portion 151, magnetic fields 211, 212 and magnetic field 213 weaken each other since magnetic fluxes 221 and 222 caused by magnetic fields 211 and 212 are in the opposite direction to magnetic flux 223 caused by magnetic field 213 (FIG. 11). Magnetic leg portion 151 corresponds to a "first magnetic leg portion", and magnetic leg portion 152 corresponds to a "second magnetic leg portion." Magnetic leg portion 153 corresponds to a "third magnetic leg portion."

In this way, in variable magnetic coupling reactor 100 of the present embodiment, in one of magnetic leg portions 151 and 152 on which windings 121a and 121b constituting reactor L1 are wound (in the present embodiment, magnetic leg portion 152), the magnetic fields caused by reactor currents IL1 and IL2, respectively, reinforce each other. On the other hand, in the other magnetic leg portion (in the present embodiment, magnetic leg portion 151), the magnetic fields caused by reactor currents IL1 and IL2 counteract each other. With such a mutual magnetization action, magnetic leg portions 151 and 152 become unbalanced in magnitude of magnetic fields with reactor currents IL1 and IL2 flowing.

(Operation Principle Formula in Variable Magnetic Saturation Circuit)

Next, in order to analyze the above-described magnetic field interaction in variable magnetic coupling reactor 100 according to the present embodiment, the operation principle formula of variable magnetic coupling reactor 100 will be described.

Figure 12:
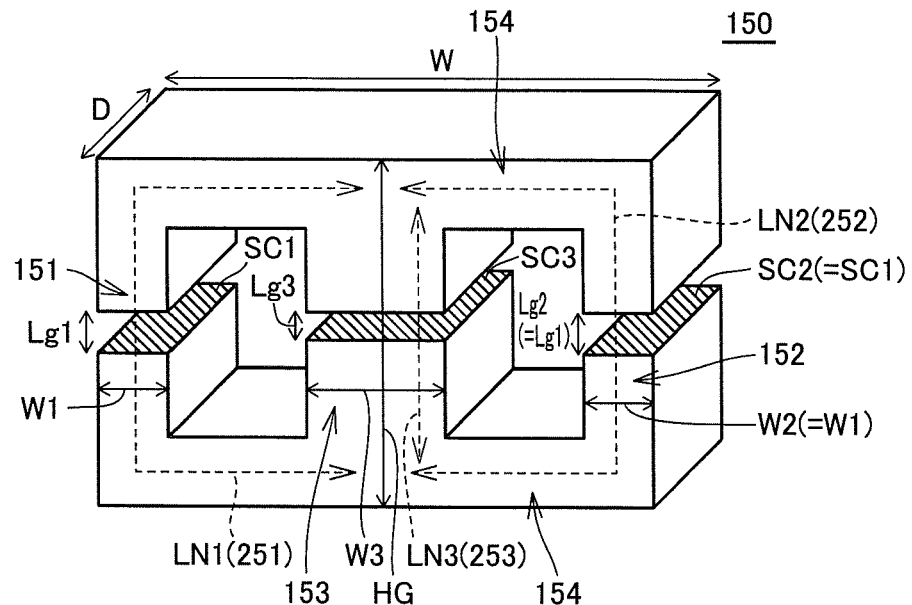
FIG. 12 is a perspective view for illustrating geometry parameters of the core.
Figure 13:
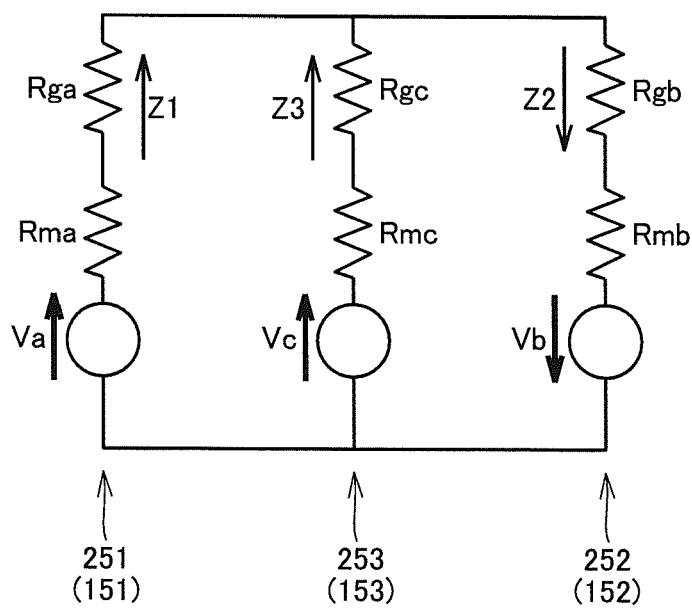
FIG. 13 is a magnetic equivalent circuit diagram in the core shown in FIG. 12.

FIG. 12 is a perspective view for illustrating geometry parameters of the core 150. FIG. 13 shows a magnetic equivalent circuit diagram in core 150 shown in FIG. 12.

Referring to FIG. 12, core 150 is formed by combination of rectangular shapes, for example. That is, magnetic leg portions 151 to 153 having a height HG are formed in a columnar shape in the same direction between the upper and lower bases of width W×depth D. Magnetic leg portion 154 is provided to extend in a direction crossing magnetic leg portions 151 to 153. Magnetic leg portion 154 is formed to connect the one ends of magnetic leg portions 151 to 153 to one another and the other ends of magnetic leg portions 151 to 153 to one another.

Magnetic leg portions 151 to 153 have cross-sectional areas SC1 to SC3, respectively. Magnetic leg portions 151 to 153 have widths of W1 to W3, respectively. Gaps 161 to 163 provided in magnetic leg portions 151 to 153 have gap lengths Lg1 to Lg3, respectively. Magnetic circuits 251 to 253 formed by magnetic leg portions 151 to 153, respectively, have magnetic path lengths of LN1 to LN3, respectively. It is noted that magnetic leg portions 151 and 152 are formed in an identical shape. That is, Lg1=Lg2 and SC1=SC2 hold (W1=W2).

Using the geometry parameter values shown in FIG. 12, cross-sectional areas SC1 to SC3 of magnetic leg portions 151 to 153 are expressed by Equations (5) and (6) below. Magnetic path lengths LN1 to LN3 are expressed by Equations (7) and (8) below.

[Math.5]

$$SC1 = SC2 = W1 \times D \tag{5}$$

$$SC3 = W3 \times D \tag{6}$$

$$LN1 = LN2 = W + HG - Lg1 \tag{7}$$

$$LN3 = HG - Lg3 \tag{8}$$

Next, referring to FIG. 13, in magnetic circuit 251 formed by magnetic leg portion 151, a magnetic flux Z1 passes through a magnetic resistance Rma having magnetic path length LN1 and a magnetic resistance Rga having gap length Lg1 connected in series. Similarly, in magnetic circuit 252 formed by magnetic leg portion 152, a magnetic flux Z2 passes through a magnetic resistance Rmb having magnetic path length LN2 and a magnetic resistance Rgb having gap length Lg2 connected in series. In magnetic circuit 253 formed by magnetic leg portion 153, a magnetic flux Z3 passes through a magnetic resistance Rmc having magnetic path length LN3 and a magnetic resistance Rgc having gap length Lg3 connected in series. As understood from the directions of magnetic fields shown in FIG. 10, magnetic fluxes Z1 and Z2 forming a loop have different directions from each other in respective magnetic circuits 251 and 252.

Magnetic resistances Rma, Rmb and Rmc in FIG. 13 are expressed by Equations (9) to (11) below. Magnetic resistances Rga, Rgb and Rgc of the gap portions are expressed by Equations (12) and (13) below.

[Math. 6]

$$Rma = \frac{LN1}{M0 \times Mr1 \times SC1} \tag{9}$$

$$Rmb = \frac{LN2}{M0 \times Mr2 \times SC2} \tag{10}$$

$$Rmc = \frac{LN3}{M0 \times Mr3 \times SC3} \tag{11}$$

$$Rga = Rgb = \frac{Lg1}{M0 \times SC1} \tag{12}$$

$$Rgc = \frac{Lg3}{M0 \times SC3} \tag{13}$$

In Equations (9) to (13), M0 indicates the permeability in a vacuum and Mr1 to Mr3 indicate the relative permeability in magnetic leg portions 151 to 153 (magnetic circuits 251 to 253), respectively. Magnetic leg portions 151, 152 and 153 (magnetic circuits 251, 252 and 253) have permeabilities of M0×Mr1, M0×Mr2 and M0×Mr3, respectively.

As will be described later, relative permeability properties depend on the quality of material of core 150. When the magnetizing characteristics of core 150 have nonlinearity, the relative permeability changes also depending on Mr1 to Mr3 and the magnitude of magnetic fields (magnetic flux density). On the other hand, L1 to L3, SC1 to SC3, and Lg1 to Lg3 are fixed values depending on the core shape shown in FIG. 12. Therefore, magnetic resistances Rga to Rgc may change as a function of permeabilities of M0×Mr1, M0×Mr2, and M0×Mr3 in magnetic leg portions 151, 152 and 153.

Magnetic resistances R1 to R3 of magnetic circuits 251 to 253 are expressed by Equations (14) to (16) below. To simplify the description hereinafter, a parameter Rk based on magnetic resistances R1 to R3 is introduced, as expressed in Equation (17).

[Math.7]

$$R1 = Rma + Rga \tag{14}$$

$$R2 = Rmb + Rgb \tag{15}$$

$$R3 = Rmc + Rgc \tag{16}$$

$$Rk = R1 \times R2 + R2 \times R3 + R3 \times R1 \tag{17}$$

From the foregoing, magnetic resistances R1 to R3 and parameter Rk may be variables depending on relative permeabilities Mr1 to Mr3.

In order to find the inductance of variable magnetic coupling reactor 100 according to the present embodiment, the inductances caused by windings 121a, 121b and 122 are calculated. Each inductance is obtained by the sum of a self-inductance caused by each winding and a mutual inductance between the windings.

Respective self-inductances La, Lb and Lc of windings 121a, 121b and 122 are expressed by Equations (18) to (20) below using the parameters in Equations (15) to (17). Hereinafter, the sum of the number of turns of windings 121a, 121b and 122 is denoted by NT1, and the number of turns of winding 122 is denoted by NT3.

[Math. 8]

$$La = NT1^2 \times \frac{R2 + R3}{Rk} \quad (18)$$

$$Lb = NT1^2 \times \frac{R3 + R1}{Rk} \quad (19)$$

$$Lc = NT3^2 \times \frac{R1 + R2}{Rk} \quad (20)$$

Mutual inductances are expressed by Equations (21) to (23) below using the parameters in Equations (15) to (17). Mutual inductances Mab and Mba between windings 121a and 121b are expressed in Equation (21). Mutual inductances Mbc and Mcb between winding 121b and 122 are expressed in Equation (22). Mutual inductances Mca and Mac between winding 122 and 121a are expressed in Equation (23).

[Math. 9]

$$Mab = Mba = NT1^2 \times \frac{R3}{Rk} \quad (21)$$

$$Mbc = Mcb = NT1 \times NT3 \times \frac{R1}{Rk} \quad (22)$$

$$Mca = Mac = NT1 \times NT3 \times \frac{R2}{Rk} \quad (23)$$

Referring again to FIG. 13, an induced voltage Va is produced in magnetic circuit 251, an induced voltage Vb is produced in magnetic circuit 252, and an induced voltage Vc is produced in magnetic circuit 253. Based on the directions of electric current, shown in FIGS. 10 and 11, induced voltages Va and Vc are in the same direction, and induced voltage Vb is in the opposite direction to induced voltages Va and Vc.

The sum of induced voltages Va and Vb in magnetic circuits 251 and 252 is in balance with voltage VL1 applied to reactor L1 described above. Similarly, induced voltage Vc in magnetic circuit 253 is in balance with voltage VL2 of reactor L2.

Next, above-described Equations (18) to (20) are used to obtain Equations (24) and (25) as relational expressions of voltages Vx, Vy applied to reactors L1, L2 and currents ix, iy flowing therethrough. Voltages Vx and Vy correspond to reactor voltages VL1 and VL2, and currents ix and iy correspond to reactor currents IL1 and IL2.

[Math. 10]

$$Vx = (La + Lb + 2Mab)\frac{dix}{dt} + (Mbc + Mca)\frac{diy}{dt} \quad (24)$$

$$Vy = (Mbc - Mca)\frac{dix}{dt} + Lc\frac{diy}{dt} \quad (25)$$

When Equations (24) and (25) are transformed to solve current change rates dix/dt and diy/dt, Expressions (26) and (27) below will be obtained.

[Math. 11]

$$\frac{dix}{dt} = \frac{1}{DET}\{LcVx - (Mbc - Mca)Vy\} \quad (26)$$

$$\frac{diy}{dt} = \frac{1}{DET}\{-(Mbc - Mca)Vx + (La + Lb + Mab)Vy\} \quad (27)$$

Here, respective parameters Lc, (Mbc-Mcb), DET, and (La+Lb+Mab) used in Equations (26) and (27) can be expressed by Equations (28) to (31) below.

[Math. 12]

$$Mbc - Mca = NT1 \times NT3\frac{(R1 - R2)}{Rk} \quad (28)$$

$$La + Lb + Mab = NT1^2\frac{(R1 + R2 + 4 \times R3)}{Rk} \quad (29)$$

$$Lc = NT3^2 \times \frac{R1 + R2}{Rk} \quad (30)$$

$$\begin{aligned} DET &= \left[\frac{N1 \times N3}{Rk}\right]^2 \{(R1 + R2 + 4R3)(R1 + R3) - (R1 - R2)^2\} \\ &= \left[\frac{N1 \times N3}{Rk}\right]^2 \{4R1 \times R2 + 4R1 \times R3 + R2 \times R3\} \\ &= \frac{4}{Rk}(NT1 \times NT3)^2 \end{aligned} \quad (31)$$

When Equations (28) to (31) are substituted into Equations (26) and (27), Equation (32) below will be obtained.

[Math. 13]

$$\begin{pmatrix} \frac{dix}{dt} \\ \frac{diy}{dt} \end{pmatrix} = \begin{pmatrix} \frac{R1 + R2}{4NT1^2} & \frac{R2 - R1}{4NT1 \times NT3} \\ \frac{R2 - R1}{4NT1 \times NT3} & \frac{R1 + R2 + 4R3}{4NT3^2} \end{pmatrix} \begin{pmatrix} Vx \\ Vy \end{pmatrix} \quad (32)$$

Here, in order to simplify analysis, assuming that the number of turns of windings of reactors L1 and L2 is equal, that is, assuming that NT1=NT3 holds, Equation (32) will be deformed into Equation (33) below.

[Math. 14]

$$\begin{pmatrix} \frac{dix}{dt} \\ \frac{diy}{dt} \end{pmatrix} = \frac{1}{4NT^2}\begin{pmatrix} R1 + R2 & R2 - R1 \\ R2 - R1 & R1 + R2 + 4R3 \end{pmatrix}\begin{pmatrix} Vx \\ Vy \end{pmatrix} \quad (33)$$

As is understood from Equation (33), when R1=R2 holds, that is, when magnetic resistances R1 and R2 of magnetic circuits 251 and 252 formed by magnetic leg portions 151 and 152 are equivalent, dix/dt corresponding to the current change rate of reactor current IL1 is determined by Vx of reactor L1, without being affected by voltage Vy of reactor L2. Similarly, diy/dt corresponding to the current change rate of reactor current IL2 is determined by voltage Vy of reactor L2, without being affected by voltage Vx of reactor L1. That is, magnetic coupling does not occur between reactors L1 and L2, and reactors L1 and L2 operate in a magnetically non-interfering state (magnetically uncoupled mode).

On the other hand, when a difference arises between magnetic resistances R1 and R2, R2−R1 becomes unequal to 0. Then, voltage Vx of reactor L1 will affect the current change rate (diy/dt), and voltage Vx of reactor L2 will affect the current change rate (dix/dt). That is, magnetic coupling occurs between reactors L1 and L2, which brings reactors L1 and L2 to magnetically interfere with each other (magnetically coupled mode). As a result, the voltage-current behavior of reactors L1 and L2 will change. In order to express the inductances, substituting Mxy for Mbc-Mca in Equations (24) and (25), Equations (24) and Equations (25) can be expressed by Equation (34).

[Math. 15]

$$\begin{pmatrix} Vx \\ Vy \end{pmatrix} = \begin{pmatrix} La + Lb + 2Mab & Mxy \\ Mxy & Lc \end{pmatrix} \begin{pmatrix} \frac{dix}{dt} \\ \frac{diy}{dt} \end{pmatrix} \quad (34)$$

In Equation (34), Mxy corresponds to the mutual interference term resulting from the above-described magnetic coupling. That is, Mxy=0 holds when magnetic coupling does not occur. On this occasion, the inductance of reactor L1 corresponds to La+Lb+2×Mab which is a total value of the inductances caused by windings 121a and 121b. The inductance of reactor L2 corresponds to an inductance Lc caused by winding 122.

On the other hand, when magnetic interference resulting from the difference between magnetic resistances R1 and R2 occurs between inductances L1 and L2, Mxy becomes unequal to 0, so that the respective inductances of reactors L1 and L2 will change from those when Mxy=0 holds (magnetically uncoupled).

Here, as described above, magnetic resistances R1 and R2 change in accordance with the permeabilities (relative permeabilities) of magnetic leg portions 151 and 152. It is therefore understood that when a difference arises between permeabilities (relative permeabilities) of magnetic leg portions 151 and 152, a difference will arise between magnetic resistances R1 and R2.

Furthermore, as described with reference to FIGS. 10 and 11, in the variable magnetic coupling reactor according to the present embodiment, magnetic leg portions 151 and 152 corresponding to reactor L1 become unbalanced in magnitude of magnetic fields because of the action with the magnetic flux from reactor L2. Therefore, when a difference arises in permeabilities (relative permeabilities) resulting from such unbalance in magnetic fields, R1 becomes unequal to R2, so that magnetic interference due to magnetic coupling will occur.

Here, the relationship among magnetic field, magnetic flux density and permeability will be described with reference to FIGS. 14 and 15.

Figure 14:
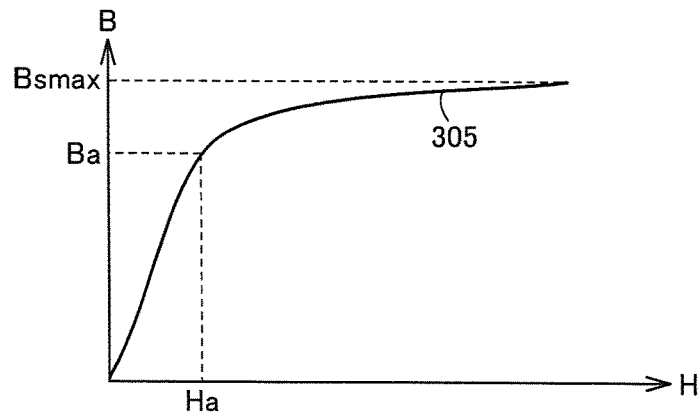
FIG. 14 is a conceptual diagram showing a typical magnetization curve (B-H curve) for a ferromagnetic substance.

A typical magnetization curve (B-H curve) of a ferromagnetic substance is shown in FIG. 14. A magnetization curve 305 (a so-called initial magnetization curve) at the time of magnetization from the state where no magnetic field is applied is shown in FIG. 14.

Referring to FIG. 14, a magnetic flux density B increases as a magnetic field H increases. As magnetic field H increases, however, the rate of increase in magnetic flux density B will decrease gradually. Then, eventually, the B-H curve will become horizontal, that is, a phenomenon called magnetic saturation in which the magnetic flux density no longer increases even if the magnetic field increases occurs. The magnetic flux density at the time of magnetic saturation is called a saturation magnetic flux density Bsmax.

The gradient of the tangent in the magnetization curve (B-H curve) shown in FIG. 14 corresponds to the permeability of the magnetic substance (core 150).

Figure 15:
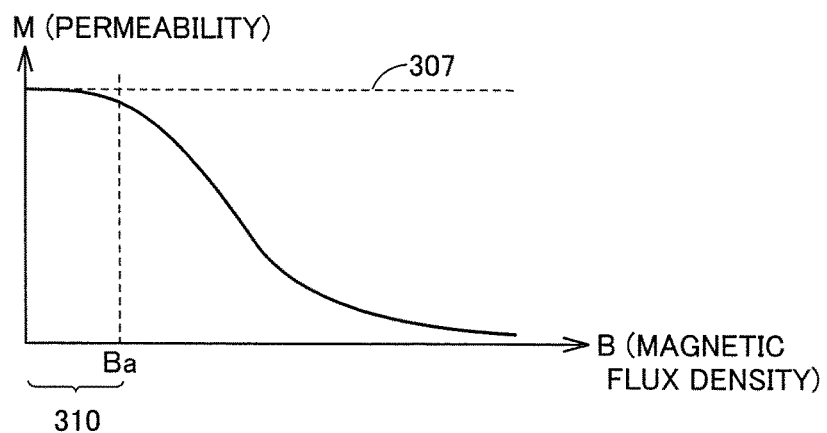
FIG. 15 is a conceptual diagram showing characteristics of change in permeability with respect to change in magnetic flux density on the magnetization curve shown in FIG. 14.

FIG. 15 shows characteristics of change in permeability with respect to the change in magnetic flux density on the magnetization curve shown in FIG. 14.

Referring to FIG. 15, in a region 310 where magnetic field H<Ha holds, that is, magnetic flux density B<Ba holds, magnetic flux density B changes almost linearly with respect to the change in magnetic field H. In region 310, permeability M is a substantially constant value. Hereinafter, such a region will also be referred to as "linear region 310."

On the other hand, in a region where H>Ha holds, that is, B>Ba holds, the rate of increase in magnetic flux density B with respect to the increase in magnetic field H, that is, permeability M, falls below linear region 310. Moreover, permeability M further decreases with respect to the increase in magnetic field H. Hereinafter, such a region will also be referred to as a "nonlinear region" or a "saturation region." If the magnetic flux density further increases, permeability M will further decrease. When B=Bsmax holds, permeability M will become equal to approximately 0. A magnetic material having the above characteristics, that is, the nonlinear region, is generally called a nonlinear magnetic material.

On the other hand, provided that a magnetic material (linear magnetic material) not having such a nonlinear region is used, permeability M will be kept constant with respect to change in magnetic flux density B as indicated by a dotted line 307 in FIG. 15. Alternatively, also in the case of using magnetic flux density B with restriction such that operating points are maintained in the linear region, the reactors can be operated keeping the permeability constant as indicated in the dotted line 307.

In the state where reactor currents IL1 and IL2 flow as described with reference to FIGS. 10 and 11, magnetic leg portions 151 and 152 corresponding to reactor L1 become unbalanced in magnitude of magnetic fields. Specifically, in magnetic leg portion 152, since the magnetic field caused by reactor current IL1 and the magnetic field caused by reactor current IL2 reinforce each other, the magnetic fields increase. On the other hand, in magnetic leg portion 151, since the magnetic field caused by reactor current IL1 and the magnetic field caused by reactor current IL2 weaken each other, the magnetic fields decrease.

As described above, magnetic resistance R1 of magnetic circuit 251 formed by magnetic leg portion 151 (Equations (9), (14)) is a variable of permeability M0×Mr1, and magnetic resistance R2 of magnetic circuit 252 formed by magnetic leg portion 152 (Equations (10), (15)) is a variable of permeability M0×Mr2. Further consideration will be given to the relationship of the magnitude of magnetic fields in magnetic leg portions 151 and 152 with relative permeabilities Mr1 and Mr2.

Figure 16:
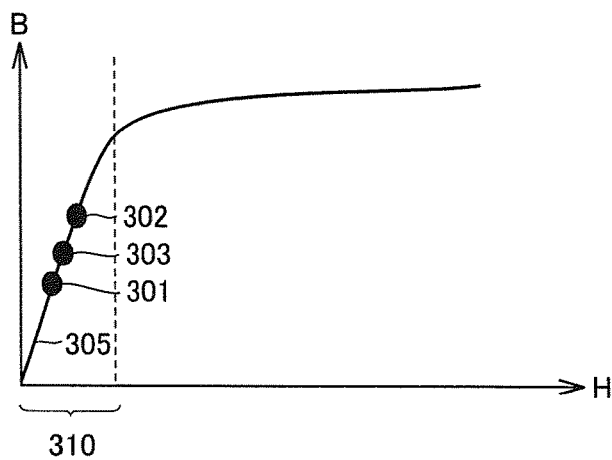
FIG. 16 is a conceptual diagram illustrating a magnetic operating point of each magnetic leg portion of the core in a region where reactor currents are small.

FIG. 16 is a conceptual diagram illustrating a magnetic operating point of each magnetic leg portion of the core in a region where reactor currents IL1 and IL2 are small. Respective magnetic operating points 301 to 303 of magnetic leg portions 151 to 153 are shown on the B-H curve in FIG. 16.

Referring to FIG. 16, operating point 302 of magnetic leg portion 152 where the magnetic fields reinforce each other has larger magnetic flux density B on the B-H curve than the operating point of magnetic leg portion 153. On the other hand, operating point 301 of magnetic leg portion 151 where the magnetic fields weaken each other has smaller magnetic flux density B on the B-H curve than the operating point of magnetic leg portion 153. As described above, since magnetic flux 221 from winding 121a and magnetic flux 222 from winding 121b counteract each other in magnetic leg portion 153, the magnitude of magnetic fields becomes equivalent to the magnetic field produced by reactor current IL2.

In a region where reactor currents IL1 and IL2 are small, operating points 301 and 302 are both located in linear region 310 shown in FIG. 14. Therefore, Mr1=Mr2 holds in Equations (9) and (10). Therefore, R1=R2 holds in Equations (14) and (15). As a result, as for the term (R2−R1) in Equation (33), R2−R1=0 holds. On this occasion, since Mbc−Mca=0 holds from Equation (28), Mxy=0 holds in Equation (34).

Therefore, in the state where operating points 301 to 303 of respective magnetic leg portions 151 to 153 are located in linear region 310, magnetic coupling does not occur between reactors L1 and L2, so that reactors L1 and L2 can be operated in a manner magnetically non-interfering with each other. On this occasion, magnetic leg portions 151 to 153 are in the state magnetized in linear region 310. That is, reactors L1 and L2 operate in the magnetically uncoupled mode.

These operating points 301 to 303 are influenced by the design of reactors L1 and L2, specifically, by the design of core 150, windings 121a, 121b, 122, and the like. For example, if cross-sectional areas SC1 and SC2 of magnetic leg portions 151 and 152 are designed such that operating points 301 to 303 are located in linear region 310 even at the time of maximum rating, that is, when a design maximum current I(max) passes, reactors L1 and L2 will be used while being maintained in the state magnetically non-interfering with each other. However, there is concern that such design of core 150 may cause size increase.

Therefore, the variable magnetic coupling reactor according to the present embodiment is designed such that reactors L1 and L2 operate also in the magnetically coupled mode.

It is noted that in the following description of the present specification, maximum current I(max) not only refers to the maximum rating current of each of reactors L1 and L2, but also refers to electric currents passing through reactors L1 and L2 at the time of the maximum output of the power supply system in which reactors L1 and L2 are incorporated (e.g., power supply system 5 shown in FIG. 1). For example, when the maximum allowable current of the system is defined by elements other than the reactors in the power supply system (e.g., switching elements), reactors L1 and L2 can be designed setting maximum current I(max) at a reactor current when the power supply system operates with the maximum allowable current even if there is a margin in the current capacities of reactors L1 and L2. That is, maximum current I(max) indicates the upper limit value of the working current range of reactors L1 and L2 assumed at the time of design.

Figure 17:
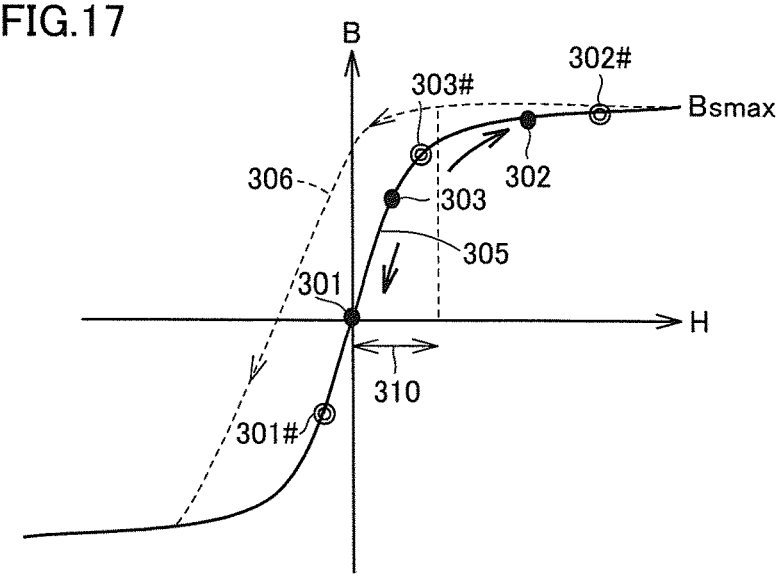
FIG. 17 is a conceptual diagram illustrating a magnetic operating point of each magnetic leg portion of the core in a region where reactor currents are large.

FIG. 17 is a conceptual diagram illustrating a magnetic operating point of each magnetic leg portion of the core in a region where the reactor currents are large.

Referring to FIG. 17, when reactor currents IL1 and IL2 increase, magnetic flux density B becomes even larger at operating point 302 of magnetic leg portion 152 where the magnetic fields reinforce each other, as compared with FIG. 16. On the other hand, magnetic flux density B at operating point 302 of magnetic leg portion 152 where the magnetic fields weaken each other becomes even smaller, as compared with FIG. 16. As a result, operating point 302 is in linear region 310, while operating point 301 falls out of linear region 310 to enter the saturation region. On this occasion, magnetic leg portion 151 is magnetized in the linear region, while magnetic leg portion 152 is magnetized in the nonlinear region (saturation region).

As shown in FIG. 15, when increase in magnetic flux density B causes operating point 301 to fall out of linear region 310 to enter the saturation region, permeability M, that is, the relative permeability of magnetic leg portion decreases. As a result, Mr1>Mr2 holds in Equations (9) and (10). Then, R2>R1 holds in Equations (14) and (15). As a result, as for the term (R2−R1) in Equation (33), R2−R1>0 holds. On this occasion, since Mbc−Mca>0 holds from Equations (28), Mxy<0 holds in Equation (34). Therefore, in the state where operating points 301 and 302 are located in the linear region and the saturation region, respectively, magnetic interference caused by magnetic coupling occurs between reactors L1 and L2. That is, reactors L1 and L2 operate in the magnetically coupled mode.

Next, the voltage-current behavior of reactors L1 and L2 when the above-described magnetic coupling occurs will be described.

Figure 18:
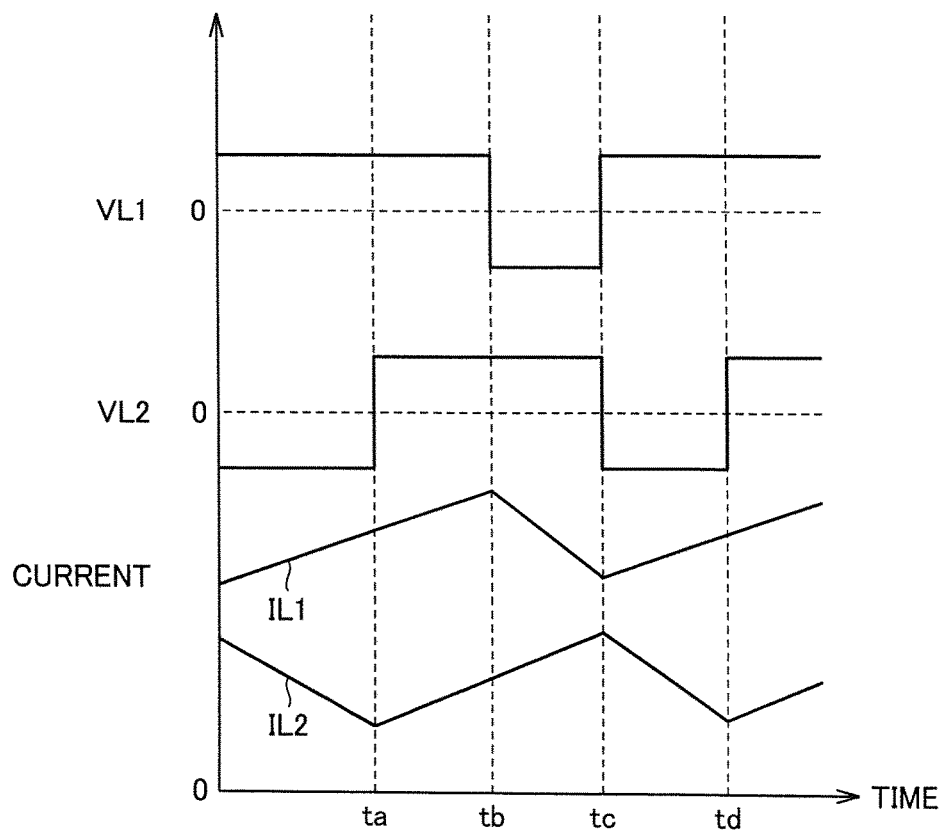
FIG. 18 shows an example of a diagram of operation waveforms of reactor voltages and reactor currents.

FIG. 18 shows an example of a diagram of operation waveforms of reactor voltages and reactor currents.

Referring to FIG. 18, as described above, reactor voltage VL1 has a pulsed waveform having a positive voltage period (VL1>0) and a negative voltage period (VL1<0) in accordance with on/off of switching elements Q1 and Q2 in power converter 6 shown in FIG. 1. Similarly, reactor voltage VL2 has a pulsed waveform having a positive voltage period (VL2>0) and a negative voltage period (VL2<0) in accordance with on/off of switching elements Q3 and Q4 in power converter 6.

Reactor current IL1 increases in a period when VL1>0 holds, and decreases in a period when VL1<0 holds. Similarly, reactor current IL2 increases in a period when VL2>0 holds, and decreases in a period when VL2<0 holds.

As a result, a period when the change rate (dIL1/dt) of reactor current IL1 and change rate (dIL2/dt) of reactor current IL2 have an identical sign, and a period when they have different signs will exist in accordance with the phase of reactor voltages VL1 and VL2.

In the example of FIG. 18, since dIL1/dt>0 and dIL2/dt>0 hold from time ta to time tb, the rates of change have an identical sign. On the other hand, since dIL1/dt<0 and dIL2/dt>0 hold from time tb to time tc, the rates of change have different signs. Moreover, since dIL1/dt>0 and dIL2/dt<0 also hold from time tc to time td, the rates of change have different signs.

Here, rates of change dIL1/dt and dIL2/dt of the reactor currents correspond to dix/dt and diy/dt in Equation (33) and (34), respectively. As described above, reactor voltages VL1 and VL2 correspond to Vx and Vy in Equation (33) and (34), respectively.

Referring again to Equation (33), considering the relationship of dix/dt with Vx and Vy, it is understood that, since R1+R2>0 always holds, |dix/dt| becomes smaller when Vx and Vy have different signs if R2−R1>0 holds, than when Vx and Vy have an identical sign. On this occasion, reactor currents IL1 and IL2 have a smaller gradient. Similarly, it is understood that |diy/dt| becomes smaller when Vx and Vy have different signs than when Vx and Vy have an identical sign.

Therefore, when the conditions that R2>R1 holds and the conditions that Vx and Vy have different signs overlap, reactor currents IL1 and IL2 have a smaller gradient. That is, the inductances of reactors L1 and L2 increase equivalently, and the ripple current decreases in amplitude.

On the other hand, if Vx and Vy have an identical sign when R2−R1>0 holds, |dix/dt| and |diy/dt| becomes larger than when Vx and Vy have different signs.

Therefore, in the state where magnetic coupling occurs between reactors L1 and L2, the term (R2−R1) resulting from magnetic interference will act in the direction in which the inductances are increased or in the direction in which the inductances are decreased, in accordance with the phase relationship between the reactor voltages (currents). In the configuration in which the output of power converter 6 which controls reactor current IL1 and the output of power converter 7 which controls reactor current IL2 may be controlled individually as in the example of FIG. 2, that is, in the configuration in which reactor currents IL1 and IL2 can be controlled independently, the phase relationship between the reactor voltages (currents) can also be controlled. Therefore, in the state where magnetic coupling occurs, it is possible to control the above-described phase relationship such that the inductances of reactors L1 and L2 increase equivalently in accordance with the term Mxy in Equation (34).

In this way, the variable magnetic coupling reactor according to the present embodiment is characterized in that reactors L1 and L2 operate both in the state where reactors L1 and L2 are magnetically uncoupled (the state where operating points 301 to 303 are located as shown in FIG. 16) and the state where reactors L1 and L2 are magnetically coupled (the state where operating points 301 to 303 are located as shown in FIG. 17).

As a result, it is unnecessary to ensure cross-sectional area SC2 such that operating point 302 at maximum current I(max) stays in linear region 310. For magnetic leg portion 151 in which the magnetic fields weaken each other, cross-sectional area SC1 can also be reduced on the assumption of an asymmetrical operation. Furthermore, since the above-described effect of equivalently increasing the inductances is also exerted, necessary inductances can be ensured even if core 150 is reduced in size. As a result, size reduction of the reactor for obtaining necessary inductances can be achieved.

Figure 19:
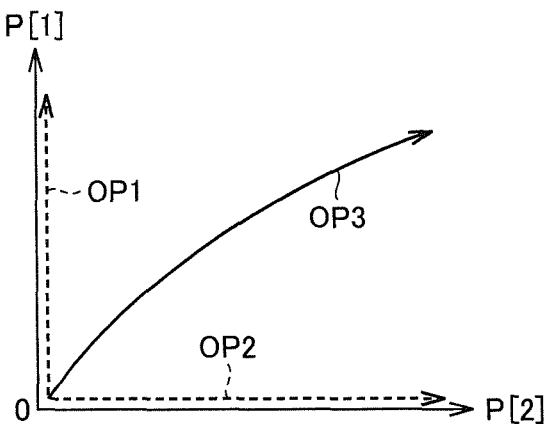
FIG. 19 is a conceptual diagram illustrating electric power distribution control between two DC power sources.
Figure 20:
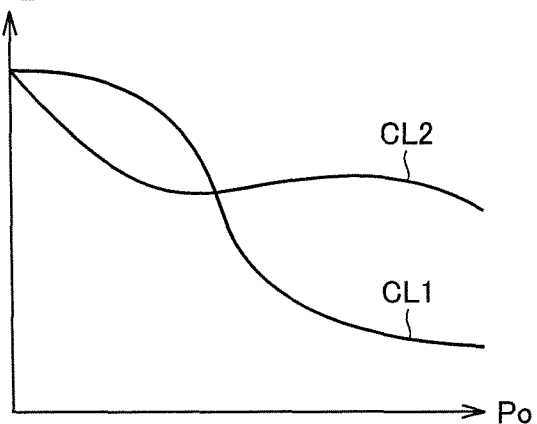
FIG. 20 is a conceptual diagram illustrating the relationship between output power from the DC power sources and inductances of the reactors.

FIG. 19 is a conceptual diagram illustrating electric power distribution control between two DC power sources. FIG. 20 is a conceptual diagram illustrating changes in inductances converted from ripple widths of output currents from the power supply system. FIGS. 19 and 20 show electric power distribution control when outputting electric power from power supply system 5 to load 30, that is, electric power distribution control in a power running operation.

Referring to FIG. 19, in power supply system 5 shown in FIG. 1, output voltage VH is controlled to be voltage command value VH*, while controlling power converters 6 and 7 individually as shown in FIG. 2. As a result, by subjecting one of DC power sources B1 and B2 to current control, distribution of electric power input/output by power supply system 5 as a whole to/from load 30 between DC power sources B1 and B2 can be controlled.

Therefore, when increasing output power to load 30, power supply system 5 can be operated along an operation line OP3 along which output power is increased while controlling distribution between DC power sources B1 and B2. On the other hand, along operation lines OP1 and OP2, power supply system 5 is operated using only one of DC power sources B1 and B2 to increase output power.

When power supply system 5 is operated along operation lines OP1 and OP2, electric current flows through only one of reactors L1 and L2. Since a magnetic field is thus produced from only one of reactors L1 and L2, magnetic coupling does not occur between reactors L1 and L2.

Referring to FIG. 20, when the reactor is configured by using the nonlinear magnetic material having magnetization curve 305 shown in FIG. 14 as core 150, the inductances of reactors L1 and L2 when power supply system 5 is operated along operation lines OP1 and OP2 change in accordance with a characteristic line CL1.

In the operation along operation lines OP1 and OP2, reactor current IL1 or IL2 increases in accordance with increase in output power Po from power supply system 5, while the state where magnetic coupling does not occur between reactors L1 and L2 is maintained. In accordance with increase in reactor currents IL1 and IL2, the magnetic flux density in magnetic leg portions 151 and 152 (reactor L1) or the magnetic flux density in magnetic leg portion 153 (reactor L2) increases.

When operating point 301, 302 or 303 enters the nonlinear region with increase in magnetic flux density, relative permeability Mr1, Mr2 or Mr3 decreases. Accordingly, magnetic resistance R1, R2 or R3 increases as described with reference to Equations (9) to (11). It is understood from Equations (17) to (20) that inductances La, Lb and Lc decrease with increase in magnetic resistance R1, R2 or R3.

As a result, as indicated by characteristic line CL1, the inductances of reactors L1 and L2 decrease in accordance with increase in output power Po. In this case, however, reactors L1 and L2 can be operated stably, while being magnetically uncoupled to each other. That is, in power supply system 5 in which the variable magnetic coupling reactor having reactors L1 and L2 formed integrally is used, an operation in which electric current flows through only one of reactors L1 and L2, that is, an operation in which only one of DC power sources B1 and B2 is used can also be executed stably.

On the other hand, when increasing output power Po along operation line OP3 shown in FIG. 19, both of reactor currents IL1 and IL2 increase in accordance with increase in output power Po. Therefore, unlike the case of operation lines OP1 and OP2, magnetic coupling occurs between reactors L1 and L2.

As described above, in the state where magnetic coupling occurs, that is, in the state where R2-R1>0 holds in Equation (33), the inductances can be equivalently increased in accordance with the phase relationship of reactor voltages (currents). Therefore, the inductances of reactors L1 and L2 are restrained from decreasing in accordance with increase in output power Po, as indicated by characteristic line CL2.

Therefore, with the variable magnetic coupling reactor according to the present embodiment operating both in the operating region where reactors L1 and L2 become magnetically uncoupled (the region where reactor currents are small) and the operating region where reactors L1 and L2 are magnetically coupled (the region where reactor currents are large), the inductances are easily ensured at the time of high output from power supply system 5, that is, when reactor currents IL1 and IL2 are large.

Specifically, the inductances of reactors L1 and L2 can be adjusted by magnetic resistance R1+R2 which determines the self-inductance of reactor L1, magnetic resistance (R1+R2+4×R3) which determines the self-inductance of reactor L2, and the magnetic resistance (R2−R1) which determines the mutual inductance between reactors L1 and L2. These magnetic resistances can be adjusted by the shape and size of core 150 (cross-sectional area and gap length) as well as number of turns NT1 and NT3 of windings 121a, 121b and 122.

It is noted that, in the variable magnetic coupling reactor according to the first embodiment, it is preferable to design reactors L1 and L2 paying attention to operating points 301 to 303 shown in FIGS. 16 and 17. It is particularly preferable to define parameters for design in consideration of the operating points when maximum current I(max) described above flows. As described above, maximum current I(max) refers to the upper limit value of the working current range of reactors L1 and L2 estimated at the time of design.

Referring again to FIG. 17, at operating point 302 of magnetic leg portion 152, magnetic flux density B further increases in the saturation region in accordance with increase in reactor currents IL1 and IL2 by the effect that the magnetic fields reinforce each other. However, when the magnetic flux density increases to operating point 302# at which saturation magnetic flux density Bsmax is attained, magnetic flux density B will change thereafter in accordance with a magnetization curve 306 rather than magnetization curve 305, based on hysteresis characteristics of the magnetic substance. As a result, there is concern that the operation of reactor L1 may become unstable. Therefore, it is preferable to design reactor L1 such that, for operating point 302 of magnetic leg portion 152 in which the magnetic fields reinforce each other, magnetic flux density B does not reach saturation magnetic flux density Bsmax when maximum current I(max) passes.

At operating point 301 of magnetic leg portion 151, magnetic flux density B decreases in accordance with increase in reactor currents IL1 and IL2 by the effect that the magnetic fields weaken each other. However, there is concern that, if operating point 301 changes to operating point 301# (H<0, B<0) where the direction of magnetic field H is reversed, the operation of reactor L1 may become unstable because of the reversal of the direction of magnetization. Therefore, it is preferable to design reactor L1 such that, for operating point 301 of magnetic leg portion 151 in which the magnetic fields weaken each other, the direction of magnetic field H (magnetic flux density B) is not reversed when maximum current I(max) passes.

Operating point 303, 303# of magnetic leg portion 153 corresponding to reactor L2 is determined by the magnetic field produced by reactor current IL2. As indicated in the Equations (11) and (13), magnetic resistance R3 changes with relative permeability Mr3 which depends on magnetic flux density B of magnetic leg portion 153. As indicated in Equation (33), the term (R2−R1) is integrated with both Vx and Vy, while R3 is integrated only with Vy. Therefore, there is concern that variations in the term R3 may affect the balance between the operations of reactors L1 and L2. Therefore, it is preferable to design reactor L1 such that operating point 303, 303# of magnetic leg portion 153 is maintained in linear region 310 also when maximum current I(max) passes. Accordingly, variations in magnetic resistance R3 can be avoided within the range that IL1 and IL2 are smaller than or equal to I(max).

In variable magnetic coupling reactor 100 according to the present embodiment, the size of core 150, the number of turns of windings 121a, 121b and 122, and the like for ensuring inductances necessary for the operation at maximum current I(max) can be suppressed while taking the above-described points into consideration. As a result, reduction in size and weight of the reactor can be achieved by configuring the variable magnetic coupling reactor taking advantage of magnetic interference between two reactor elements formed integrally by a shared core.

Modification of First Embodiment

As described in the first embodiment, in the variable magnetic coupling reactor according to the present embodiment, the function of the term (R2−R1) at the time of magnetic coupling changes in accordance with the phase relationship of reactor voltages and currents. Therefore, in a modification of the first embodiment, power supply system control for phase control of reactor voltages and currents of the reactor for further increasing the effect of increasing the reactor values will be described.

Figure 21:
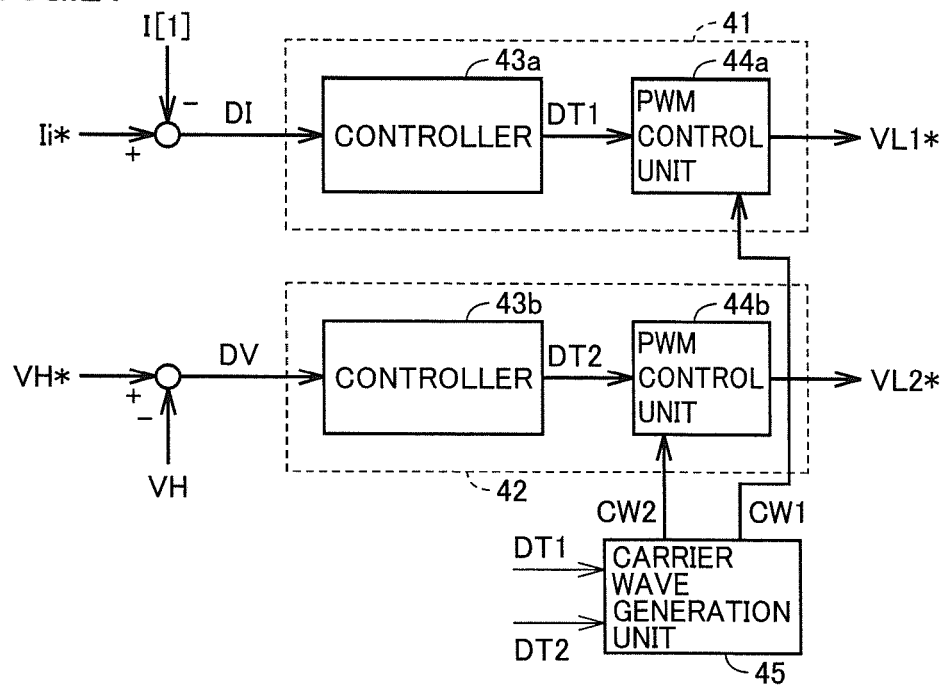
FIG. 21 is a block diagram of power supply system control according to a modification of the first embodiment.

FIG. 21 is a block diagram of power supply system control according to the modification of the first embodiment.

Referring to FIG. 21, a current controller 41 has a controller 43a and a PWM control unit 44a. A voltage controller 42 has a controller 43b and a PWM control unit 44b.

Controller 43a calculates a duty ratio DT1 corresponding to DC power source B1 by feedback control (e.g., PI control) for compensating for a current deviation DI (DI=Io*−I[1]). It is noted that a duty ratio DT2 can also be calculated further reflecting a theoretical step-up ratio obtained from the voltage ratio between output voltage V[1] of DC power source B1 and voltage command value VH*.

Controller 43b calculates duty ratio DT2 corresponding to DC power source B2 by feedback control (e.g., PI control) for compensating for a voltage deviation DV (DV=VH*−VH). It is noted that duty ratio DT1 can also be calculated further reflecting a theoretical step-up ratio obtained from the voltage ratio between output voltage V[1] of DC power source B1 and voltage command value VH*.

A carrier wave generation unit 45 generates a carrier wave CW1 used for controlling DC power source B1 and a carrier wave CW2 used for controlling DC power source B2. PWM control unit 44a generates a control command signal VL1* for controlling a voltage to be applied to reactor L1 by PWM control based on the comparison between duty ratio DT1 and carrier wave CW1. PWM control unit 44b generates a control command signal VL2* for controlling a voltage to be applied to reactor L2 by PWM control based on the comparison between duty ratio DT2 and carrier wave CW2. Carrier waves CW1 and CW2 have the same frequency equivalent to a switching frequency.

Control command signals VL1* and VL2* are set at either a logic low level (hereinafter simply described as "L level") or a logic high level (hereinafter simply described as "H level"). Control command signal VL1* controls on/off of switching elements Q1 and Q2 in power converter 6. Specifically, switching element Q2 is turned on when VL1* is at the H level. Accordingly, reactor voltage VL1>0 holds. On the other hand, when VL1* is at the L level, switching element Q2 serving as a lower arm element is turned off (switching element Q1 is turned on). Accordingly, reactor voltage VL1<0 holds.

Similarly, control command signal VL2* controls on/off of switching elements Q3 and Q4 in power converter 7. Specifically, when VL2* is at the H level, switching element Q4 serving as a lower arm element is turned on to satisfy VL2>0, while when VL2* is at the L level, switching element Q2 is turned off (switching element Q1 is turned on) to satisfy VL2<0.

Figure 22:
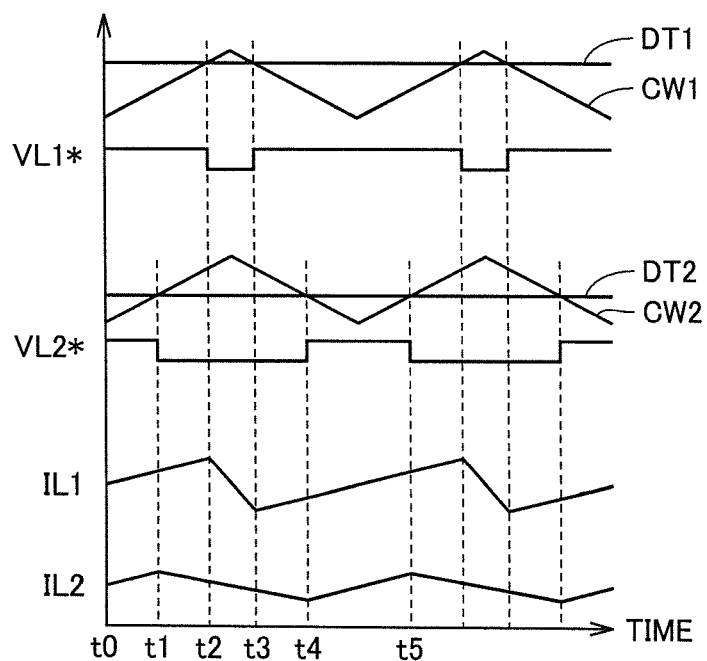
FIG. 22 is a diagram of waveforms for illustrating the operation of PWM control units shown in FIG. 21.

FIG. 22 shows a diagram of waveforms for illustrating the operation of PWM control units 44a and 44b shown in FIG. 21.

Referring to FIG. 22, control command signal VL1* for DC power source B1 is generated by PWM control based on the voltage comparison between carrier wave CW1 and duty ratio DT1. In the period where DT1>CW1 holds, control command signal VL1* is set at the H level, while in the period where CW1<DT1 holds, control command signal VL1* is set at the L level.

Therefore, the H level period of control command signal VL1* increases in accordance with increase in duty ratio DT1. Accordingly, the output of DC power source B1 increases in accordance with increase in duty ratio DT1, while the output of DC power source B1 decreases in accordance with decrease in duty ratio DT1. In this way, the ratio between the on-period and the off-period of the lower arm element (switching element Q2) is controlled based on control command signal VL1* for controlling the output from DC power source B1.

Similarly, control command signal VL2* for DC power source B2 is generated by PWM control based on the voltage comparison between carrier wave CW2 and duty ratio DT2. In the period where DT2>CW2 holds, control command signal VL2* is set at the H level, while in the period where CW2<DT2 holds, control command signal VL2* is set at the L level.

Therefore, the H level period of control command signal VL2* increases in accordance with increase in duty ratio DT2. Accordingly, the output of DC power source B2 increases in accordance with increase in duty ratio DT2, while the output of DC power source B2 decreases in accordance with decrease in duty ratio DT2. In this way, the ratio between the on-period and the off-period of the lower arm element (switching element Q4) is controlled based on control command signal VL2* for controlling the output from DC power source B2.

In the modification of the first embodiment, phase control of carrier waves used for controlling the outputs from DC power sources B1 and B2 (hereinafter also referred to as "carrier phase control") is executed.

Figure 23:
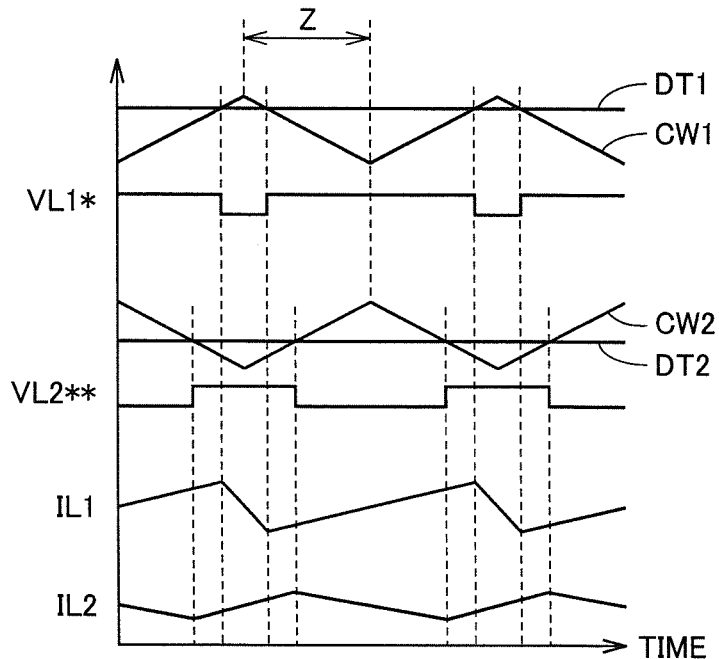
FIG. 23 is a diagram of waveforms for illustrating carrier phase control according to the modification of the present first embodiment.

FIG. 23 is a diagram of waveforms for illustrating the application of carrier phase control according to the modification of the present first embodiment.

Referring to FIG. 23, when carrier phase control is applied, carrier wave generation unit 45 provides a phase difference Z between carrier wave CW1 used for the PWM control of DC power source B1 and carrier wave CW2 used for the PWM control of DC power source B2. FIG. 23 illustrates the case where Z=180 degrees holds.

On the other hand, in the exemplary operation waveforms shown in FIG. 22, carrier waves CW1 and CW2 have the same frequency and are in phase. In other words, in FIG. 22, Z=0 holds.

Even when phase difference Z is provided, control command signal VL1* is generated by the PWM control based on the voltage comparison between carrier wave CW1 and duty ratio DT1. Similarly, control command signal VL2* is generated by the PWM control based on the voltage comparison between carrier wave CW2 and duty ratio DT2.

In FIG. 23, duty ratios DT1 and DT2 have identical values to those in FIG. 22. Therefore, control command signal VL1* in FIG. 23 has the H level period of the same length as that of control command signal VL1* in FIG. 22, although they are out of phase. Similarly, control command signal VL2* in FIG. 23 has the H level period of the same length as that of control command signal VL2* in FIG. 22, although they are out of phase.

By providing phase difference Z between carrier waves CW1 and CW2, control command signals VL1* and VL2* in FIG. 23 have waveforms different from those of control command signals VL1* and VL2* in FIG. 22. It is understood from the comparison between FIGS. 22 and 23 that the phase relationship between reactor voltages VL1, VL2 and the phase relationship between reactor currents IL1 and IL2 also change by varying phase difference Z between carrier waves CW1 and CW2.

On the other hand, it is understood that in FIGS. 22 and 23, currents IL1 and IL2 are equivalent in average value for the same duty ratios DT1 and DT2. That is, the outputs from DC power sources B1 and B2 are controlled by duty ratios DT1 and DT2, and will not be affected even with phase difference Z between carrier waves CW1 and CW2 being changed.

In the modification of the present first embodiment, the effect of increasing the inductances equivalently when variable magnetic coupling reactor 100 operates in the magnetically coupled mode is enhanced by the carrier phase control of appropriately adjusting phase difference Z between carrier waves CW1 and CW2.

In the state where magnetic coupling occurs between reactors L1 and L2 as described with reference to FIG. 18 and Equations (33) and (34), the inductances can be increased equivalently by controlling the phases of reactor voltages VL1 and VL2 such that a period in which change rates dIL1/dt and dIL2/dt of the reactor currents have different signs becomes longer. Specifically, the gradient of reactor currents IL1 and IL2 can be made smaller to reduce the ripple current.

Therefore, the effect of increasing the inductances equivalently as described above can be further enhanced if the pulse phase is adjusted such that the period in which control command signals VL1* and VL2* have different logic levels becomes longer, with the H level periods of control command signals VL1* and VL2* being defined in length by duty ratios DT1 and DT2, respectively.

Figure 24:
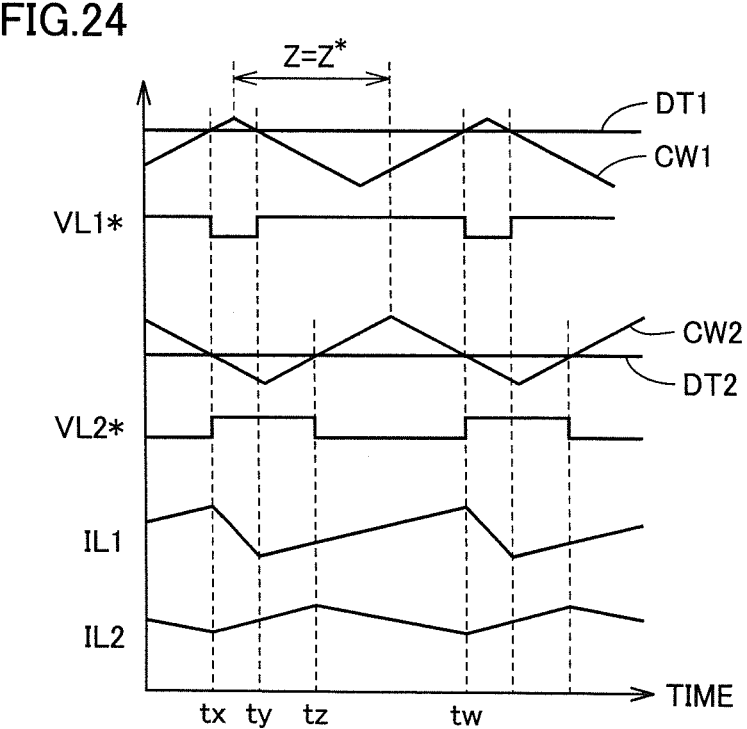
FIG. 24 is a diagram of waveforms for illustrating an exemplary operation of carrier phase control according to the modification of the present first embodiment.

FIG. 24 is a diagram of waveforms for illustrating an exemplary operation of carrier phase control according to the modification of the present first embodiment.

Referring to FIG. 24, the period in which control command signals VL1* and VL2* have different logic levels changes by adjusting phase difference Z even when control command signals VL1* and VL2* have identical H level periods, respectively. As shown in FIG. 24, assuming that phase difference Z=Z* holds, the timing when control command signal VL1* transitions from the H level to the L level is in phase with the timing when control command signal VL2* transitions from the L level to the H level (time tx). On this occasion, the period in which control command signals VL1* and VL2* have different logic levels can be ensured for the longest time. Hereinafter, phase difference Z* that brings about such phase relationship will also be referred to as optimum phase difference Z*.

Here, a comparison is made between the waveform obtained when phase difference Z=0 holds as shown in FIG. 22 and the waveform obtained when phase difference Z=Z* holds as shown in FIG. 24. By comparing the ratio of the period from time t1 to t2 and the period from t3 to t4 in FIG. 22 with the ratio of the period from time tz to tw in FIG. 24 with respect to one cycle of control command signal VL2*, it is understood that the period in which change rates dIL1/dt and dIL2/dt of the reactor currents have different signs can be made longer by carrier phase control under PWM control with identical duty ratios DT1 and DT2.

It is noted that, contrary to the example of FIG. 24, when phase difference Z is set such that the timing when control command signal VL1* transitions from the L level to the H level (time ty) is in phase with the timing when control command signal VL2* transitions from the H level to the L level (time tz), the period in which control command signals VL1* and VL2* have different logic levels can also be ensured similarly. That is, it is also possible to define phase difference Z on this occasion as optimum phase difference Z*.

As shown in FIG. 24, reactor current IL1 is also changed from increase to decrease at the timing when control command signal VL1* changes from the H level to the L level. That is, reactor current IL1 becomes the maximum. Contrarily, reactor current IL1 is also changed from decrease to increase at the timing when control command signal VL1* changes from the L level to the H level. That is, reactor current IL1 becomes the minimum.

In this way, the timing when the logic level of control command signals VL1* and VL2* transitions corresponds to an inflection point (local maximum or local minimum) of reactor currents IL1 and IL2. Therefore, when phase difference Z=Z* is set such that control command signals VL1* and VL2* match in transition timing of logic level in order to ensure the period in which control command signals VL1* and VL2* have different logic levels for the longest time as described above, the inflection points of reactor currents IL1 and IL2 appear at the same timing.

As understood from FIGS. 22 to 24, the waveforms of control command signals VL1* and VL2* are determined by duty ratios DT1 and DT2. Therefore, it is understood that optimum phase difference Z* with which the relationship between control command signals VL1* and VL2* as well as the current phases of IL1 and IL2 as shown in FIG. 24 can be achieved also vary in accordance with duty ratios DT1 and DT2.

Therefore, it is possible to previously obtain the relationship between duty ratios DT1, DT2 and optimum phase difference Z* and to previously store that correspondence in control device 40 as a map (hereinafter also referred to as a "phase difference map") or a function expression (hereinafter also referred to as a "phase difference calculation expression").

Control device 40 having the function of controlling electric currents in reactors L1 and L2 included in variable magnetic coupling reactor 100 is capable of setting optimum phase difference Z* based on duty ratios DT1 and DT2 calculated by controllers 43a and 43b (FIG. 21) with reference to the above-described phase difference map or the phase difference calculation expression. Then, carrier wave generation unit 45 (FIG. 21) generates carrier waves CW1 and CW2 of the same frequency so as to provide optimum phase difference Z* having been set.

Controlling reactor currents IL1 and IL2 passing through variable magnetic coupling reactor 100 with the application of carrier phase control so as to obtain the phase of currents described above, the effect of equivalently increasing the inductances in the state where magnetic coupling occurs between reactors L1 and L2 can be further enhanced.

Figure 25:
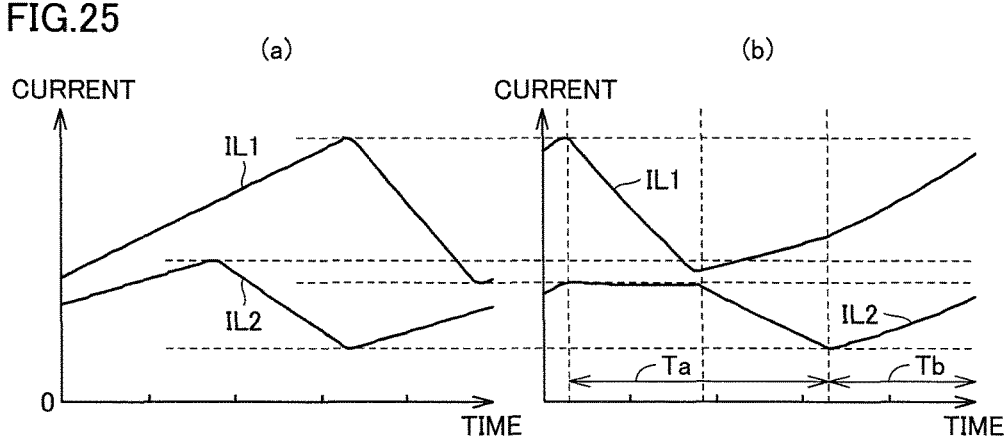
FIG. 25 shows diagrams of simulation waveforms for illustrating a first exemplary operation when carrier phase control of the variable magnetic coupling reactor according to the present embodiment is applied.
Figure 26:
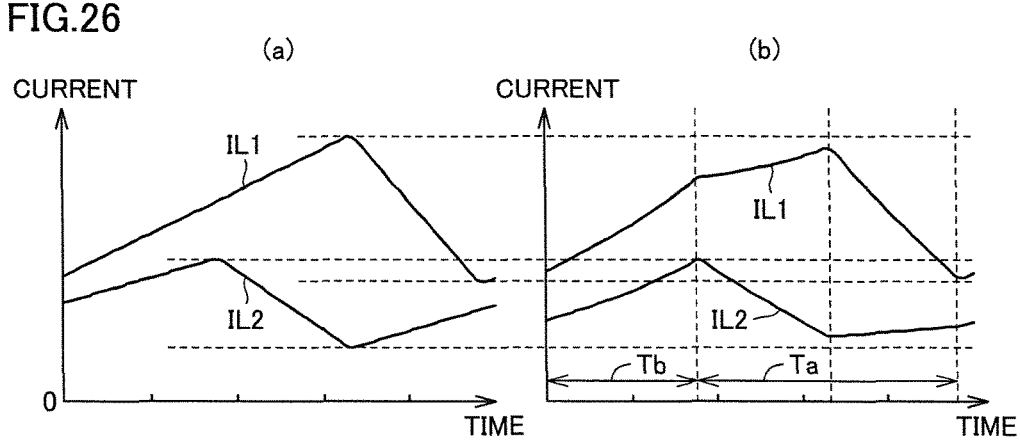
FIG. 26 shows diagrams of simulation waveforms for illustrating a second exemplary operation when carrier phase control of the variable magnetic coupling reactor according to the present embodiment is applied.

FIGS. 25 and 26 each show an exemplary operation when carrier phase control is applied in the variable magnetic coupling reactor according to the present embodiment. Diagrams of operation waveforms analyzed by a circuit simulator are shown in FIGS. 25 and 26.

Simulation waveforms obtained when reactors L1 and L2 are magnetically uncoupled are shown at (a) of FIG. 25, and simulation waveforms obtained when reactors L1 and L2 are in the magnetically coupled state are shown at (b) of FIG. 25. At (b) of FIG. 25, carrier phase control is applied such that the local minimum of reactor current IL1 and the local maximum of reactor current IL2 are attained at the same timing.

It is noted that, at (a) and (b) of FIG. 25, simulation conditions are defined such that the average values of reactor current IL1 are equal to each other and the average values of IL2 are equal to each other with identical circuit constants. That is, the simulation at (a) of FIG. 25 is executed setting Mxy to be equal to 0 with inductances La, Lb, Lc, and Mab in Equation (34) set to have identical values to those at (b) of FIG. 25.

It is understood from the comparison of the both diagrams that a peak-to-peak value (ripple component) of reactor current IL1 shown at (b) of FIG. 25 is suppressed as compared with the ripple component of reactor current IL1 shown at (a) of FIG. 25. Similarly, the ripple component of reactor current IL2 shown at (b) of FIG. 25 is also suppressed as compared with that shown at (a) of FIG. 25.

It is understood that at (b) of FIG. 25, it is particularly effective in peak suppression of reactor current IL1 on the side of smaller current. That is, it is particularly effective in peak suppression of reactor current IL1 when performing carrier phase control such that the local maximum of reactor current IL2 and the local minimum of reactor current IL1 are attained at the same timing.

Referring to (a) and (b) of FIG. 26, identical waveforms to those shown at (a) of FIG. 25, that is, simulation waveforms obtained when reactors L1 and L2 are magnetically uncoupled are shown at (a) of FIG. 26. Simulation waveforms obtained when reactors L1 and L2 are in the magnetically coupled state are shown at (b) of FIG. 26. At (b) of FIG. 26, carrier phase control is applied such that the local maximum of reactor current IL1 and the local minimum of reactor current IL2 are attained at the same timing, that is, such that the phase of currents equivalent to that shown at (b) of FIG. 25 is obtained. It is noted that the simulation conditions at (a) and (b) of FIG. 26 are the same as those at (a) and (b) of FIG. 25.

It is understood from the comparison of the both diagrams that a peak-to-peak value (ripple component) of reactor current IL1 shown at (b) of FIG. 26 is suppressed as compared with the ripple component of reactor current IL1 shown at (a) of FIG. 26. Similarly, the ripple component of reactor current IL2 shown at (b) of FIG. 26 is also suppressed as compared with that shown at (a) of FIG. 26.

It is understood that at (b) of FIG. 26, it is particularly effective in peak suppression of reactor current IL1 on the side of larger current. That is, it is particularly effective in peak suppression of reactor current IL1 when performing carrier phase control such that the local maximum of reactor current IL1 and the local minimum of reactor current IL2 are attained at the same timing.

From these simulation waveforms, it is understood that in the variable magnetic coupling reactor according to the present embodiment, by operating reactors L1 and L2 so as to be magnetically coupled, the ripple components of reactor currents IL1 and IL2 can be suppressed, that is, the inductances can be increased equivalently.

Furthermore, at (b) of FIG. 25 and (b) of FIG. 26, the application of carrier phase control can increase a period Ta in which the gradient (change rate) of reactor current IL1 and the gradient (change rate) of reactor current IL2 have different signs, and can shorten a period Tb in which they have an identical sign. As a result, the effect of increasing the inductances in the variable magnetic coupling reactor can be enhanced. By the effect of equivalently increasing the inductances, reduction in size and weight of the reactors can be achieved by implementing the variable magnetic coupling reactor by the composite magnetic component having two reactors L1 and L2 integrated with the use of shared core 150.

<Operation in Other Current Regions>

In the first embodiment and its modification, the operation of the variable magnetic coupling reactor when reactor currents IL1 and IL2 are both in the positive region (IL1>0, IL2>0) has been described. In this state, both DC power sources B1 and B2 supply electric power (discharge).

However, power supply system 5 to which the variable magnetic coupling reactor described in the first embodiment and its modification has been applied is also capable of operating in such a current region other than the above-described region that at least one of DC power sources B1 and B2 is charged. That is, the above-described variable magnetic coupling reactor is also capable of operating similarly in a region where IL1<0 and IL2<0 hold, a region where IL1>0 and IL2<0 hold, and a current region where IL1<0 and IL2>0 hold.

Figures 27, 28:
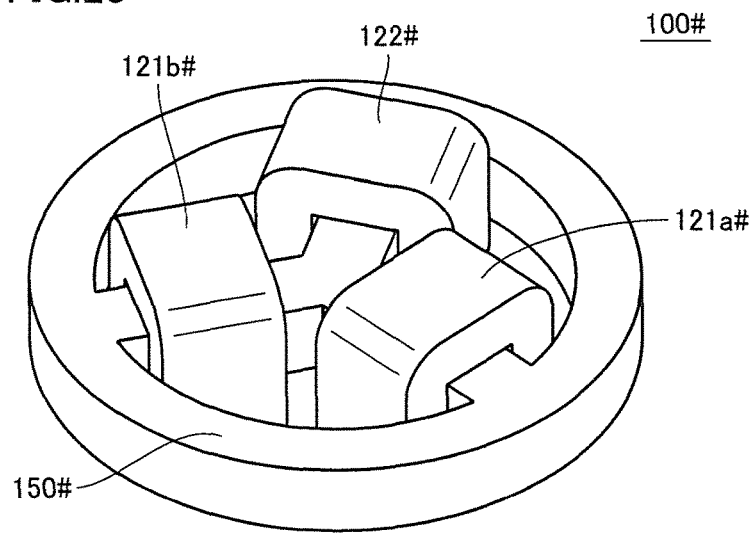
FIG. 27 is a diagram for illustrating the operation of the variable magnetic coupling reactor with each combination of polarities of reactor currents and reactor voltages.
FIG. 28 is a schematic outline view of a variable magnetic coupling reactor according to a second embodiment.

FIG. 27 is a diagram for illustrating the operation of the variable magnetic coupling reactor with each combination of polarities of reactor currents and reactor voltages.

Referring to FIG. 27, reactors L1 and L2 have 24 operation patterns of patterns 1 to 24 in accordance with combination of polarities (positive/negative) of currents ix and iy corresponding to reactor currents IL1 and IL2, respectively, and voltages Vx and Vy to be applied to reactors L1 and L2. In FIG. 27, the magnetic leg portion in which the magnetic fields caused by reactor currents IL1 and IL2 reinforce each other is expressed as "+", while the magnetic leg portion in which the magnetic fields weaken each other is expressed as "−".

Patterns 1 to 4 are operation patterns when IL1>0 and IL2>0 hold as described above. In these operation patterns, the magnetic fields reinforce each other in magnetic leg portion 152, while the magnetic fields weaken each other in magnetic leg portion 151, as described above. In this case, for (R2−R1) in Equation (33), R2−R1=0 holds in the magnetically uncoupled mode, while (R2−R1)>0 holds in the magnetically coupled mode. That is, (R2−R1) is more than or equal to 0. Therefore, Mxy becomes less than or equal to 0 in Equation (34) obtained by finding an inverse matrix of Equation (33).

In this case, since (R1+R2)>0 and (R1+R2+4R3)>0 hold in Equation (33), |dix/dt| and |diy/dt| when Vx and Vy have different signs become smaller than those when Vx and Vy have an identical sign. Therefore, in patterns 2 and 3 where Vx and Vy have different signs, |dix/dt| and |diy/dt| decrease. On the other hand, in patterns 1 and 4 where Vx and Vy have an identical sign, |dix/dt| and |diy/dt| increase.

Patterns 13 to 16 are operation patterns when IL1<0 and IL2<0 hold. In these patterns 13 to 16, the relative relationship between the direction of the magnetic field caused by reactor current IL1 and the direction of the magnetic field caused by reactor current IL2 is similar to that when IL1>0 and IL2>0 hold. Therefore, also in these operation patterns, the magnetic fields reinforce each other in magnetic leg portion 152, while the magnetic fields weaken each other in magnetic leg portion 151.

Therefore, in patterns 13 to 16, (R2−R1) is also more than or equal to 0. That is, in patterns 14 and 15 where Vx and Vy have different signs, |dix/dt| and |diy/dt| decrease. On the other hand, in patterns 13 and 16 where Vx and Vy have an identical sign, |dix/dt| and |diy/dt| increase.

In this way, when reactor currents IL1 and IL2 have an identical polarity (positive/negative), a requirement that the ripple current amplitude of reactor currents IL1 and IL2 becomes small, that is, the inductances of reactors L1 and L2 increase equivalently is that Vx and Vy have different signs.

Therefore, when applying the carrier phase control described in the modification of the first embodiment, the ripple current amplitude of reactor currents IL1 and IL2 can be suppressed by controlling phase difference Z such that the local maximum of one of the reactor currents and the local minimum of the other reactor current are attained at the same timing as described with reference to FIGS. 25 and 26.

On the other hand, patterns 5 to 8 are operation patterns when IL1>0 and IL2<0 hold, and patterns 9 to 12 are operation patterns when IL1<0 and IL2>0 hold. That is, in patterns 5 to 12, reactor currents IL1 and IL2 are different in polarity (positive/negative).

Therefore, in patterns 5 to 12, the relative relationship between the direction of the magnetic field caused by reactor current IL1 and the direction of the magnetic field caused by reactor current IL2 is opposite to that as described with reference to FIGS. 10 and 11, for example. Therefore, in these operation patterns, the magnetic fields reinforce each other in magnetic leg portion 151, while the magnetic fields weaken each other in magnetic leg portion 152, contrary to the description in the first embodiment. In this case, for (R2−R1) in Equation (33), R2−R1=0 holds in the magnetically uncoupled mode, while (R2−R1)<0 holds in the magnetically coupled mode. That is, (R2−R1) is less than or equal to 0. Therefore, Mxy is more than or equal to 0 in Equation (34).

In this case, considering that (R1+R2)>0 and (R1+R2+4R3)>0 hold in Equation (33), |dix/dt| and |diy/dt| when Vx and Vy have an identical sign become smaller than those when Vx and Vy have different signs. Therefore, in patterns 5, 8, 9, and 12 where Vx and Vy have an identical sign, |dix/dt| and |diy/dt| decrease. On the other hand, in patterns 6, 7, 10 and 11 where Vx and Vy have different signs, |dix/dt| and |diy/dt| increase.

Therefore, when reactor currents IL1 and IL2 are different in polarity (positive/negative), a requirement that the ripple current amplitude of reactor currents IL1 and IL2 becomes small, that is, the inductances of reactors L1 and L2 increase equivalently is that Vx and Vy have an identical sign.

It is noted that, when applying the carrier phase control described in the modification of the first embodiment in patterns 5 to 12, conditions for suppressing the ripple components of reactor currents IL1 and IL2 are different from the description with reference to FIGS. 25 and 26. Specifically, the ripple components of reactor currents IL1 and IL2 can be suppressed by controlling phase difference Z such that the local maximum of one of the reactor currents and the local maximum of the other reactor current are attained at the same timing, or such that the local minimum of one of the reactor currents and the local minimum of the other reactor current are attained at the same timing.

In this way, even if reactor currents IL1 and IL2 change in current direction in the variable magnetic coupling reactor according to the present first embodiment, reactors L1 and L2 are capable of operating in both the magnetically uncoupled mode and the magnetically coupled mode as described above. Then, the current ripple components can be decreased or increased in accordance with the combination of polarities of voltage Vx and Vy to be applied to reactors L1 and L2.

Furthermore, if the inflection points of reactor currents IL1 and IL2 are attained at the same timing by applying the carrier phase control according to the modification of the first embodiment, it is also possible to control increase or decrease in current ripple. Particularly, the optimum phase difference for decreasing the current ripple differs between the case where reactor currents IL1 and IL2 have an identical polarity (positive/negative) and the case where they are different in polarity.

Second Embodiment

In a second embodiment, a modification of the configuration of the variable magnetic coupling reactor will be described. That is, the variable magnetic coupling reactor according to the second embodiment is capable of operating similarly to the variable magnetic coupling reactor according to the first embodiment.

FIG. 28 is a schematic outline perspective view of a variable magnetic coupling reactor 100# according to the second embodiment.

Referring to FIG. 28, variable magnetic coupling reactor 100# according to the second embodiment includes a core 150#, and windings 121a#, 121b# and 122#. Windings 121a# and 121b# are electrically connected in series similarly to windings 121a and 121b to constitute the coil of reactor L1. Winding 122# constitutes the coil of reactor L2. Also in variable magnetic coupling reactor 100#, windings 121a# and 121b# constituting reactor L1 and winding 122# constituting reactor L2 are wound on different regions on shared core 150#, respectively.

Figure 29:
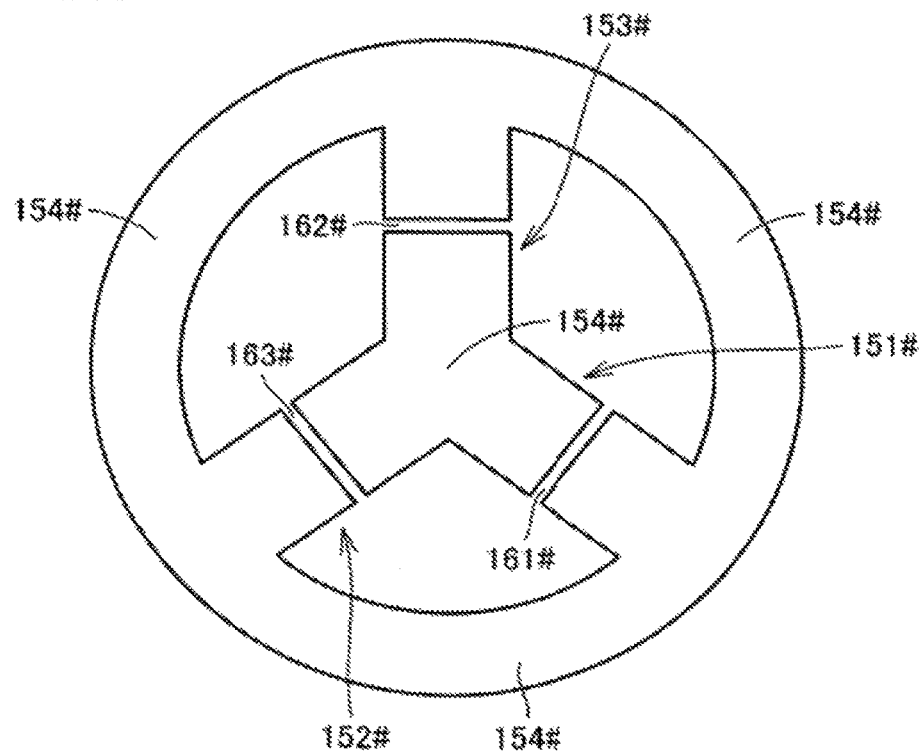
FIG. 29 is an outline view of a core of the variable magnetic coupling reactor shown in FIG. 28.

FIG. 29 is a plan view showing the outline of core 150# of variable magnetic coupling reactor 100# shown in FIG. 28.

Referring to FIG. 29, core 150# has a ring-shaped outline portion and magnetic leg portions 151# to 153# extending from the outline portion toward the center of the ring. Magnetic leg portion 151# to 153# are integrated at the central part of the ring. That is, in core 150#, a magnetic leg portion 154# similar to magnetic leg portion 154 of variable magnetic coupling reactor 100 includes the outline portion and the central portion. Magnetic leg portions 151# to 153# are provided with gaps 161# to 163#.

Magnetic leg portion 151# to 153# correspond to the wound regions of windings 121a#, 121b# and 122# on core 150#. On the other hand, magnetic leg portion 154# corresponds to a winding non-wound region on core 150#, and functions to create a magnetic path among magnetic leg portions 151# to 153# on which the windings are wound.

Figure 30:
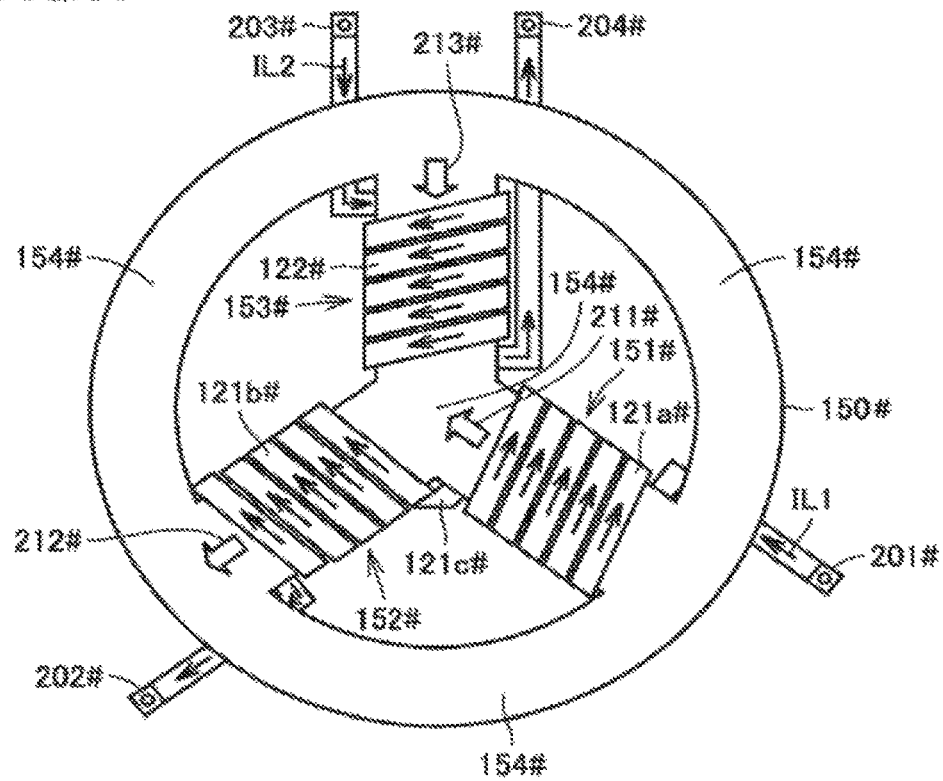
FIG. 30 is a schematic plan view for illustrating the winding mode of each winding in the variable magnetic coupling reactor according to the second embodiment.

FIG. 30 is a schematic plan view for illustrating the winding mode of each winding in the variable magnetic coupling reactor according to the second embodiment.

Referring to FIG. 30, reactor current IL1 is flown across terminals 201# and 202#. Windings 121a# and 121b# are electrically connected in series with a lead wire 121c#. Similarly to the first embodiment, FIG. 30 shows the electric current directions when IL1>0 and IL2>0 hold.

With the flow of reactor current IL1 through windings 121a# and 121b#, a magnetic field 211# is produced from winding 121a#, and a magnetic field 212# is generated from winding 121b#. As a result, magnetic field 211# has a direction in which the central side of the ring serves as an N pole and the radially outer side of the ring serves as an S pole. On the other hand, magnetic field 212# has a direction in which the radially outer side of the ring serves as the N pole and the central side of the ring serves as the S pole. That is, with the flow of reactor current ILL magnetic fields 211# and 212# generated from windings 121a# and 121b#, respectively, are in opposite directions to each other, and form a round route including magnetic leg portions 151# and 152# within core 150#, similarly to magnetic fields 211 and 212 shown in FIG. 6. Lead wire 121c# connects windings 121a# and 121b# so as to achieve such directions of magnetic fields.

Furthermore, reactor current IL2 is flown across terminals 203# and 204# (in FIG. 30, IL1>0, IL2>0). Accordingly, a magnetic field 213# is produced from winding 122#. Magnetic field 213# has a direction in which the central side of the ring serves as the N pole and the radially outer side of the ring serves as the S pole. That is, because of reactor currents IL1 and IL2 flowing in the same direction, magnetic field 213# produced by winding 122# is in an identical direction to magnetic field 211# produced by winding 121a#, but is in the opposite direction to magnetic field 212# produced by winding 121b#.

Figure 31:
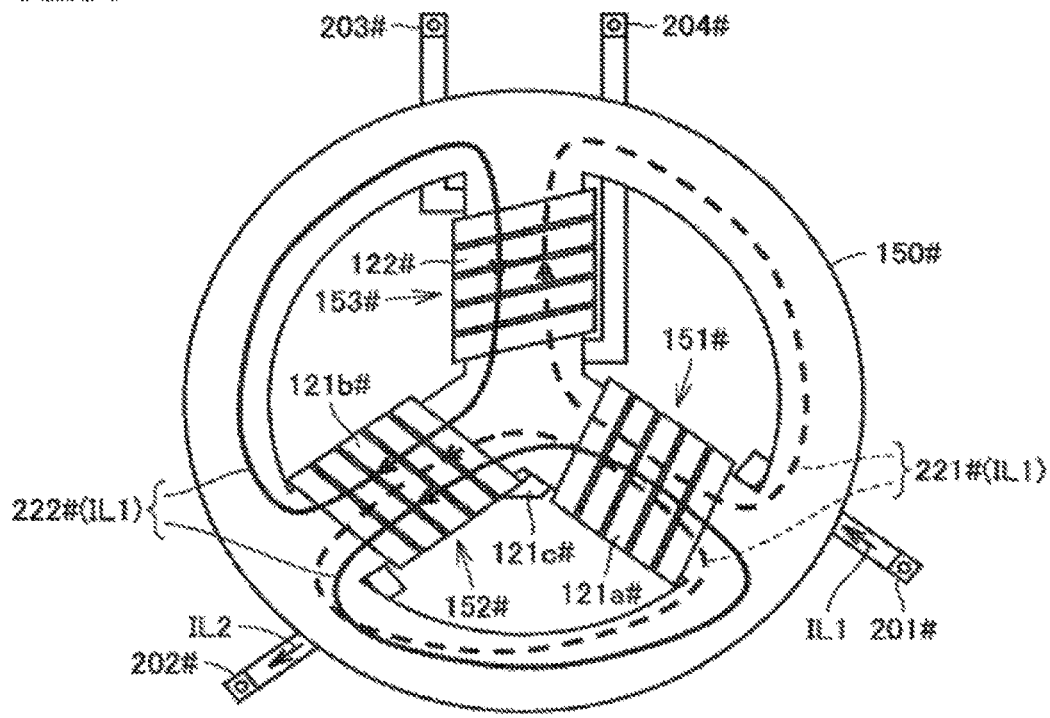
FIG. 31 is a conceptual diagram for illustrating the relationship between magnetic fluxes produced when electric current flows through one of the reactors.

FIG. 31 is a conceptual diagram for illustrating the relationship between magnetic fluxes produced when electric current flows through reactor L1.

Referring to FIG. 31, magnetic flux 221# caused by magnetic field 211# (FIG. 30) produced from winding 121a# wound on magnetic leg portion 151# also acts upon magnetic leg portions 152# and 153# passing through the magnetic path including magnetic leg portion 154#. Similarly, a magnetic flux 222# caused by magnetic field 212# (FIG. 30) produced from winding 121b# wound on magnetic leg portion 152# also acts upon magnetic leg portions 151# and 153# passing through the magnetic path including magnetic leg portion 154#.

In each of magnetic leg portions 151# and 152#, magnetic fluxes 221# and 222# caused by magnetic fields 211# and 212# act in an identical direction. That is, magnetic fields 211# and 212# reinforce each other in each of magnetic leg portions 151# and 152#.

On the other hand, in magnetic leg portion 153#, magnetic fluxes 221# and 222# caused by magnetic fields 211# and 212# act in the opposite directions. That is, magnetic fields 211# and 212# weaken each other in magnetic leg portion 153#.

Figure 32:
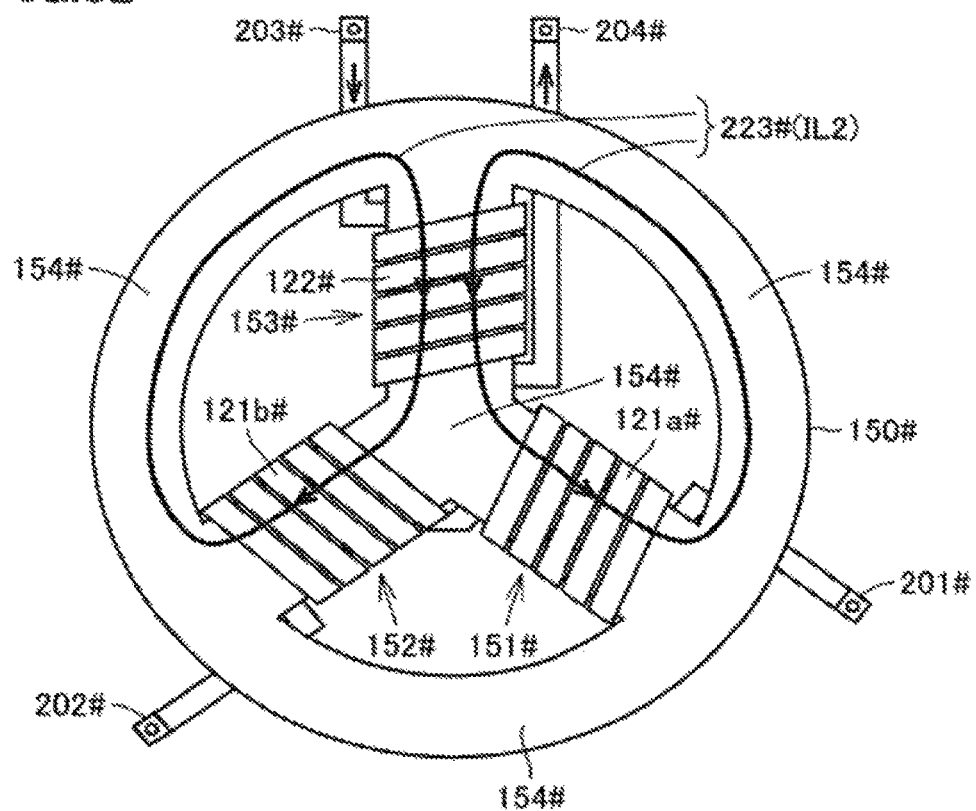
FIG. 32 is a conceptual diagram for illustrating the relationship between magnetic fluxes produced when electric current flows through the other reactor.

FIG. 32 is a conceptual diagram for illustrating the relationship between magnetic fluxes produced when electric current flows through reactor L2.

Referring to FIG. 32, a magnetic flux 223# caused by magnetic field 213# (FIG. 30) produced from winding 122# wound on magnetic leg portion 153# also acts upon magnetic leg portions 151# and 152# passing through magnetic leg portion 154#.

Figure 33:
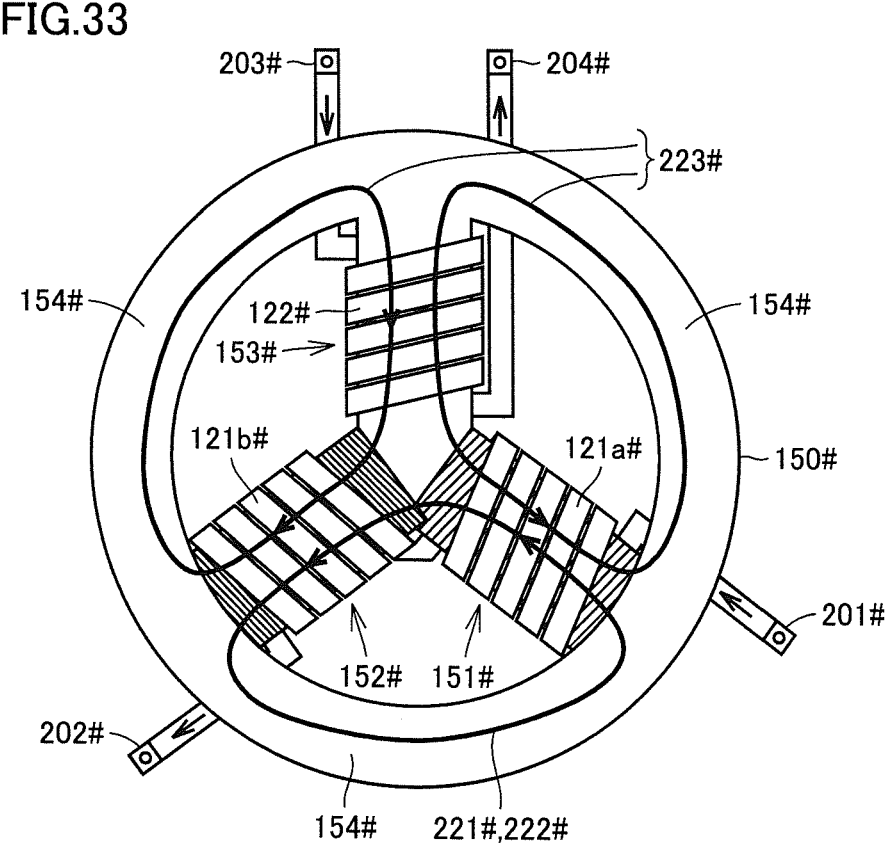
FIG. 33 is a conceptual diagram for illustrating the relationship between magnetic fluxes produced when electric current flows through both the reactors.

FIG. 33 is a conceptual diagram for illustrating the relationship between magnetic fluxes produced when electric current flows through both reactors L1 and L2.

Referring to FIG. 33, in magnetic leg portion 153# corresponding to reactor L2, since magnetic flux 221# from winding 121a# and magnetic flux 222# from winding 121b# counteract each other as shown in FIG. 31, magnetic flux 223# caused by winding 122# passes therethrough. That is, the magnitude of magnetic field in magnetic leg portion 153# corresponds to magnetic field 213# produced by reactor current IL2.

On the other hand, magnetic leg portions 151# and 152# corresponding to reactor L1 become unbalanced in magnitude of magnetic fields because of interference with the magnetic flux from reactor L2. Specifically, magnetic fluxes 221# and 222# caused by magnetic fields 211# and 212# are in the same direction as magnetic flux 223# caused by magnetic field 213# (FIG. 30). Therefore, magnetic fields 211#, 212# and magnetic field 213# reinforce each other in magnetic leg portion 152#.

On the other hand, in magnetic leg portion 151#, magnetic fields 211#, 212# and magnetic field 213# weaken each other since magnetic fluxes 221# and 222# caused by magnetic fields 211# and 212# (FIG. 30) are in the opposite direction to magnetic flux 223# caused by magnetic field 213# (FIG. 30).

In this way, magnetic behaviors in magnetic leg portions 151# to 153# with the flow of reactor currents IL1 and IL2 in variable magnetic coupling reactor 100# are similar to those of magnetic leg portions 151 to 153 of variable magnetic coupling reactor 100 according to the first embodiment. That is, in variable magnetic coupling reactor 100# according to the second embodiment, magnetic leg portion 151# corresponds to the "first magnetic leg portion", and magnetic leg portion 152# corresponds to the "second magnetic leg portion." Magnetic leg portion 153# corresponds to the "third magnetic leg portion."

In this way, in variable magnetic coupling reactor 100# according to the second embodiment, reactors L1 and L2 are capable of operating in both the magnetically uncoupled mode and the magnetically coupled mode in accordance with reactor currents IL1 and IL2, similarly to variable magnetic coupling reactor 100 according to the first embodiment. Since the operations of reactors L1 and L2 in accordance with the combination of reactor currents IL1 and IL2 as well as polarities (positive/negative) of Vx and Vy to be applied to the reactors, and particularly, the conditions for decreasing or increasing the current ripple components are also similar to those of the first embodiment, detailed description thereof will not be repeated. Moreover, it is also possible to apply the carrier phase control according to the modification of the first embodiment to variable magnetic coupling reactor 100# according to the second embodiment. In this case, since the conditions for decreasing or increasing the current ripple are also similar to those described in the first embodiment, detailed description thereof will not be repeated.

Third Embodiment

In a third embodiment, another exemplary configuration of the power supply system to which variable magnetic coupling reactor 100 described in the first embodiment is applied will be described.

Figure 34:
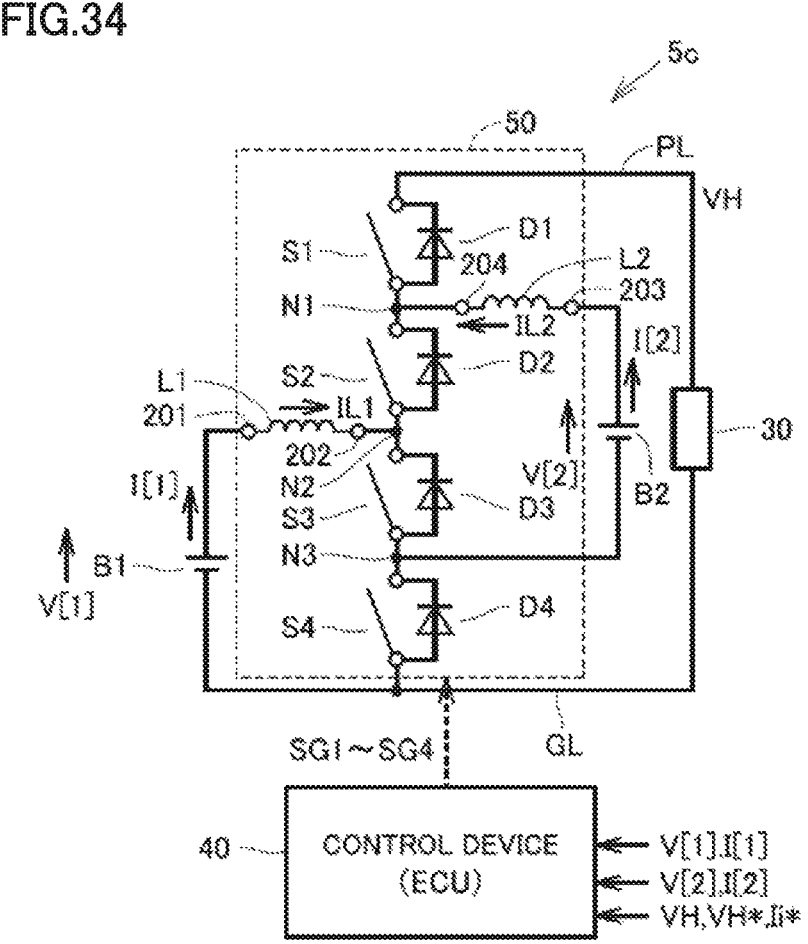
FIG. 34 is a circuit diagram showing an exemplary configuration of a power supply system according to a third embodiment.

FIG. 34 is a circuit diagram showing a configuration of a power supply system 5c according to the third embodiment of the present invention.

Referring to FIG. 34, power supply system 5c according to the third embodiment includes DC power sources B1, B2, a power converter 50, and control device 40. As compared with power supply system 5 shown in FIG. 1, power supply system 5c according to the third embodiment is provided with power converter 50 instead of power converters 6 and 7. Power converter 50 is connected across DC power sources B1, B2 and load 30. Power converter 50 controls a DC voltage (output voltage VH) on power line PL connected to load 30 in accordance with voltage command value VH*.

Power converter 50 includes switching elements S1 to S4 as well as reactors L1 and L2. For switching elements S1 to S4, anti-parallel diodes D1 to D4 are arranged, respectively. On/off of switching elements S1 to S4 is controlled in response to control signals SG1 to SG4 from control device 40.

Switching element S1 is electrically connected across power line PL on the side of higher voltage and a node N1. Switching element S2 is electrically connected across nodes N1 and N2. Switching element S3 is electrically connected across nodes N2 and N3. Switching element S4 is electrically connected across node N3 and power line GL on the side of lower electric power. Power line GL is electrically connected to load 30 and the negative electrode terminal of DC power source B1.

Reactor L1 is electrically connected across node N2 and power line GL in series with DC power source B1. Reactor L2 is electrically connected across nodes N1 and N3 in series with DC power source B2. In the exemplary configuration of FIG. 34, terminal 203 of reactor L2 is electrically connected to the positive electrode terminal of DC power source B2. Terminal 204 of reactor L2 is electrically connected to node N1. Accordingly, reactor L2 is electrically connected across nodes N1 and N3 in series with DC power source B2.

In power supply system 5c including power converter 50, reactors L1 and L2 are implemented by variable magnetic coupling reactor 100 or 100# according to the first or second embodiment, both of which is a composite magnetic component with use of an integrated core.

Moreover, in the example of FIG. 34, terminal 201 of reactor L1 is electrically connected to the positive electrode terminal of DC power source B1. Terminal 202 of reactor L1 is electrically connected to node N2. Accordingly, reactor L1 is electrically connected across node N2 and power line GL in series with DC power source B1.

As is understood from FIG. 34, power converter 50 is configured to include a step-up chopper circuit in correspondence with each of DC power sources B1 and B2. Specifically, for DC power source B1, a current bidirectional first step-up chopper circuit, having an upper arm element formed by switching elements S1, S2 and a lower arm element formed by switching elements S3, S4, is provided.

Similarly, for DC power source B2, a current bidirectional second step-up chopper circuit, having an upper arm element formed by switching elements S1, S4 and a lower arm element formed by switching elements S2, S3, is provided. Switching elements S1 to S4 are included both in a first power conversion path between power source B1 and power lines PL, GL formed by the first step-up chopper circuit and a second power conversion path between DC power source B2 and power lines PL, GL formed by the second step-up chopper circuit. Furthermore, reactors L1 and L2 are each included in the first and second power conversion paths.

As will be described in detail below, power converter 50 is configured to be switchable between a mode in which DC power sources B1 and B2 are connected in parallel to load 30 to execute DC/DC conversion (hereinafter also referred to as a "parallel boost (step-up) mode"), and a mode in which DC power sources B1 and B2 are connected in series to load 30 to execute DC/DC conversion (hereinafter also referred to as a "series boost (step-up) mode"). In particular, power converter 50 is capable of operating while switching between the parallel boost mode and the series boost mode by controlling switching elements S1 to S4.

(Circuit Operation in Parallel Boost Mode)

The circuit operation in the parallel boost mode of power converter 50 will be described.

Figure 35:
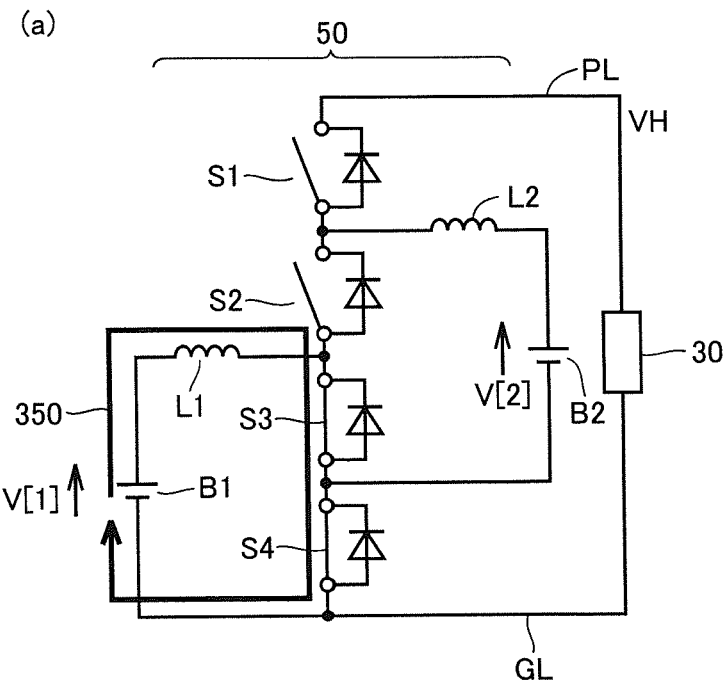
FIG. 35 shows first and second circuit diagrams illustrating DC/DC conversion (step-up operation) for a first DC power source in a parallel boost mode of a power converter shown in FIG. 34.
Figure 35:
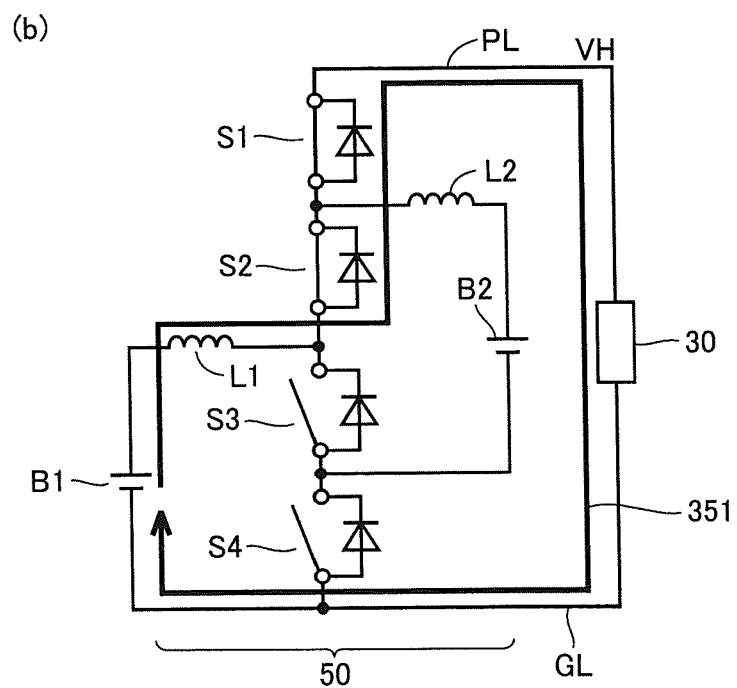

FIG. 35 shows DC/DC conversion (step-up operation) for DC power source B1 in the parallel boost mode.

Referring to (a) of FIG. 35, by turning on the pair of switching elements S3 and S4 and by turning off the pair of switching elements S1 and S2, a current path 350 for storing energy in reactor L1 is formed. Thus, a state in which the lower arm element of the step-up chopper circuit is on is obtained.

In contrast, referring to (b) of FIG. 35, by turning off the pair of switching elements S3 and S4 and by turning on the pair of switching elements S1 and S2, a current path 351 for outputting the energy stored in reactor L1 together with the energy of DC power source B1 is formed. Thus, a state in which the upper arm element of the step-up chopper circuit is on is obtained.

By alternately repeating the first period in which the pair of switching elements S3 and S4 is on and at least one of switching elements S1 and S2 is off and the second period in which the pair of switching elements S1 and S2 is on and at least one of switching elements S3 and S4 is off, current path 350 shown at (a) of FIG. 35 and current path 351 shown at (b) of FIG. 35 are formed alternately.

As a result, a step-up chopper circuit with the pair of switching elements S1 and S2 equivalently serving as the upper arm element and the pair of switching elements S3 and S4 equivalently serving as the lower arm element is formed for DC power source B1. In the DC/DC converting operation shown in FIG. 35, there is no current circulation path to DC power source B2 and, therefore, DC power sources B1 and B2 do not interfere with each other. Specifically, power input/output to/from DC power sources B1 and B2 can be controlled independently.

In such DC/DC conversion, the relation represented by Equation (35) below holds between voltage V[1] of DC power source B1 and output voltage VH of power line PL. In Equation (35), Da represents the duty ratio of the first period in which the pair of switching elements S3 and S4 is on.

[Math.16]

$$Vo=1/(1-Da)\times V[1] \quad (35)$$

Figure 36:
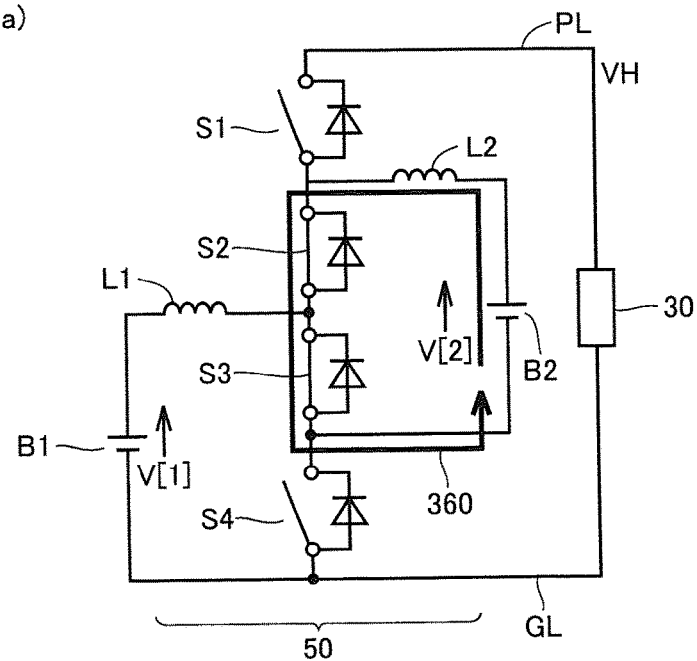
FIG. 36 shows first and second circuit diagrams illustrating DC/DC conversion (step-up operation) for a second DC power source in the parallel boost mode of the power converter shown in FIG. 34.
Figure 36:
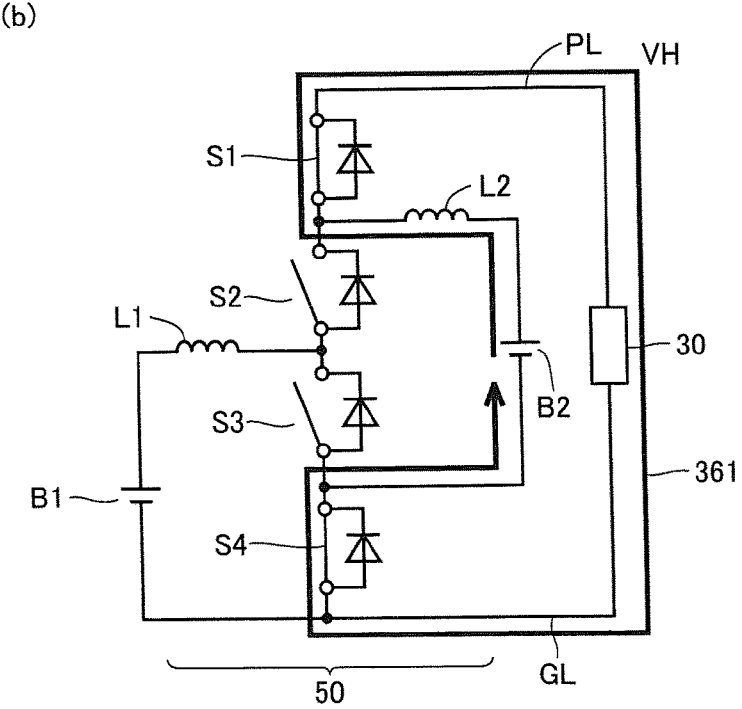

FIG. 36 shows DC/DC conversion (step-up operation) for DC power source B2 in the parallel boost mode.

Referring to (a) of FIG. 36, by turning on the pair of switching elements S2 and S3 and by turning off the pair of switching elements S1 and S4, a current path 360 for storing energy in reactor L2 is formed. Thus, a state in which the lower arm element of the step-up chopper circuit is on is obtained.

In contrast, referring to (b) of FIG. 36, by turning off the pair of switching elements S2 and S3 and by turning on the pair of switching elements S1 and S4, a current path 361 for outputting the energy stored in reactor L2 together with the energy of DC power source B2 is formed. Thus, a state in which the upper arm element of the step-up chopper circuit is on is obtained.

By alternately repeating the first period in which the pair of switching elements S2 and S3 is on and at least one of switching elements S1 and S4 is off and the second period in which the pair of switching elements S1 and S4 is on and at least one of switching elements S2 and S3 is off, current path 360 shown at (a) of FIG. 36 and current path 361 shown at (b) of FIG. 36 are formed alternately.

As a result, a step-up chopper circuit with the pair of switching elements S1 and S4 equivalently serving as the upper arm element and the pair of switching elements S2 and S3 equivalently serving as the lower arm element is formed for DC power source B2. In the DC/DC converting operation shown in FIG. 36, there is no current path including DC power source B1 and, therefore, DC power sources B1 and B2 do not interfere with each other.

In such DC/DC conversion, the relation represented by Equation (36) below holds between voltage V[2] of DC power source B2 and output voltage VH of power line PL. In Equation (36), Db represents the duty ratio of the first period in which the pair of switching elements S2 and S3 is on.

[Math.17]

$$Vo=1/(1-Db)\times V[2] \quad (36)$$

As described above, the current flowing through reactor L1 and the current flowing through reactor L2 are controlled independently in the parallel connection mode of power converter 50, similarly to the first embodiment. As a result, power input/output to/from DC power sources B1 and B2 can be controlled independently.

Duty ratio Da for controlling the output of DC power source B1 and duty ratio Db for controlling the output of DC power source B2 can be obtained by a control configuration equivalent to that of FIG. 2 or 21, for example. That is, duty ratio Da can be calculated similarly to duty ratio DT1 in the first embodiment and its modification. Duty ratio Db can also be calculated similarly to duty ratio DT2 in the first embodiment and its modification.

Figures 37, 38:
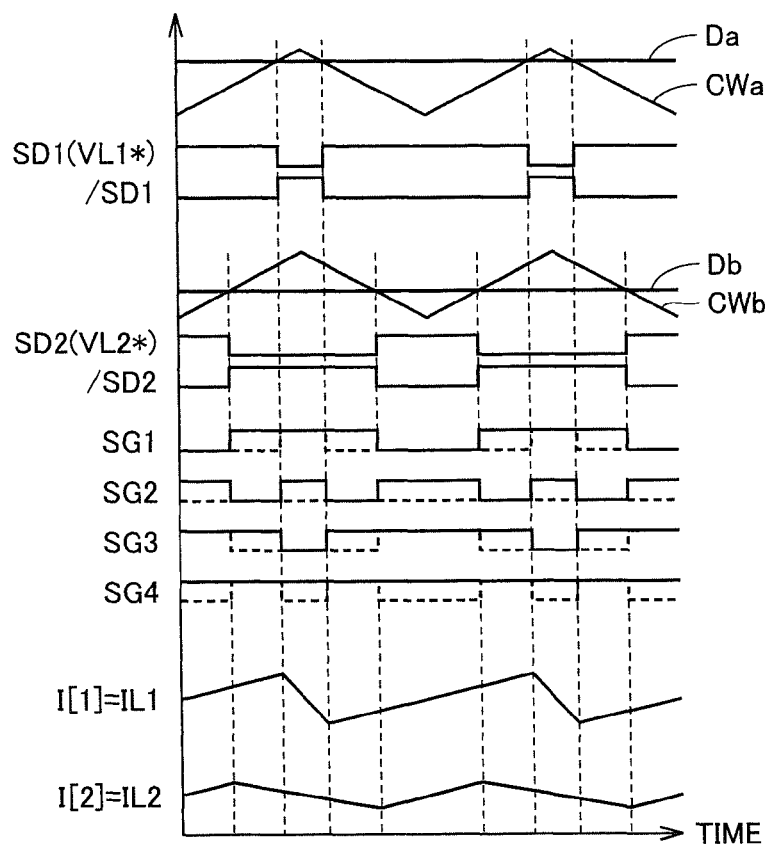
FIG. 37 is a diagram of waveforms showing an exemplary operation for controlling switching elements of the power converter in the parallel boost mode.
FIG. 38 is a diagram illustrating logical operation expressions for setting a control signal for each switching element in the parallel boost mode.

FIG. 37 is a diagram of waveforms showing an exemplary operation for controlling switching elements in the parallel boost mode. FIG. 37 shows an example when carrier wave CWa used for PWM control of DC power source B1 and carrier wave CWb used for PWM control of DC power source B2 have the same frequency and are in phase.

Referring to FIG. 37, in the parallel boost mode, for example, the output of one of DC power sources B1 and B2 can be subjected to voltage control, and the output of the other one of DC power sources B1 and B2 can be subjected to current control, similarly to power supply system 5 of the first embodiment. As described above, command values for the current control can be set so as to control the output power of a DC power source concerned as in the example of Equation (2).

A control pulse signal SD1 is generated based on a voltage comparison between duty ratio Da and carrier wave CWa. Similarly, a control pulse signal SD2 is generated based on a voltage comparison between duty ratio Db and carrier wave CWb. Control pulse signals /SD1 and /SD2 are inversion signals of control pulse signals SD1 and SD2. Control pulse signals SD1 and SD2 are equivalent to control command signals VL1* and VL2* in the first embodiment.

As shown in FIG. 38, control signals SG1 to SG4 are set based on a logical operation between control pulse signals SD1 (/SD1) and SD2 (/SD2).

Switching element S1 forms the upper arm element in each of the step-up chopper circuits shown in FIGS. 35 and 36. Therefore, control signal SG1 controlling on/off of switching element S1 is generated by the logical sum of control pulse signals /SDa and /SDb. As a result, on/off of switching element S1 is controlled so as to achieve the functions of both the upper arm element of the step-up chopper circuit of FIG. 35 (DC power source B1) and the upper arm element of the step-up chopper circuit of FIG. 36 (DC power source B2).

Switching element S2 forms the upper arm element in the step-up chopper circuit of FIG. 35 and forms the lower arm element in the step-up chopper circuit of FIG. 36. Therefore, control signal SG2 controlling on/off of switching element S2 is generated in accordance with the logical sum of control pulse signals /SD1 and SD2. As a result, on/off of switching element S2 is controlled so as to achieve the functions of both the upper arm element of the step-up chopper circuit of FIG. 35 (DC power source B1) and the lower arm element of the step-up chopper circuit of FIG. 36 (DC power source B2).

Similarly, control signal SG3 for switching element S3 is generated in accordance with the logical sum of control pulse signals SD1 and SD2. Thus, on/off of switching element S3 is controlled so as to achieve the functions of both the lower arm element of the step-up chopper circuit of FIG. 35 (DC power source B1) and the lower arm element of the step-up chopper circuit of FIG. 36 (DC power source B2).

Further, control signal SG4 for switching element S4 is generated in accordance with the logical sum of control pulse signals SD1 and /SD2. Thus, on/off of switching element S4 is controlled so as to achieve the functions of both the lower arm element of the step-up chopper circuit of FIG. 35 (DC power source B1) and the upper arm element of the step-up chopper circuit of FIG. 36 (DC power source B2).

Accordingly, DC/DC conversion in accordance with duty ratios Da and Db can be executed in parallel between DC power sources B1, B2 and power lines PL, GL (load 30).

Referring again to FIG. 37, control signals SG1 to SG4 are generated based on control pulse signals SD1 (/SD1) and SD2 (/SD2) in accordance with the logical operation expressions shown in FIG. 38. By turning on/off switching elements S1 to S4 based on control signals SG1 to SG4, current IL1 flowing through reactor L1 and current IL2 flowing through reactor L2 are controlled. Also in the circuit configuration of FIG. 34, current IL1 corresponds to current I[1] of DC power source B1, and current IL2 corresponds to current I[2] of DC power source B2.

In this way, in the parallel boost mode of power supply system 5c (power converter 50), output voltage VH can be controlled to be voltage command value VH* upon executing DC/DC conversion in parallel between DC power sources B1, B2 and power lines PL, GL (load 30) similarly to power supply system 5 (power converters 6 and 7) shown in FIG. 1. Moreover, similarly to power supply system 5 described in the first embodiment, by subjecting one of DC power sources B1 and B2 to current control, distribution of electric power input/output by power supply system 5 as a whole to/from load 30 between DC power sources B1 and B2 can be controlled.

Therefore, reactors L1 and L2 used in power converter 50 of power supply system 5c according to the third embodiment can also be implemented by the variable magnetic coupling reactor according to the first or second embodiment. Accordingly, by applying the variable magnetic coupling reactor according to the present embodiment to power converter 50 (power supply system 5c), reduction in size and weight of the reactor can be achieved. Since the magnetic behaviors, the operation modes, and the effect of equivalently increasing the inductances of the variable magnetic coupling reactor are similar to those described in the first embodiment, detailed description thereof will not be repeated.

(Carrier Phase Control in Parallel Boost Mode)

The carrier phase control described in the modification of the first embodiment can also be applied to power supply system 5c (power converter 50).

Figure 39:
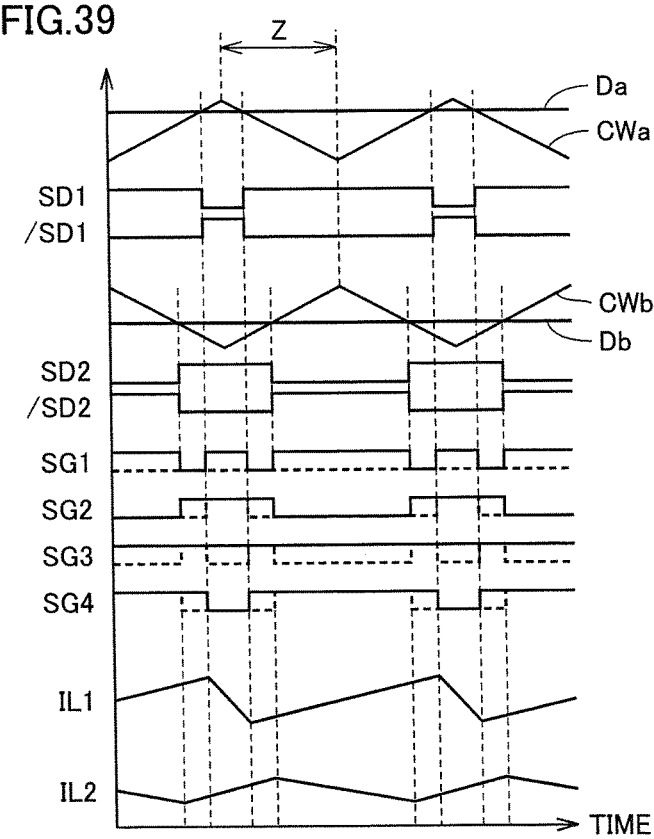
FIG. 39 is a diagram of waveforms showing an exemplary operation for controlling when carrier phase control is applied to the power supply system according to the third embodiment.

FIG. 39 is a diagram of waveforms showing an exemplary operation for controlling when carrier phase control is applied to the power supply system according to the third embodiment.

Referring to FIG. 39, although carrier waves CWa and CWb have the same frequency, but phase difference Z is provided therebetween by means of carrier phase control, similarly to FIG. 37. In the example of FIG. 39, phase difference Z=180 degrees.

In FIGS. 37 and 39, duty ratios Da and Db have identical values, respectively. Therefore, in FIGS. 37 and 39, control pulse signals SD1 and SD2 each have the H level period of the same length, although they have different phases. On the other hand, control signals SG1 to SG4 have different waveforms in FIGS. 37 and 39.

As a result, when phase difference Z is provided by carrier phase control, reactor currents IL1 and IL2 are equal in average value for the same duty ratios Da and Db, while the current phase changes.

By controlling the phase of reactor currents IL1 and IL2 similarly to the modification of the first embodiment, the inductance increasing effect of the variable magnetic coupling reactor can be enhanced. Furthermore, in power supply system 5c (power converter 50) according to the third embodiment, power losses in the switching elements can also be reduced by the carrier phase control.

Hereinafter, as a typical example, control in the state where both of DC power sources B1 and B2 are in the power running state, that is, reactor currents IL1 and IL2 are in the state where IL1>0 and current IL2>0 hold will be described.

Figure 40:
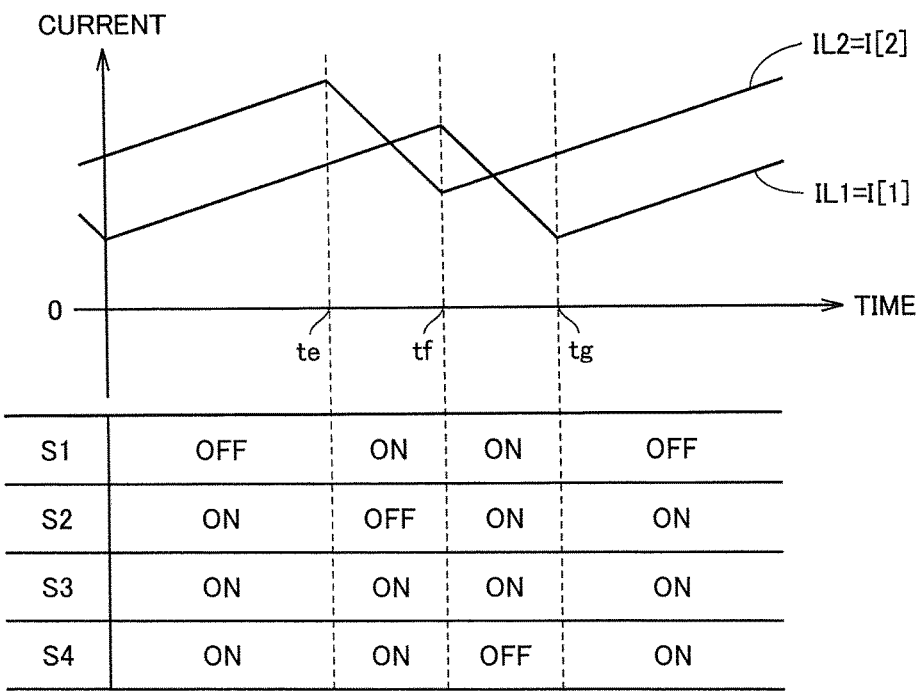
FIG. 40 is a diagram of waveforms illustrating the phase of currents achieved by carrier phase control in the parallel boost mode.

FIG. 40 is a diagram of waveforms illustrating the phase of currents achieved by carrier phase control in the parallel boost mode in power converter 50.

Referring to FIG. 40, since switching elements S2 to S4 are on until time te, the lower arm element of the step-up chopper circuit is on for each of DC power sources B1 and B2. Thus, both reactor currents IL1 and IL2 increase.

At time te, switching element S2 is turned off, so that the lower arm element of the step-up chopper circuit is turned off for DC power source B2. Thus, reactor current IL2 starts decreasing. Simultaneously with the turn-off of switching element S2, switching element S1 is turned on.

After time te, the lower arm element of the step-up chopper circuit is turned on for DC power source B1, and the lower arm element of the step-up chopper circuit is turned off for DC power source B2. That is, reactor current IL1 increases, while reactor current IL2 decreases. On this occasion, the current path in power converter 50 will be as shown at (a) of FIG. 41.

Figure 41:
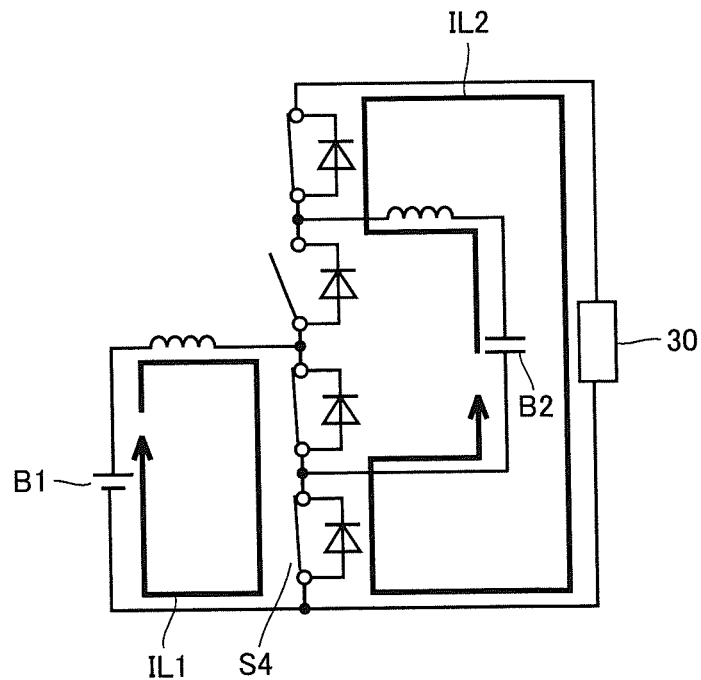
FIG. 41 shows first and second circuit diagrams illustrating current paths in a predetermined period in FIG. 40.
Figure 41:
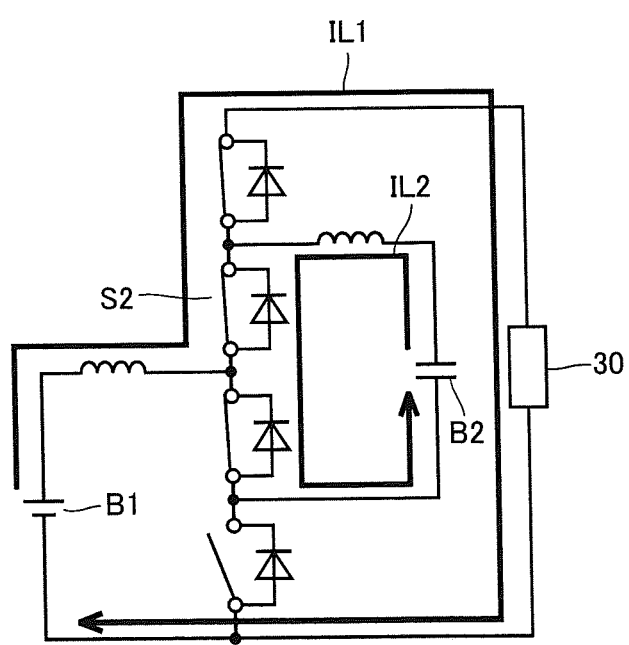

As is understood from (a) of FIG. 41, after time te, a difference current between reactor currents IL1 and IL2 will flow through switching element S4. That is, the current flowing through switching element S4 decreases.

Referring to FIG. 40 again, when switching element S4 is turned off from the state after time te, the lower arm element of the step-up chopper circuit is turned off for DC power source B1. Thus, reactor current IL1 starts decreasing. When switching element S2 is turned on, the lower arm element of the step-up chopper circuit is turned on for DC power source B2. Thus, reactor current IL2 starts increasing again. That is, the current path in power converter 50 changes from the state at (a) of FIG. 41 to the state at (b) of FIG. 41. In the state at (b) of FIG. 41, the difference current between reactor currents IL1 and IL2 will flow through switching element S2, which means that the current flowing through switching element S2 decreases.

By turning off switching element S4 in the state at (a) of FIG. 41, the current at the turn-off of switching element S4, that is, a switching loss, can be reduced. By turning off switching element S2 in the state at (b) of FIG. 41, the current at the turn-on of switching element S2, that is, a switching loss, can be reduced.

Therefore, the current phase, that is, phase difference Z between carrier waves CWa and CWb, is adjusted such that the decrease start timing (local maximum) of reactor current IL1 and the increase timing (local minimum) of reactor current IL2 coincide with each other. Accordingly, at time tf in FIG. 40, switching element S2 is turned on, and switching element S4 is turned off.

At time tf, switching element S1 is turned off, and switching element S4 is turned on. Accordingly, the lower arm element of the step-up chopper circuit is turned on for each of DC power sources B1 and B2. Accordingly, the state before time to described above is reproduced, and reactor currents IL1 and IL2 both increase.

In this way, in power supply system 5c (power converter 50) according to the third embodiment, by applying carrier phase control similar to that of the modification of the first embodiment, it is possible to enhance the effect of increasing the inductances of the variable magnetic coupling reactor and to reduce losses in the switching elements. It is noted that, in the carrier phase control, it is preferable to set optimum phase difference Z* such that an inflection point (local minimum or local maximum) of reactor current IL1 and an inflection point (local maximum or local minimum) of reactor current IL2 are attained at the same timing, similarly to the modification of the first embodiment.

(Circuit Operation in Series Boost Mode)

Power supply system 5c (power converter 50) according to the third embodiment is also capable of operating in the series boost mode by modifying the switching pattern of switching elements S1 to S4.

Figure 42:
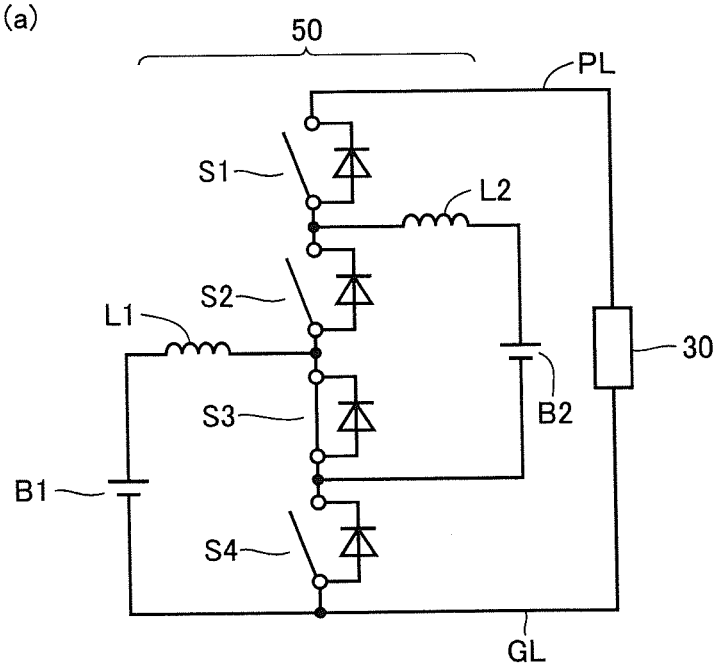
FIG. 42 shows first and second circuit diagrams illustrating a circuit operation in a series boost mode.
Figure 42:
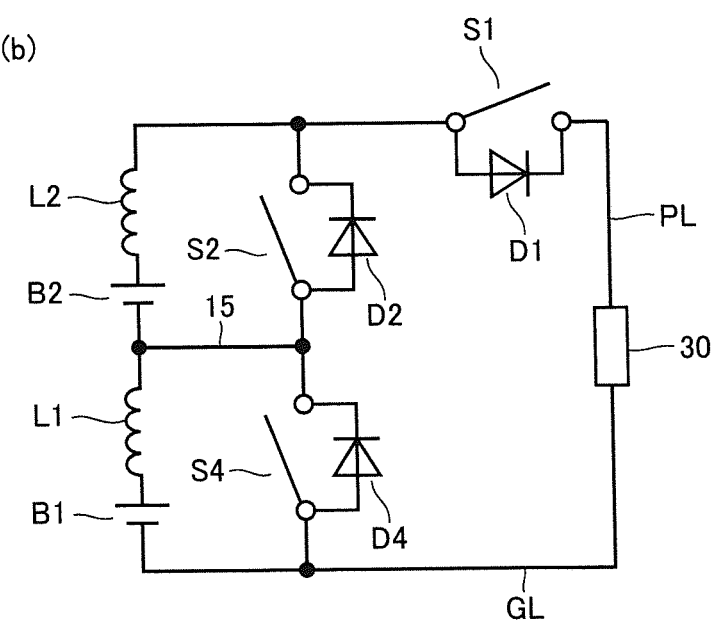

FIG. 42 shows circuit diagrams illustrating the circuit operations of power supply system 5c (power converter 50) in the series boost mode.

As shown at (a) of FIG. 42, switching element S3 is fixed in the on state, so that DC power sources B1 and B2 can be connected in series with power lines PL and GL. The equivalent circuit on this occasion is as shown at (b) of FIG. 42.

Referring to (b) of FIG. 42, in the series boost mode, between the series-connected DC power sources B1, B2 and power lines PL, GL, by commonly controlling on/off of switching elements S2 and S4, the on-period and the off-period of the lower arm element of the step-up chopper circuit can be formed alternately. It is noted that switching element S1 is turned on in the off-period of switching elements S2 and S4, thereby operating as a switch for controlling regeneration from load 30. Further, by switching element S3 which is fixed in the on state, a line 15 connecting reactor L1 to switching element S4 is equivalently formed.

Next, referring to FIG. 43, the DC/DC conversion (step-up operation) in the series boost mode will be described.

Figure 43:
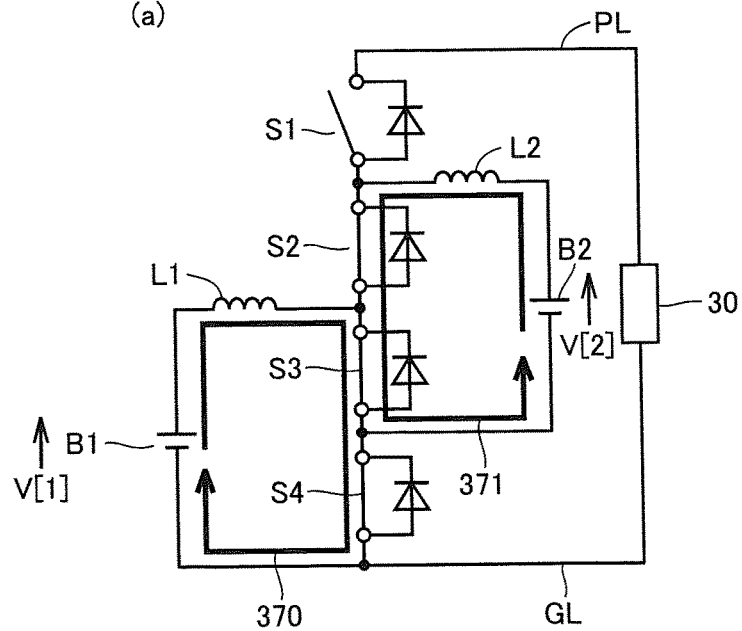
FIG. 43 shows circuit diagrams illustrating DC/DC conversion (step-up operation) in the series boost mode.
Figure 43:
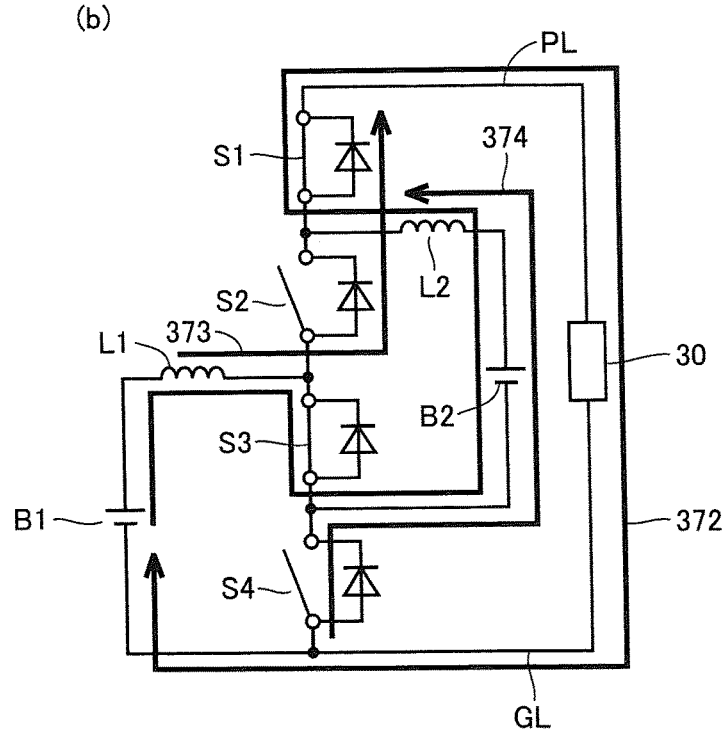

Referring to (a) of FIG. 43, switching element S3 is fixed in the on state for connecting DC power sources B1 and B2 in series, the pair of switching elements S2 and S4 is turned on and switching element S1 is turned off. Thus, current paths 370 and 371 for storing energy in reactors L1 and L2 are formed. As a result, for the series-connected DC power sources B1 and B2, a state in which the lower arm element of the step-up chopper circuit is on is obtained.

In contrast, referring to (b) of FIG. 43, while switching element S3 is fixed in the on state, the pair of switching elements S2 and S4 is turned off and switching element S1 is turned on, in contrast to (a) of FIG. 43. Thus, a current path 372 is formed. By current path 372, the sum of energy from DC power sources B1 and B2 connected in series and the energy stored in reactors L1 and L2 is output to power lines PL and GL. As a result, for the series-connected DC power sources B1 and B2, a state in which the upper arm element of the step-up chopper circuit is on is obtained.

With switching element S3 fixed in the on state, by alternately repeating the first period in which the pair of switching elements S2 and S4 is on and switching element S1 is off and the second period in which switching element S1 is on and switching elements S2 and S4 are off, current paths 370 and 371 of (a) of FIG. 43 and current path 372 of (b) of FIG. 43 are formed alternately.

In the DC/DC conversion in the series boost mode, the relation represented by Equation (37) below holds among voltage V[1] of DC power source B1, voltage V[2] of DC power source B2 and output voltage VH. In Equation (37), Dc represents the duty ratio of the first period in which the pair of switching elements S2 and S4 is on.

[Math.18]

$$VH = 1/(1-Dc) \times (V[1]+V[2]) \tag{37}$$

It is noted, however, that if V[1] and V[2] are different or if reactors L1 and L2 have different inductances, reactors L1 and L2 come to have different current values at the end of operation shown at (a) of FIG. 43. Therefore, immediately after the transition to the operation shown at (b) of FIG. 43, if the current of reactor L1 is larger, a difference current flows through a current path 373. If the current of reactor L2 is larger, a difference current flows through a current path 374.

Figures 44, 45:
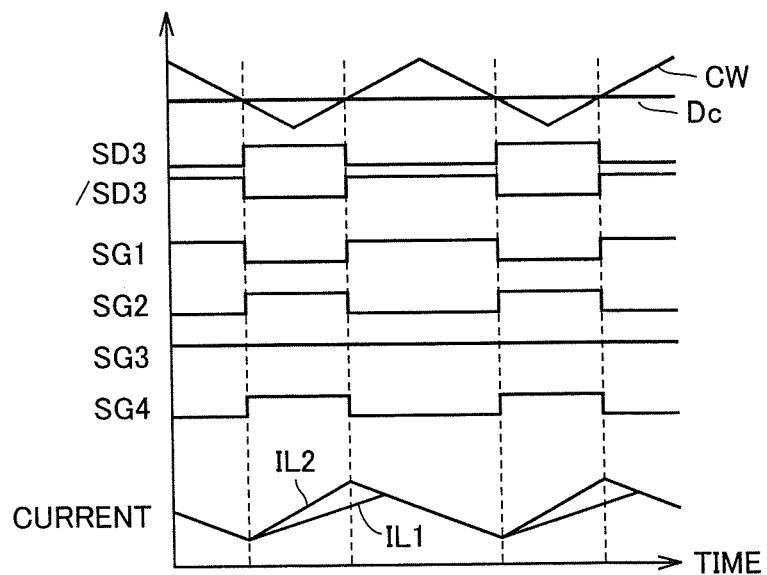
FIG. 44 is a diagram of waveforms showing an exemplary operation for controlling the switching elements of the power converter in the series boost mode.
FIG. 45 is a diagram for illustrating logical operation expressions for setting a control signal for each switching element in the series boost mode.

FIG. 44 is a diagram of waveforms showing an exemplary operation for controlling the switching elements of the power converter in the series boost mode.

In the series boost mode, duty ratio Dc of Equation (37) is calculated so as to compensate for voltage deviation DVH (DVH=VH*−VH) of output voltage VH. Then, control pulse signal SD3 is generated based on a voltage comparison between carrier wave CW and duty ratio Dc. A control pulse signal /SD3 is an inversion signal of control pulse signal SD3. In the series boost mode, DC/DC conversion between the DC voltage (V[1]+V[2]) and output voltage VH is executed by the step-up chopper circuit shown in FIG. 43.

As shown in FIG. 45, control signals SG1 to SG4 can be set based on the logic operation of control pulse signal SD3 (/SD3).

Control pulse signal SD3 is defined as control signals SG2 and SG4 for the pair of switching elements S2 and S4 constituting the lower arm element of the step-up chopper circuit. Similarly, control signal SG1 for switching element S1 constituting the upper arm element of the step-up chopper circuit is obtained by control pulse signal /SD3. As a result, the period in which the pair of switching elements S2 and S4 constituting the lower arm element is turned on and the period in which switching element S1 constituting the upper arm element are provided alternately.

In the series boost mode, bidirectional DC/DC conversion is executed between power lines PL and GL (load 30) with DC power sources B1 and B2 connected in series. Therefore, output power P[1] of DC power source B1 and output power P[2] of DC power source B2 cannot be directly controlled. That is, the ratio between output power P[1] of DC power source B1 and output power P[2] of DC power source B2 is automatically determined by the ratio between voltages V[1] and V[2] in accordance with Equation (38) below.

[Math.19]

$$P[1]:P[2]=V[1]:V[2] \tag{38}$$

Since the step-up ratio (VH/(V[1]+V[2])) is suppressed in the series boost mode, reactor currents IL1 and IL2 with respect to identical output power can be suppressed. Moreover, since the change gradient of reactor currents IL1 and IL2 are suppressed by connecting reactors L1 and L2 in series, the ripple width becomes smaller. Accordingly, iron losses of reactors L1 and L2 occurring in core 150 and alternating current losses occurring in windings 121a, 121b and 122 can be reduced. Accordingly, by suppressing power losses in reactors L1 and L2, in the high-voltage region where VH>V[1]+V[2] holds, power loss in power supply system 5c (power converter 50) can be reduced.

It is noted that, in the series boost mode, reactor currents IL1 and IL2 increase or decrease in substantially the same phase, as is also understood from FIG. 44. Therefore, when reactors L1 and L2 are brought into the magnetically coupled state, the inductances may decrease equivalently by the action of mutual inductance Mxy in Equation (34). In the series boost mode, however, since reactors L1 and L2 are connected in series, decrease in the inductances in the whole circuit can be avoided. Moreover, an adverse influence is less likely to be exerted on the operation of power supply system 5c (power converter 50) even if the inductances decrease equivalently, since reactor currents IL1 and IL2 also decrease as described above.

Alternatively, it is also possible to design variable magnetic coupling reactor 100 such that all of operating points 301 to 303 of magnetic leg portions 151 to 153 and 151# to 153# of variable magnetic coupling reactors 100 and 100# stay in linear region 310 as shown in FIG. 16, since reactor currents IL1 and IL2 are reduced as compared with the parallel boost mode. In this case, since power supply system 5c (power converter 50) can be operated while maintaining the state where reactors L1 and L2 are magnetically uncoupled, the inductances of reactors L1 and L2 are not affected by mutual inductance Mxy in Equation (34).

In this way, the variable magnetic coupling reactor according to the present embodiment can also be used as reactors L1 and L2 in power supply system 5c in which power converter 50 may be operated in the series boost mode.

(Carrier Phase Control in Series Boost Mode)

In power supply system 5c (power converter 50), carrier phase control can be applied in the series boost mode. Accordingly, control in the parallel boost mode and control in the series boost mode can be made common as will be described hereinafter.

Also in the carrier phase control in the series boost mode, phase difference Z between carrier waves is controlled such that the local maximum of reactor current IL1 and the local minimum of reactor current IL2 are attained at the same timing, or such that the local minimum of reactor current IL1 and the local maximum of reactor current IL2 are attained at the same timing.

Consideration will now be given to duty ratios Da and Db on this occasion. By deforming Equation (35), Equation (39) below is obtained for Da.

[Math.20]

$$Da=(VH-V[1])/VH \tag{39}$$

Similarly, by deforming Equation (36), Equation (40) below is obtained for Db.

[Math.21]

$$Db=(VH-V[2])/VH \tag{40}$$

As shown in FIG. 37, control signal SG3 in the parallel boost mode is generated based on the logical sum of control pulse signals SD1 and SD2. Therefore, it is understood that if phase difference Z is set such that the fall (or rise) timing of control pulse signal SD1 and the rise (or fall) timing of control pulse signal SD2 coincide with each other, the ratio of the H level period of control signal SG3 in the PB mode exceeds 1.0 when VH>(V[1]+V[2]) holds. That is, when VH>(V[1]+V[2]) holds, control signal SG3 is also fixed at the H level by PWM control by means of duty ratios Da and Db which is common to the PB mode.

Figures 46, 47:
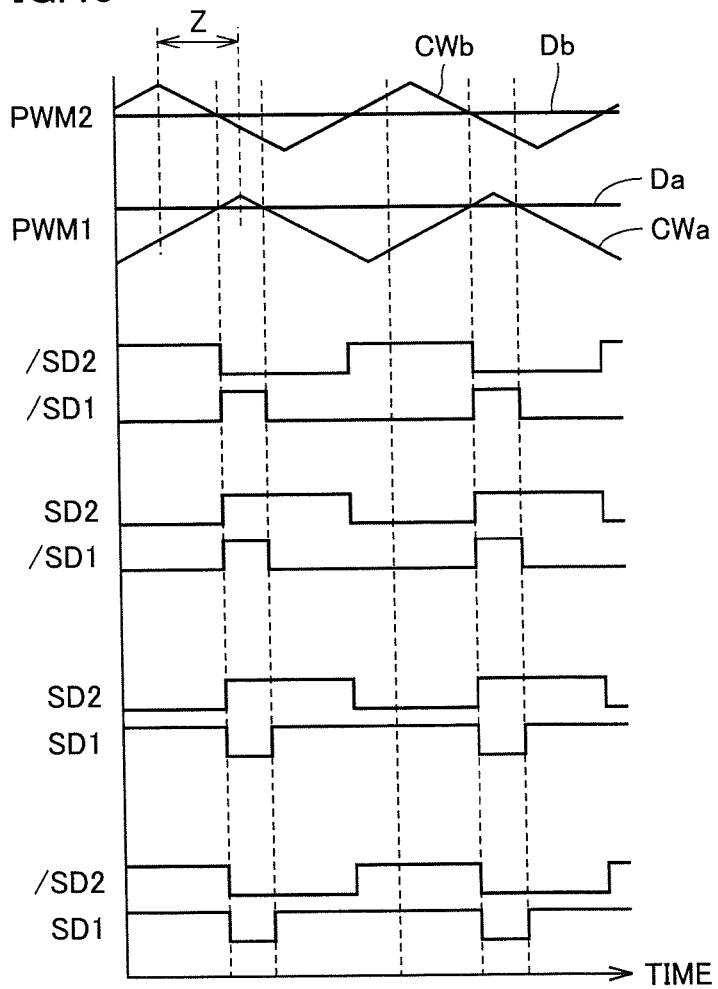
FIG. 46 is a diagram of waveforms showing control pulse signals in the series boost mode when carrier phase control is applied.
FIG. 47 is a diagram for illustrating setting of control signals in the series boost mode.

FIG. 46 is a diagram of waveforms showing control pulse signals in the series boost mode when carrier phase control is applied.

As shown in FIG. 46, control signal SG1 in the parallel boost mode is generated based on the logical sum of control pulse signals /SD1 and /SD2. When phase difference Z is set as described above, the rise timing of control pulse signal /SD1 and the rise timing of control pulse signal /SD2 coincide with each other.

Therefore, a duty ratio DSG1 of control signal SG1 is expressed as (1-Da)+(1-Db). That is, DSG1 is expressed by Equation (41) below.

[Math.22]

$$DSG1=(V[1]+V[2])/VH \tag{41}$$

On the other hand, duty ratio Dc is expressed by Equation (42) below by deforming Equation (37).

[Math.23]

$$Dc=1-(V[1]+V[2])/VH \tag{42}$$

Therefore, assuming that SG1=/SG3 holds in accordance with the logic operation in the series boost mode in FIG. 45, duty ratio DSG1 of control signal SG1 is expressed by Equation (43) below.

[Math.24]

$$DSG1=1-Dc=(V[1]+V[2])/VH \tag{43}$$

In this way, when phase difference Z is set in accordance with the above-described carrier phase control, a signal having a duty ratio equal to that of control pulse signal /SD3 based on duty ratio Dc can be generated by the logic operation based on control pulse signals /SD1 and /SD2 by means of duty ratios Da and Db. That is, control signal SG1 in the SB mode can be generated based on control pulse signals SD1 and SD2.

As shown in FIG. 47, control signals SG2 and SG4 in the series boost mode are inversion signals of control signal SG1. The result of logic operation of not (/SD2 or /SD1) will be the logical product (SD1 and SD2) of SD1 and SD2. Therefore, control signals SG2 and SG4 to be set based on control pulse signal SD3 can also be generated based on the logic operation of control pulse signals SD1 and SD2.

In this way, in the series boost mode, phase difference Z is set such that the pulse transition timing matches between control pulse signal SD1 (/SD1) and control pulse signal SD2 (/SD2) applying carrier phase control. As described above, on this occasion, an inflection point (local maximum or local minimum) of reactor current IL1 and an inflection point (local minimum or local maximum) of reactor current IL2 are attained at the same timing.

By generating carrier waves CWa and CWb so as to provide such phase difference Z, control signals SG1 to SG4 in the series boost mode can be set from control pulse signals SD1 and SD2 based on duty ratios Da and Db, as shown in FIG. 47. Control signals SG1 to SG4 on this occasion are set to have an H level period based on duty ratio Dc.

It is noted that optimum phase difference Z* in the series boost mode can also be calculated based on duty ratios Da and Db calculated in the series boost mode in accordance with the phase difference map or phase difference calculation expressions set previously, similarly to the carrier phase control in the parallel boost mode.

FIG. 48 is a diagram of waveforms showing an exemplary operation in the parallel boost mode and the series boost mode in the power supply system according to the third embodiment.

Referring to FIG. 48, a command of switching from the parallel boost mode to the series boost mode is issued at the peak of carrier wave CWa. Before issuance of the switching command, control signals SG1 to SG4 are generated based on duty ratios Da and Db calculated by controlling power of respective DC power sources B1 and B2.

When the switching command is issued, control signals SG1 to SG4 in the series boost mode can be generated immediately based on control pulse signals SD1 and SD2 at that time in accordance with the logical operation expression shown in FIG. 47, without newly calculating duty ratio Dc. Accordingly, processing of switching between the parallel boost mode and the series boost mode can be executed without causing control delay.

(Other Operation Modes)

An operation mode other than the above-described series boost mode and parallel boost mode can also be selected to operate power supply system 5c according to the third embodiment.

FIG. 49 is a list showing a plurality of operation modes applied to power supply system 5c (power converter 50) according to the third embodiment.

Referring to FIG. 49, the plurality of operation modes are roughly divided into a "boost (step-up) mode" of controlling output voltage VH in accordance with voltage command value VH* and a "direct connection mode" of fixing on/off of switching elements S1 to S4 to electrically connect DC power source B1 and/or B2 to power lines PL and GL.

The boost mode includes the above-described parallel boost mode and series boost mode. In the parallel boost mode, DC/DC conversion can be executed in parallel between DC power sources B1, B2 and power lines PL, GL (load 30) by controlling on/off of switching elements S1 to S4 of power converter 50 in accordance with the logical operation expressions shown in FIG. 38. It is noted that, in the parallel boost mode, output voltage VH can be controlled in accordance with voltage command value VH* while controlling the electric power distribution ratio between DC power sources B1 and B2.

In the series boost mode, DC/DC conversion can be executed with DC power sources B1 and B2 connected in series, by controlling on/off of switching elements S1 to S4 of power converter 50 in accordance with the logical operation expressions shown in FIGS. 45 and 47. As described above, in the series boost mode, the electric power distribution ratio between DC power sources B1 and B2 is automatically determined in accordance with the ratio between voltages V[1] and V[2] when controlling output voltage VH in accordance with voltage command value VH*, and therefore cannot be directly controlled as in the parallel boost mode.

It is noted that the series boost mode is only available for the high-voltage range where VH>(V[1]+V[2]) holds, but efficiency of DC/DC conversion can be improved since the step-up ratio in that high-voltage range can be reduced. On the other hand, since the parallel boost mode is also available for the voltage range where max(V[1], V[2])<VH holds and VH is less than or equal to V[1]+V[2], the output voltage range is wide. Furthermore, since the electric power distribution ratio between DC power sources B1 and B2 can be controlled, the state of charge (SOC) of each of DC power sources B1 and B2 can also be controlled.

Furthermore, the boost mode includes a "boost mode by DC power source B1 (hereinafter, B1 boost mode)" of conducting DC/DC conversion between power lines PL and GL (load 30) only by way of DC power source B1 and a "boost mode by DC power source B2 (hereinafter, B2 boost mode)" of conducting DC/DC conversion between power lines PL and GL (load 30) only by way of DC power source B2.

In the B1 boost mode, DC power source B2 is unused while being maintained in the state electrically disconnected from power line PL as long as output voltage VH is controlled to be higher than V[2]. In the B1 boost mode, only the step-up chopper circuit for DC power source B1 (FIG. 35) is formed. Therefore, on/off of switching elements S1 to S4 is controlled in accordance with control pulse signals /SD1 and SD1 based on duty ratio Da for controlling the output of DC power source B1 using the pair of switching elements S3 and S4 as a lower arm and the pair of switching elements S1 and S2 as an upper arm.

Similarly, in the B2 boost mode, DC power source B1 is unused while being maintained in the state electrically disconnected from power line PL as long as output voltage VH is controlled to be higher than V[1].

In the B2 boost mode, only the step-up chopper circuit for DC power source B2 (FIG. 36) is formed. Therefore, on/off of switching elements S1 to S4 is controlled in accordance with control pulse signals /SD2 and SD2 based on duty ratio Db for controlling the output of DC power source B2 using the pair of switching elements S2 and S3 as a lower arm and the pair of switching elements S1 and S4 as an upper arm. In this way, in each of the operation modes belonging to the boost mode, output voltage VH is controlled in accordance with voltage command value VH*.

On the other hand, the direct connection mode includes a "parallel direct connection mode" of maintaining the state where DC power sources B1 and B2 are electrically connected in parallel across power lines PL and GL. In the parallel direct connection mode, switching elements S1 and S4 are fixed in the on state, while switching elements S2 and S3 are fixed in the off state. Accordingly, output voltage VH becomes equivalent to a voltage max(V[1], V[2]) which is the higher one of V[1] and V[2]. It is noted that since the voltage difference between V[1] and V[2] produces a short-circuit current between DC power sources B1 and B2, the parallel direct connection mode can be applied limitedly when the voltage difference is small.

Furthermore, the direct connection mode includes a "series direct connection mode" of maintaining the state where DC power sources B1 and B2 are electrically connected in series across power lines PL and GL. In the series direct connection mode, switching elements S1 and S3 are fixed in the on state, while switching elements S2 and S4 are fixed in the off state. Accordingly, output voltage VH becomes equivalent to the sum of voltage V[1] of DC power source B1 and voltage V[2] of DC power source B2 (VH=V[1]+V[2]).

Furthermore, the direct connection mode includes a "direct connection mode of DC power source B1 (hereinafter, B1 direct connection mode)" in which a current path with power lines PL and GL is formed only for DC power source B1 and a "direct connection mode of DC power source B2 (hereinafter, B2 direct connection mode)" in which a current path with power lines PL and GL is formed only for DC power source B2.

In the B1 direct connection mode, switching elements S1 and S2 are fixed in the on state, while switching elements S3 and S4 are fixed in the off state. Accordingly, DC power source B2 is brought into the state disconnected from power lines PL and GL, and output voltage VH thus becomes equivalent to voltage V[1] of DC power source B1 (VH=V[1]). In the B1 direct connection mode, DC power source B2 is unused while being maintained in the state electrically disconnected from power lines PL and GL. If the B1 direct connection mode is applied in the state where V[2]>V[1] holds, a short-circuit current will be produced from DC power source B2 to DC power source B1 through switching element S1 and diode D3. Therefore, satisfying V[1]>V[2] is a necessary requirement for the application of the B1 direct connection mode.

Similarly, in the B2 direct connection mode, switching elements S1 and S4 are fixed in the on state, while switching elements S2 and S3 are fixed in the off state. Accordingly, DC power source B1 is brought into the state disconnected from power lines PL and GL, and output voltage VH thus becomes equivalent to voltage V[2] of DC power source B2 (VH=V[2]). In the B2 direct connection mode, DC power source B1 is unused while being maintained in the state electrically disconnected from power lines PL and GL. If the B2 direct connection mode is applied in the state where V[1]>V[2] holds, a short-circuit current will be produced from DC power source B1 to DC power source B2 through diode D1 and switching element S3. Therefore, satisfying V[2]>V[1] is a necessary requirement for the application of the B2 direct connection mode.

Output voltage VH is determined depending on voltages V[1] and V[2] of DC power sources B1 and B2 in each of the operation modes included in the direct connection mode, and thus cannot be controlled directly. Therefore, in each of the operation modes included in the direct connection mode, output voltage VH can no longer be set at a voltage suitable for the operation of load 30, which may increase power loss in load 30.

On the other hand, since switching elements S1 to S4 are not turned on/off in the direct connection mode, power loss in power converter 50 (switching loss associated with on/off) is suppressed. Therefore, depending on the operating state of load 30, the amount of decrease in power loss in power converter 50 may become larger than the amount of increase in power loss of load 30 by applying the direct connection mode, which may suppress the power loss in power supply system 5 as a whole.

In this way, in power converter 50 of power supply system 5c according to the third embodiment, output voltage VH can be controlled while selectively applying the plurality of operation modes shown in FIG. 49 by changing the switching pattern of switching elements S1 to S4.

On this occasion, in the B1 boost mode, B2 boost mode, B1 direct connection mode, and B2 direct connection mode in which only DC power source B1 or B2 is used, only either reactor current IL1 or IL2 flows, so that magnetic coupling does not occur. In this case, reactor L1 or L2 can be operated similarly to the case of magnetic components 101 and 102 shown in FIG. 4. Moreover, in the parallel direct connection mode and the series direct connection mode, reactors L1 and L2 can be implemented by variable magnetic coupling reactor 100 or 100# similarly to the parallel boost mode and the series boost mode. In this way, power converter 50 is also capable of operating with the plurality of operation modes shown in FIG. 49 selectively applied when variable magnetic coupling reactor 100 or 100# according to the first or second embodiment is used as reactors L1 and L2 in power supply system 5c including power converter 50.

As described above, in the present embodiment, the exemplary configurations of the power converter and the power supply system, including the two reactors formed integrally by variable magnetic coupling reactor 100 or 100# according to the first or second embodiment, have been illustrated. However, application of the present invention is not limited to these power converter and power supply system. That is, the variable magnetic coupling reactor and the method of use of a composite magnetic component according to the present embodiment are applicable to any circuit configuration that includes two reactors respectively included in current paths independently controlled in current. Accordingly, reduction in size and weight of the device can be achieved by forming the two reactors included in the power converter and the power supply system integrally.

Moreover, although the shape of the core and the winding mode of windings have been illustrated in the present embodiment with reference to variable magnetic coupling reactors 100 and 100#, the present invention is not limited to such a configuration. That is, the shape of the core and the winding mode of windings on the core can be modified arbitrarily as long as magnetic fields produced by respective currents of the two reactors have a relationship similar to that of magnetic leg portions 151 to 153 (151# to 153#) as described above.

It is noted that load 30 may be configured by any device that operates with controlled DC voltage VH. Specifically, though examples in which load 30 is implemented by a traction motor or an inverter mounted on an electric vehicle or a hybrid vehicle have been described in the present embodiments, application of the present invention is not limited to such examples.

Moreover, the configuration of the power supply system to which the variable magnetic coupling reactor according to the present invention is applied is also not limited to the configurations described in the first and third embodiments. That is, the variable magnetic coupling reactor of the present invention can be applied to any power supply system having an arbitrary configuration that has an operation mode of individually controlling reactors L1 and L2 in current.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 5, 5c power supply system; 6, 7, 50 power converter; 11, 12 voltage source; 15 line; 30 load; 40 control device; 41 current controller; 42 voltage controller; 43a, 43b controller; 44a, 44b control unit; 45 carrier wave generation unit; 100, 100# variable magnetic coupling reactor; 101, 102 magnetic component; 110a, 110b, 150, 150# core; 112a, 112b, 161-163, 161#-163# gap; 120a, 120a#, 120b, 120b#, 121a, 121a#, 121b, 121b#, 122, 122# winding; 121c lead wire; 151-153, 151#-153# magnetic leg portion; 201-204, 201#-204# terminal; 211-213 magnetic field; 221-223, 221#-223# magnetic flux; 251-253 magnetic circuit; 301-303 operating point; 305, 306 magnetization curve; 310 linear region; 350, 351, 360, 361, 370-374 current path; B1, B2 DC power source; Bsmax saturation magnetic flux density; CL1, CL2 characteristic line; CW, CW1, CW2, CWa, CWb carrier wave; D1-D4 diode; DT, DT1, DT2, Da, Db, Dc duty ratio; GL, PL power line; IL1, IL2 reactor current; Ii* current command value; L1, L2 reactor; LN1, LN2, LN3 magnetic path length; Lg1, Lg2, Lg3 gap length; N1, N2, N3 node; OP1, OP2, OP3 operation line; Q1-Q4, S1-S4 switching element; SC1-SC3 cross-sectional area; SD1-SD3 control pulse signal; SG1-SG4 control signal (switching element); VH output voltage; VH* voltage command value; VL1, VL2 reactor voltage; VL1*, VL2* control command signal; VH DC voltage; VL1 control command signal; VL1, VL2 control command signal.

The invention claimed is:

1. A method of use of a composite magnetic component, the composite magnetic component comprising
 a first winding and a second winding electrically connected in series through which a first current passes,
 a third winding through which a second current passes, and
 a core made of a nonlinear magnetic material,
 the core being configured to comprise a first magnetic leg portion on which the first winding is wound, a second magnetic leg portion on which the second winding is wound, a third magnetic leg portion on which the third winding is wound, and a fourth magnetic leg portion configured to create a magnetic path among the first to third magnetic leg portions,
 an operating state of a first reactor formed by the first and second windings and a second reactor formed by the third winding changing from a magnetically uncoupled mode in which the first and second reactors operate in a magnetically non-interfering state to a magnetically coupled mode in which the first and second reactors operate in a magnetically interfering state, as the first and second currents increase, and
 the composite magnetic component being used so that a change range of the first and second currents comprises an area in which the first and second reactors operate in the magnetically uncoupled mode and an area in which the first and second reactors operate in the magnetically coupled mode.

2. The method of use of a composite magnetic component according to claim 1, wherein in the magnetically uncoupled mode, each of the first and second magnetic leg portions is magnetized in a linear region, while in the magnetically coupled mode, one of the first and second magnetic leg portions is magnetized in a nonlinear region and the other one is magnetized in the linear region.

3. The method of use of a composite magnetic component according to claim 1, wherein the core and the first to third windings are configured such that, when the first and second currents are maximum currents, the second magnetic leg portion has a magnetic flux density lower than a saturation magnetic flux density and a direction of magnetization in the first magnetic leg portion is not reversed.

4. The method of use of a composite magnetic component according to claim 1, wherein the first and second currents are controlled in phase such that an inflection point of one of the first and second currents and an inflection point of the other one of the first and second currents are attained at an identical timing.

5. A power supply system comprising:
 a first DC power source;
 a second DC power source;
 a power converter configured to execute DC power conversion between the first and second DC power sources and first and second power lines; and
 a control device configured to control operation of the power converter,
 the power converter comprising
  a first reactor and a second reactor arranged to be included in a power conversion path formed across the first and second DC power sources and the first and second power lines, and
  a plurality of switching elements arranged to be capable of controlling a first current passing through the first reactor and a second current passing through the second reactor,
 the first and second reactors being integrally implemented by a single composite magnetic component,
 the composite magnetic component being configured to comprise
  a first winding and a second winding electrically connected in series through which the first current passes,
  a third winding through which the second current passes, and
  a core made of a nonlinear magnetic material,
 the core being configured to comprise a first magnetic leg portion on which the first winding is wound, a second magnetic leg portion on which the second winding is wound, a third magnetic leg portion on which the third winding is wound, and a fourth magnetic leg portion configured to create a magnetic path among the first to third magnetic leg portions,
 an operating state of a first reactor formed by the first and second windings and a second reactor formed by the third winding changing from a magnetically uncoupled mode in which the first and second reactors operate in a magnetically non-interfering state to a magnetically coupled mode in which first and second reactors operate in a magnetically interfering state, as the first and second currents increase, and
 the first and second currents changing in a range which comprises an area in which the first and second reactors operate in the magnetically uncoupled mode and an area in which the first and second reactors operate in the magnetically coupled mode, when the power converter is controlled within a current range not to exceed a maximum allowable current.

6. The power supply system according to claim 5, wherein in the magnetically coupled mode, the first and second magnetic leg portions have equivalent permeabilities, while in the magnetically uncoupled mode, one of the first and second magnetic leg portions has a permeability lower than the permeability of the other one of the first and second magnetic leg portions.

7. The power supply system according to claim 5, wherein in the magnetically uncoupled mode, each of the first and second magnetic leg portions is magnetized in a linear region where magnetic flux density changes linearly with respect to change in a magnetic field, while in the magnetically coupled mode, one of the first and second magnetic leg portions is magnetized in a nonlinear region and the other one is magnetized in the linear region.

8. The power supply system according to claim 5, wherein the first to third windings are wound on the first to third magnetic leg portions, respectively, such that first and second magnetic fields produced from the first and second windings, respectively, with flow of the first current and a third magnetic field produced from the third winding with flow of the second current reinforce each other in one of the first and second magnetic leg portions and weaken each other in the other one of the first and second magnetic leg portions, and weaken each other in the third magnetic leg portion.

9. The power supply system according to claim 8, wherein
the first to third magnetic leg portions are formed in an identical direction to one another,
the fourth magnetic leg portion is provided to extend in a direction crossing the first to third magnetic leg portions,
the first and second windings are wound on the first and second magnetic leg portion, respectively, such that the first magnetic field and the second magnetic field are produced in opposite directions to each other, and
the third winding is wound on the third magnetic leg portions such that the third magnetic field is produced in an identical direction to one of the first and second magnetic fields.

10. The power supply system coupling reactor according to claim 8, wherein
the core has a shape in which the first to third magnetic leg portions extend from an outline portion shaped as a ring constituting the fourth magnetic leg portion to the center of the ring and in which the first to third magnetic leg portions are integrated at the center,
the first and second windings are wound on the first and second magnetic leg portions, respectively, such that one of the first magnetic field and the second magnetic field is produced toward the center and the other one of the first and second magnetic fields is produced in a direction away from the center, and
the third winding is wound on the third magnetic leg portion such that the third magnetic field is produced in an identical direction to one of the first and second magnetic fields.

11. The power supply system according to claim 5, wherein the core and the first to third windings are configured such that, when the first and second currents are maximum currents, the second magnetic leg portion has a magnetic flux density lower than a saturation magnetic flux density and a direction of magnetization in the first magnetic leg portion is not reversed.

12. The power supply system according to claim 5, wherein the first and second currents are controlled in phase such that an inflection point of one of the first and second currents and an inflection point of the other one of the first and second currents are attained at an identical timing.

13. The power supply system according to claim 12, wherein when the first and second currents have an identical polarity, the first and second currents are controlled in phase such that a local maximum of one of the first and second currents and a local minimum of the other one of the first and second currents are attained at an identical timing.

14. The power supply system according to claim 12, wherein when the first and second currents are different in polarity, the first and second currents are controlled in phase such that a local maximum of one of the first and second currents and a local maximum of the other one of the first and second currents are attained at an identical timing, or such that a local minimum of one of the first and second currents and a local minimum of the other one of the first and second currents are attained at an identical timing.

15. The power supply system according to claim 5, wherein
the plurality of switching elements comprise
a first switching element electrically connected across a first node and the first power line,
a second switching element electrically connected across a second node and the first node,
a third switching element electrically connected across the second node and a third node electrically connected to a negative electrode terminal of the second DC power source, and
a fourth switching element electrically connected across the third node and the second power line electrically connected to the negative electrode terminal of the first DC power source,
the first reactor is electrically connected across the second node and the second power line in series with the first DC power source, and
the second reactor is electrically connected across the first and third nodes in series with the second DC power source.

* * * * *